(12) United States Patent
Murphy

(10) Patent No.: US 6,348,919 B1
(45) Date of Patent: Feb. 19, 2002

(54) GRAPHICS SYSTEM WITH OPTIMIZED USE OF UNIFIED LOCAL AND FRAME BUFFERS

(75) Inventor: Nicholas J. N. Murphy, The Sands (GB)

(73) Assignee: 3Dlabs Inc, Ltd., Hamilton (BM)

( * ) Notice: Subject to any disclaimer, the term of this patent is extended or adjusted under 35 U.S.C. 154(b) by 789 days.

(21) Appl. No.: 08/659,132

(22) Filed: Jun. 4, 1996

Related U.S. Application Data

(60) Provisional application No. 60/008,798, filed on Dec. 18, 1995.

(51) Int. Cl.[7] ................................................ G06T 15/40
(52) U.S. Cl. ......................... 345/421; 345/589; 345/629
(58) Field of Search ................................. 345/421, 431, 345/432, 435, 419, 589, 619

(56) References Cited

U.S. PATENT DOCUMENTS

| | | | | |
|---|---|---|---|---|
| 4,885,703 A | * | 12/1989 | Deering ........................ | 345/422 |
| 4,992,780 A | * | 2/1991 | Penna et al. ................. | 345/422 |
| 5,490,238 A | * | 2/1996 | Watkins ....................... | 345/422 |
| 5,613,050 A | * | 3/1997 | Hochmuth et al. .......... | 345/422 |
| 5,640,496 A | * | 6/1997 | Hardy et al. ................ | 345/421 |

OTHER PUBLICATIONS

Press Release, Nov. 13, 1995, S3 Incorporated, 2770 San Tomas Expwy., Santa Clara, CA 95051–0968, re: "S3d Advanced Graphics Technology First to Enable 3D in Mainstream PCs, *Family of Products From S3 Delivers Fully–Featured 3D Graphics for as Low as $40.*"

* cited by examiner

Primary Examiner—Mark Zimmerman
Assistant Examiner—Huedung X Cao
(74) Attorney, Agent, or Firm—Groover & Associates; Robert Groover

(57) ABSTRACT

A graphics rendering system and method utilizing a unified memory space for a depth-buffer and the back framebuffer. To provide very high resolution with a limited memory, each primitive is rendered once to provide depth values, to determine which pixels of each primitive are displayed, and a second time to store the color values of pixels which are to be displayed. A flag bit is used to ensure that depth data and color data, which coexist in a common memory space, cannot be confused or interchanged.

21 Claims, 18 Drawing Sheets

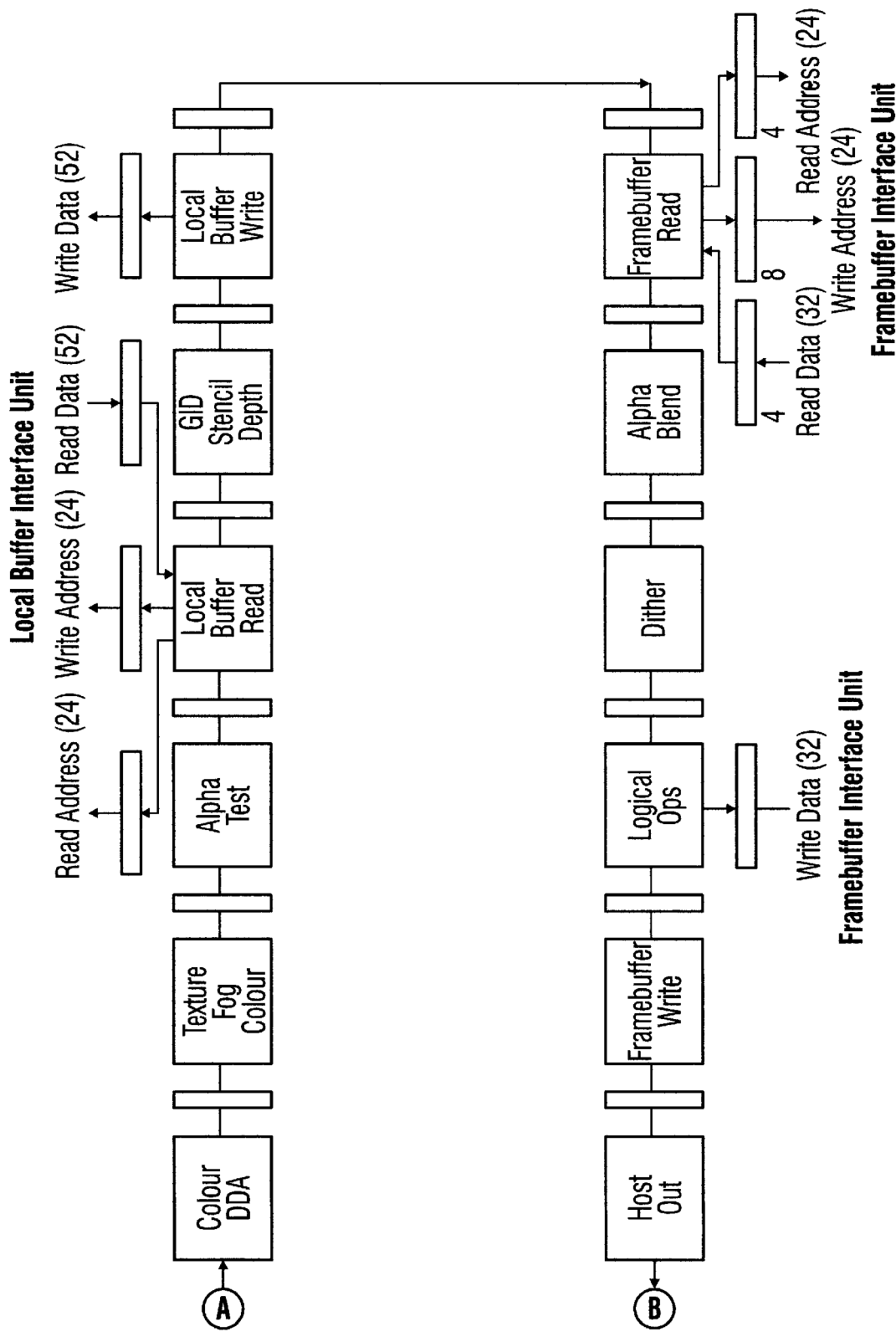
Fig. 2A (1 of 2)

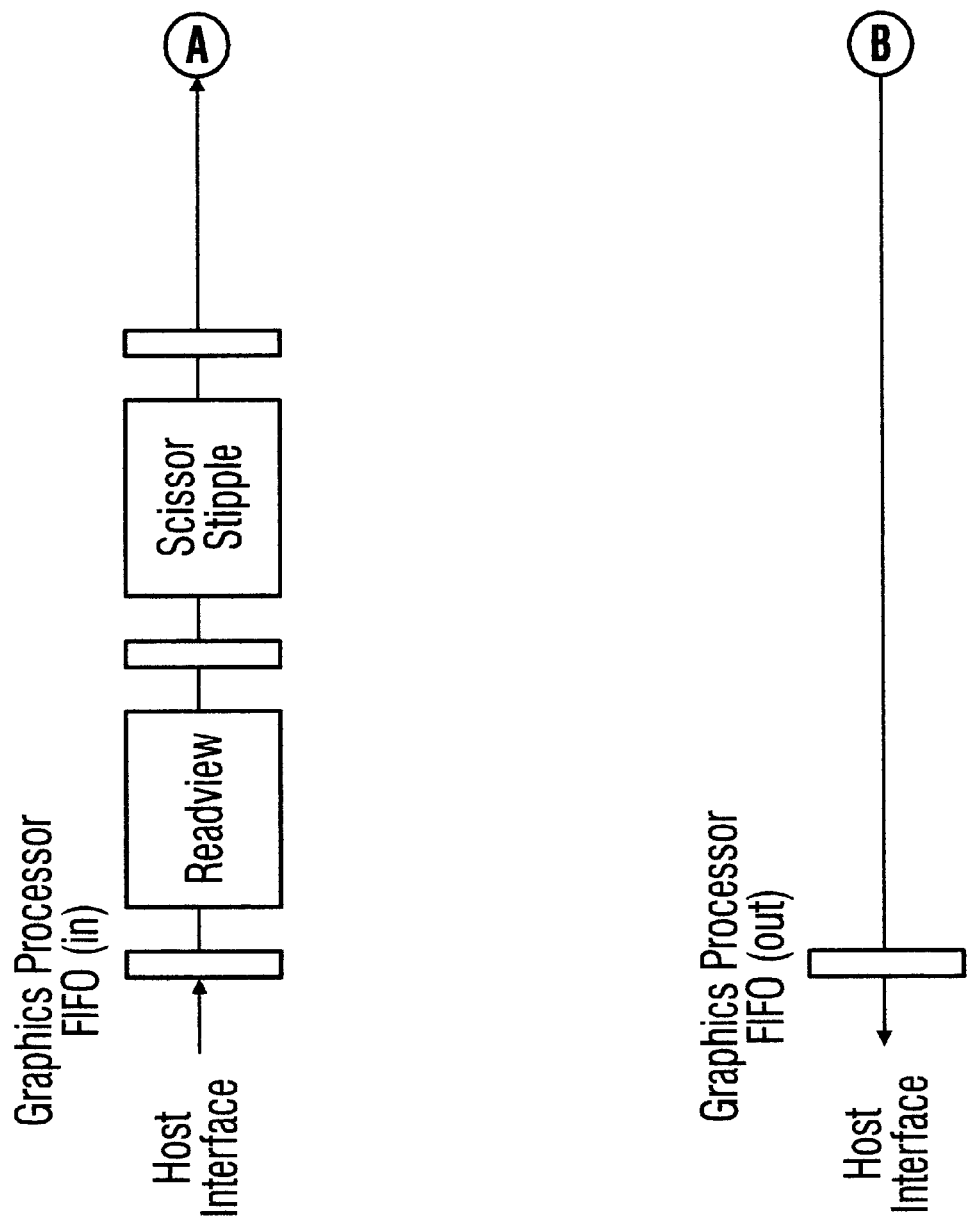
Fig. 2A ( 2 of 2 )

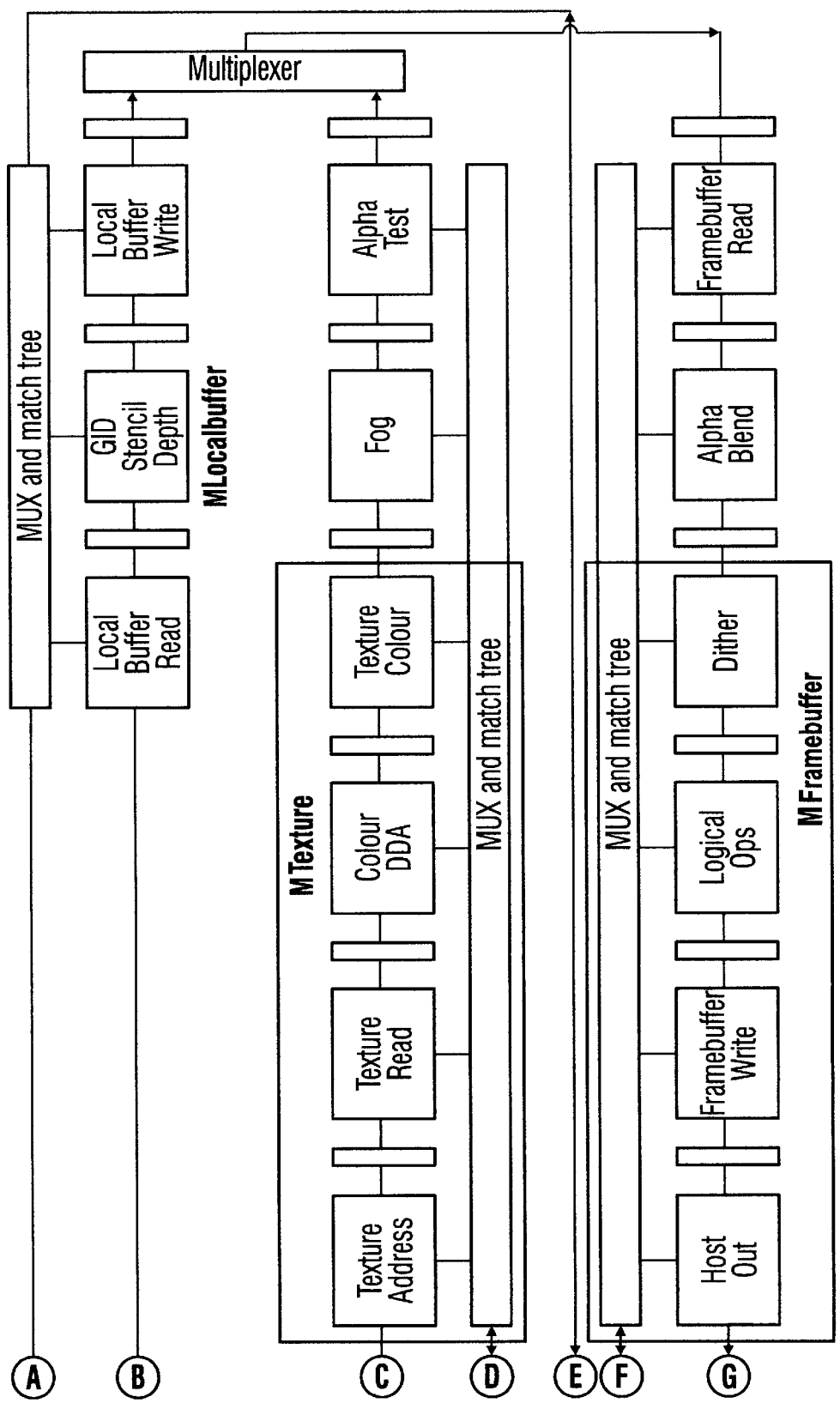
*Fig. 2D ( 1 of 2 )*

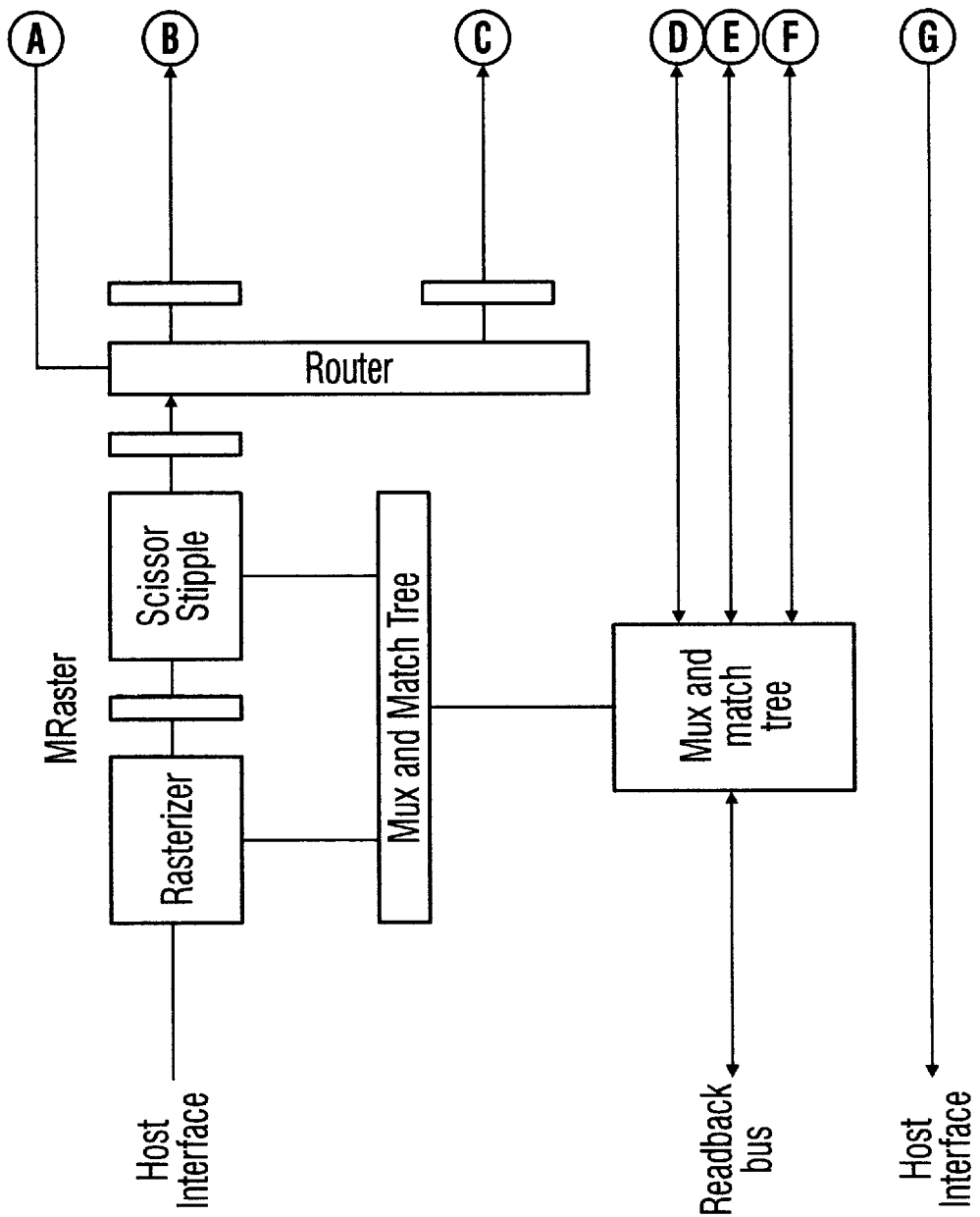
*Fig. 2D (2 of 2)*

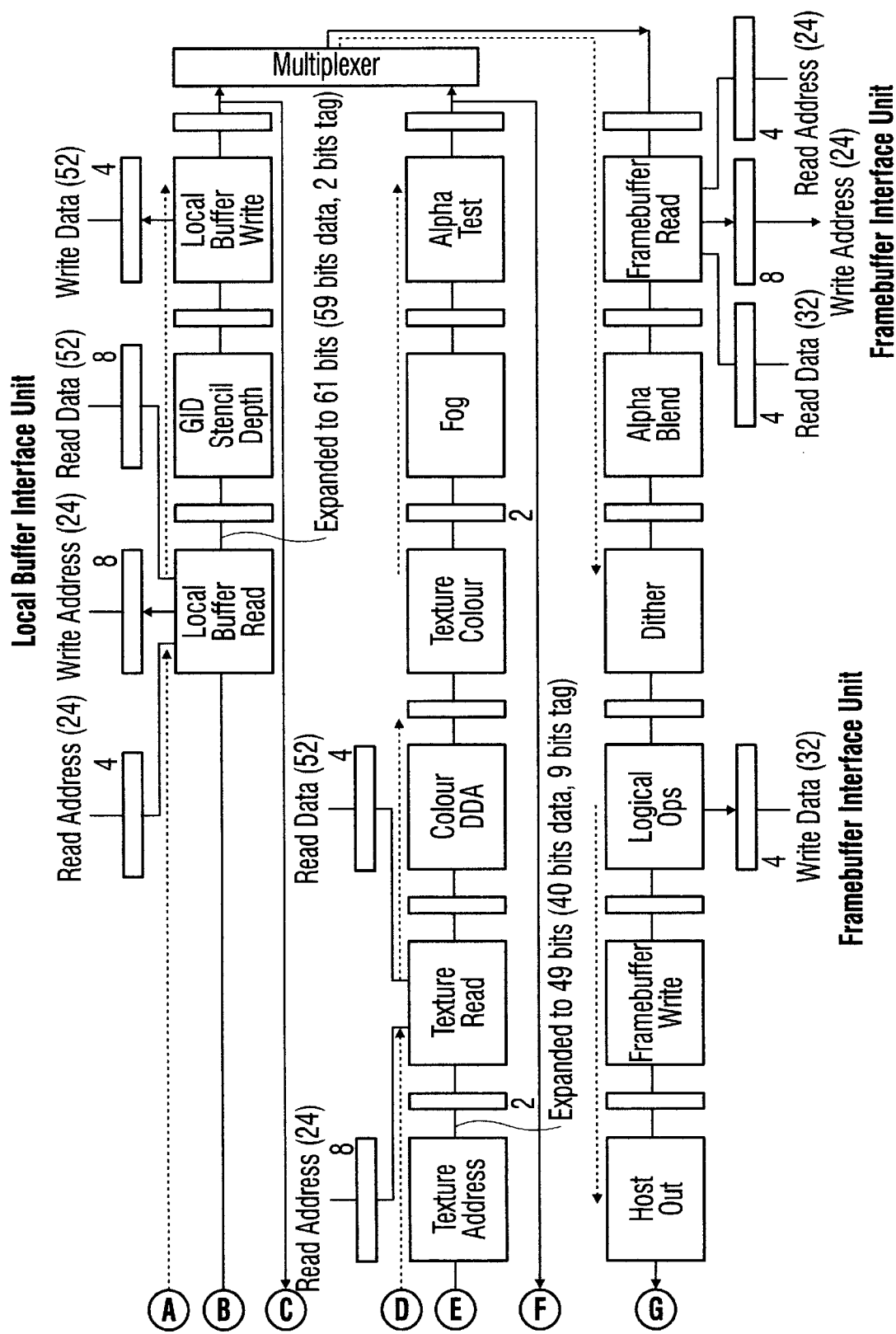
Fig. 2F (1 of 2)

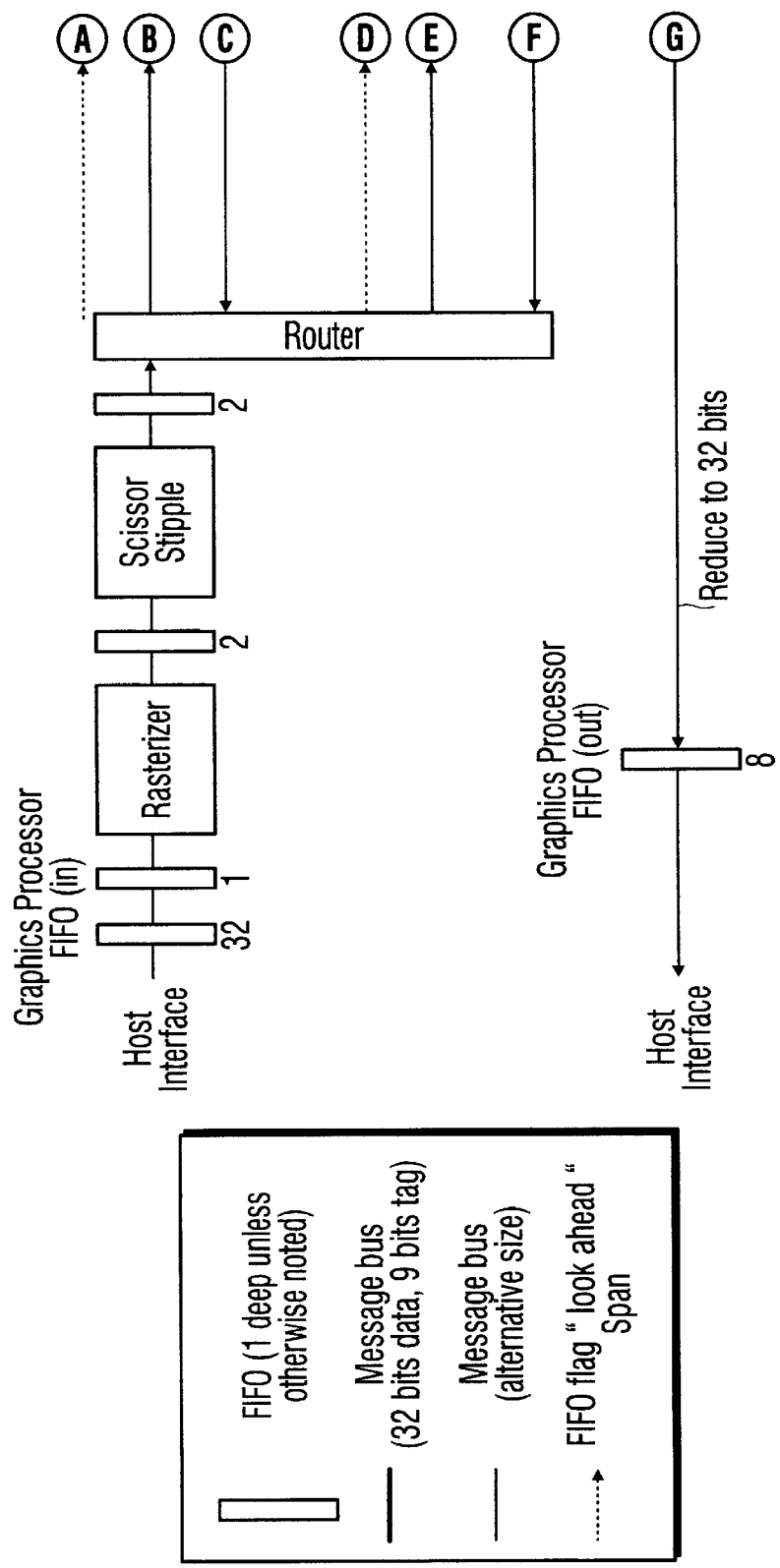
Fig. 2F (2 of 2)

GRAPHICS SYSTEM WITH OPTIMIZED USE OF UNIFIED LOCAL AND FRAME BUFFERS

CROSS-RELATED TO RELATED APPLICATION

This application claims priority from provisional No. 60/008,798, filed Dec. 18, 1995, which is hereby incorporated by reference.

BACKGROUND AND SUMMARY OF THE INVENTION

The present application relates to computer graphics and animation systems, and particularly to 3D graphics rendering hardware. Background of the art and a summary of the innovative system and method of the present application is described below. Some of the distinctions of the presently preferred embodiment are particularly noted beginning on page 8, 9.

COMPUTER GRAPHICS AND RENDERING

Modern computer systems normally manipulate graphical objects as high-level entities. For example, a solid body may be described as a collection of triangles with specified vertices, or a straight line segment may be described by listing its two endpoints with three-dimensional or two-dimensional coordinates. Such high-level descriptions are a necessary basis for high-level geometric manipulations, and also have the advantage of providing a compact format which does not consume memory space unnecessarily.

Such higher-level representations are very convenient for performing the many required computations. For example, ray-tracing or other lighting calculations may be performed, and a projective transformation can be used to reduce a three-dimensional scene to its two-dimensional appearance from a given viewpoint. However, when an image containing graphical objects is to be displayed, a very low-level description is needed. For example, in a conventional CRT display, a "flying spot" is moved across the screen (one line at a time), and the beam from each of three electron guns is switched to a desired level of intensity as the flying spot passes each pixel location. Thus at some point the image model must be translated into a data set which can be used by a conventional display. This operation is known as "rendering."

The graphics-processing system typically interfaces to the display controller through a "frame store" or "frame buffer" of special two-port memory, which can be written to randomly by the graphics processing system, but also provides the synchronous data output needed by the video output driver. (Digital-to-analog conversion is also provided after the frame buffer.) Such a frame buffer is usually implemented using VRAM memory chips (or sometimes with DRAM and special DRAM controllers). This interface relieves the graphics-processing system of most of the burden of synchronization for video output. Nevertheless, the amounts of data which must be moved around are very sizable, and the computational and data-transfer burden of placing the correct data into the frame buffer can still be very large.

Even if the computational operations required are quite simple, they must be performed repeatedly on a large number of datapoints. For example, in a typical 1995 high-end configuration, a display of 1280×1024 elements may need to be refreshed at 72 Hz, with a color resolution of 24 bits per pixel. If blending is desired, additional bits (e.g. another 8 bits per pixel) will be required to store an "alpha" or transparency value for each pixel. This implies manipulation of more than 3 billion bits per second, without allowing for any of the actual computations being performed. Thus it may be seen that this is an environment with unique data manipulation requirements.

If the display is unchanging, no demand is placed on the rendering operations. However, some common operations (such as zooming or rotation) will require every object in the image space to be re-rendered. Slow rendering will make the rotation or zoom appear jerky. This is highly undesirable. Thus efficient rendering is an essential step in translating an image representation into the correct pixel values. This is particularly true in animation applications, where newly rendered updates to a computer graphics display must be generated at regular intervals.

The rendering requirements of three-dimensional graphics are particularly heavy. One reason for this is that, even after the three-dimensional model has been translated to a two-dimensional model, some computational tasks may be bequeathed to the rendering process. (For example, color values will need to be interpolated across a triangle or other primitive.) These computational tasks tend to burden the rendering process. Another reason is that since three-dimensional graphics are much more lifelike, users are more likely to demand a fully rendered image. (By contrast, in the two-dimensional images created e.g. by a GUI or simple game, users will learn not to expect all areas of the scene to be active or filled with information.)

FIG. 1A is a very high-level view of other processes performed in a 3D graphics computer system. A three dimensional image which is defined in some fixed 3D coordinate system (a "world" coordinate system) is transformed into a viewing volume (determined by a view position and direction), and the parts of the image which fall outside the viewing volume are discarded. The visible portion of the image volume is then projected onto a viewing plane, in accordance with the familiar rules of perspective. This produces a two-dimensional image, which is now mapped into device coordinates. It is important to understand that all of these operations occur prior to the operations performed by the rendering subsystem of the present invention. FIG. 1B is an expanded version of FIG. 1A, and shows the flow of operations defined by the OpenGL standard.

A vast amount of engineering effort has been invested in computer graphics systems, and this area is one of increasing activity and demands. Numerous books have discussed the requirements of this area; see, e.g., ADVANCES IN COMPUTER GRAPHICS (ed. Enderle 1990-); Chellappa and Sawchuk, DIGITAL IMAGE PROCESSING AND ANALYSIS (1985); COMPUTER GRAPHICS HARDWARE (ed. Reghbati and Lee 1988); COMPUTER GRAPHICS: IMAGE SYNTHESIS (ed. Joy et al.); Foley et al., FUNDAMENTALS OF INTERACTIVE COMPUTER GRAPHICS (2.ed. 1984); Foley, COMPUTER GRAPHICS PRINCIPLES & PRACTICE (2.ed. 1990); Foley, INTRODUCTION TO COMPUTER GRAPHICS (1994); Giloi, Interactive Computer Graphics (1978); Hearn and Baker, COMPUTER GRAPHICS (2.ed. 1994); Hill, COMPUTER GRAPHICS (1990); Latham, DICTIONARY OF COMPUTER GRAPHICS (1991); Magnenat-Thalma, IMAGE SYNTHESIS THEORY & PRACTICE (1988); Newman and Sproull, PRINCIPLES OF INTERACTIVE COMPUTER GRAPHICS (2.ed. 1979); PICTURE ENGINEERING (ed. Fu and Kunii 1982); PICTURE PROCESSING & DIGITAL FILTERING (2.ed. Huang 1979); Prosise, HOW COMPUTER GRAPHICS WORK (1994); Rimmer, BIT MAPPED GRAPHICS (2.ed. 1993); Salmon, COMPUTER GRAPHICS SYSTEMS & CONCEPTS (1987); Schachter, COMPUTER IMAGE GENERATION (1990); Watt, THREE-DIMENSIONAL COMPUTER GRAPHICS (2.ed.

1994); Scott Whitman, MULTIPROCESSOR METHODS FOR COMPUTER GRAPHICS RENDERING; the SIGGRAPH PROCEEDINGS for the years 1980–1994; and the *IEEE Computer Graphics and Applications* magazine for the years 1990–1994; all of which are hereby incorporated by reference.

Background: Graphics Animation

In many areas of computer graphics a succession of slowly changing pictures are displayed rapidly one after the other, to give the impression of smooth movement, in much the same way as for cartoon animation. In general the higher the speed of the animation, the smoother (and better) the result.

When an application is generating animation images, it is normally necessary not only to draw each picture into the frame buffer, but also to first clear down the frame buffer, and to clear down auxiliary buffers such as depth (Z) buffers, stencil buffers, alpha buffers and others. A good treatment of the general principles may be found in *Computer Graphics: Principles and Practice*, James D. Foley et al., Reading Mass.: Addison-Wesley. A specific description of the various auxiliary buffers may be found in *The OpenGL Graphics System: A Specification* (Version 1.0), Mark Segal and Kurt Akeley, SGI.

In most applications the value written, when clearing any given buffer, is the same at every pixel location, though different values may be used in different auxiliary buffers. Thus the frame buffer is often cleared to the value which corresponds to black, while the depth (Z) buffer is typically cleared to a value corresponding to infinity.

The time taken to clear down the buffers is often a significant portion of the total time taken to draw a frame, so it is important to minimize it.

Background: Parallelism in Graphics Processing

Due to the large number of at least partially independent operations which are performed in rendering, many proposals have been made to use some form of parallel architecture for graphics (and particularly for rendering). See, for example, the special issue of *Computer Graphics* on parallel rendering (September 1994). Other approaches may be found in earlier patent filings by the assignee of the present application and its predecessors, e.g. U.S. Pat. No. 5,195,186, and published PCT applications PCT/GB90/00987, PCT/GB90/01209, PCT/GB90/01210, PCT/GB90/01212, PCT/GB90/01213, PCT/GB90/01214, PCT/GB90/01215, and PCT/GB90/01216, all of which are hereby incorporated by reference.

Background: Pipelined Processing Generally

There are several general approaches to parallel processing. One of the basic approaches to achieving parallelism in computer processing is a technique known as pipelining. In this technique the individual processors are, in effect, connected in series in an assembly-line configuration: one processor performs a first set of operations on one chunk of data, and then passes that chunk along to another processor which performs a second set of operations, while at the same time the first processor performs the first set operations again on another chunk of data. Such architectures are generally discussed in Kogge, THE ARCHITECTURE OF PIPELINED COMPUTERS (1981), which is hereby incorporated by reference.

Background: The OpenGL™ Standard

The "OpenGL" standard is a very important software standard for graphics applications. In any computer system which supports this standard, the operating system(s) and application software programs can make calls according to the OpenGL standards, without knowing exactly what the hardware configuration of the system is.

The OpenGL standard provides a complete library of low-level graphics manipulation commands, which can be used to implement three-dimensional graphics operations. This standard was originally based on the proprietary standards of Silicon Graphics, Inc., but was later transformed into an open standard. It is now becoming extremely important, not only in high-end graphics-intensive workstations, but also in high-end PCs. OpenGL is supported by Windows NT™, which makes it accessible to many PC applications.

The OpenGL specification provides some constraints on the sequence of operations. For instance, the color DDA operations must be performed before the texturing operations, which must be performed before the alpha operations. (A "DDA" or digital differential analyzer, is a conventional piece of hardware used to produce linear gradation of Other graphics interfaces (or "APIs"), such as PHIGS or XGL, superset of most of these.

The OpenGL standard is described in the OPENGL PROGRAMMING GUIDE (1993), the OPENGL REFERENCE MANUAL (1993), and a book by Segal and Akeley (of SGI) entitled THE OPENGL GRAPHICS SYSTEM: A SPECIFICATION (Version 1.0), all of which are hereby incorporated by reference.

FIG. 1B is an expanded version of FIG. 1A, and shows the flow of operations defined by the OpenGL standard. Note that the most basic model is carried in terms of vertices, and these vertices are then assembled into primitives (such as triangles, lines, etc.). After all manipulation of the primitives has been completed, the rendering operations will translate each primitive into a set of "fragments." (A fragment is the portion of a primitive which affects a single pixel.) Again, it should be noted that all operations above the block marked "Rasterization" would be performed by a host processor, or possibly by a "geometry engine" (i.e. a dedicated processor which performs rapid matrix multiplies and related data manipulations), but would normally not be performed by a dedicated rendering processor such as that of the presently preferred embodiment.

One disadvantage of standards such as OpenGL is that they require that texturing or other processor-intensive operations be performed on data before pixel elimination tests, e.g. depth testing, is performed, which wastes processor time by performing costly texturing calculations on pixels which will be eliminated later in the pipeline. When the OpenGL specification is not required or when the current OpenGl state vector cannot eliminate pixels as a result of the alpha test, however, it would be much more efficient to eliminate as many pixels as possible before doing these calculations. The present application discloses a method and device for reordering the processing steps in the rendering pipeline to either accommodate order-specific specifications such as OpenGL, or to provide for an optimized throughput by only performing processor-intensive operations on pixels which will actually be displayed.

Background: Texturing

Texture patterns are commonly used as a way to apply realistic visual detail at the sub-polygon level. See Foley et al., COMPUTER GRAPHICS: PRINCIPLES AND PRACTICE (2.ed. 1990, corr. 1995), especially at pages 741–744; Paul S. Heckbert, "Fundamentals of Texture Mapping and Image Warping," Thesis submitted to Dept. of EE and Computer Science, University of California, Berkeley, Jun. 17, 1994;

Heckbert, "Survey of Computer Graphics," IEEE Computer Graphics, November 1986, pp.56ff; all of which are hereby incorporated by reference. Since the surfaces are transformed (by the host or geometry engine) to produce a 2D view, the textures will need to be similarly transformed by a linear transform (normally projective or "affine"). (In conventional terminology, the coordinates of the object surface, i.e. the primitive being rendered, are referred to as an (s,t) coordinate space, and the map of the stored texture is referred to a (u,v) coordinate space.) The transformation in the resulting mapping means that a horizontal line in the (x,y) display space is very likely to correspond to a slanted line in the (u,v) space of the texture map, and hence many page breaks will occur, due to the texturing operation, as rendering walks along a horizontal line of pixels.

Innovative System and Methods

Particularly for low-end users, the cost of graphics hardware is important. One variable expense of graphics hardware is the cost of dedicated DRAM, VRAM, and/or other memory. Higher resolutions and performance generally require more dedicated memory. The user must therefore balance the utility of higher resolution, faster performance, and lower memory cost when selecting hardware. The present application provides for a system which allows high resolutions while requiring less memory, with a slight performance cost.

The presently preferred embodiment provides for a graphics rendering system and method utilizing a unified memory space in place of the normally separate local and frame buffers. It is possible to operate this memory by simply defining a partition between local memory and frame memory. However, the disclosed circuit includes capability for multiplexing depth and color information into the same address space (i.e. the depth-buffer and the back framebuffer can be multiplexed together). To provide this capability, there is a command for stuffing the alpha MSB (for depth/color buffer tagging).

High-Resolution Rendering

This innovative rendering system allows (along with many other capabilities) a slower high-resolution rendering procedure, which permits more resolution to be achieved (for a given local buffer size) than would otherwise be possible. Alternatively, this procedure can be used to reduce memory requirements, e.g. to allow more or bigger texture maps.

In one class of embodiments, each primitive is rendered once to provide depth values (and thus determine which pixels of each primitive are displayed), and a second time to store the color values of pixels which are to be displayed. A specified bit of the color values is used to ensure that depth data and color data, which coexist in a common memory space, cannot be confused or interchanged.

By combining the memory space of the depth buffer and back framebuffer, the user is saved the cost of individual memory spaces for each function, yet retains the high quality output of higher resolution, depth buffered graphics. To accomplish this, however, each primitive must go through a two-pass rendering process, which reduces the rendering throughput.

The first rendering pass computes the depth values for each pixel of each primitive, and stores the depth value in the combined buffer only if it is less than the value currently in the buffer, i.e. the pixel is "on top of" the previous pixel, and ignores the color data. The second rendering pass recomputes the depth and color values of each pixel of each primitive, and compares each depth value with the depth value for that pixel stored in the combined buffer. If the values are equal, indicating that the current pixel is actually to be displayed, the color data of the pixel is written to the buffer, replacing the depth value. At the same time, one bit of the color data, the most significant alpha bit in the current embodiment, is forced high. Because depth data never has this bit high, this bit effectively functions as a flag bit to ensure that color data is always distinguished from depth data.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 2A is an overview of the core graphics rendering chip which forms the basis of the presently preferred embodiment.

FIG. 2D is a different view of the graphics rendering chip of FIG. 2A, showing the connections of a readback bus which provides a diagnostic pathway.

FIG. 2F is yet another view of the graphics rendering chip of FIG. 2A, showing how the details of FIFO depth and lookahead are implemented, in the presently preferred embodiment.

DETAILED DESCRIPTION OF THE PREFERRED EMBODIMENTS

Figure 1A:
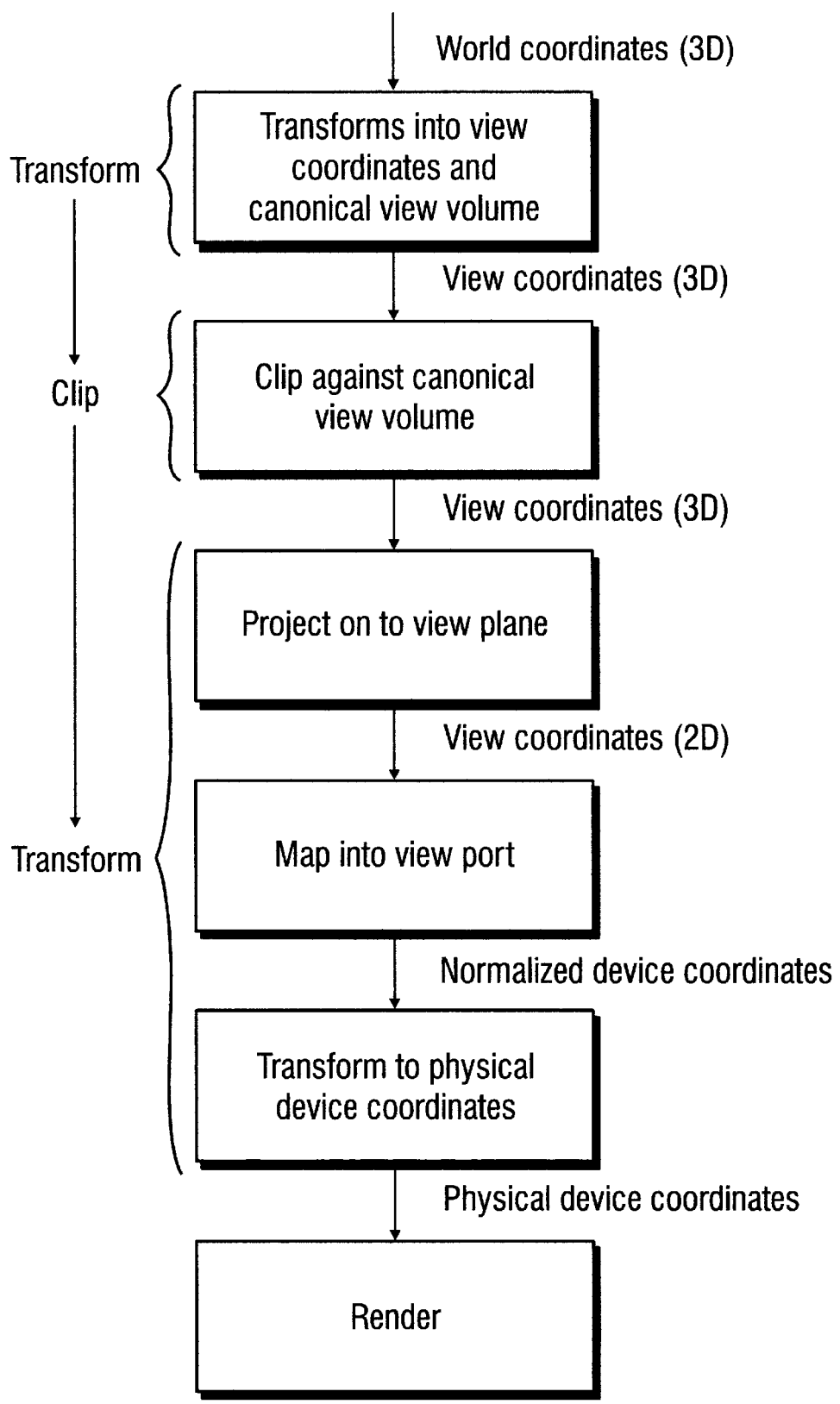
FIG. 1A, described above, is an overview of key elements and processes in a 3D graphics computer system.
Figure 1B:
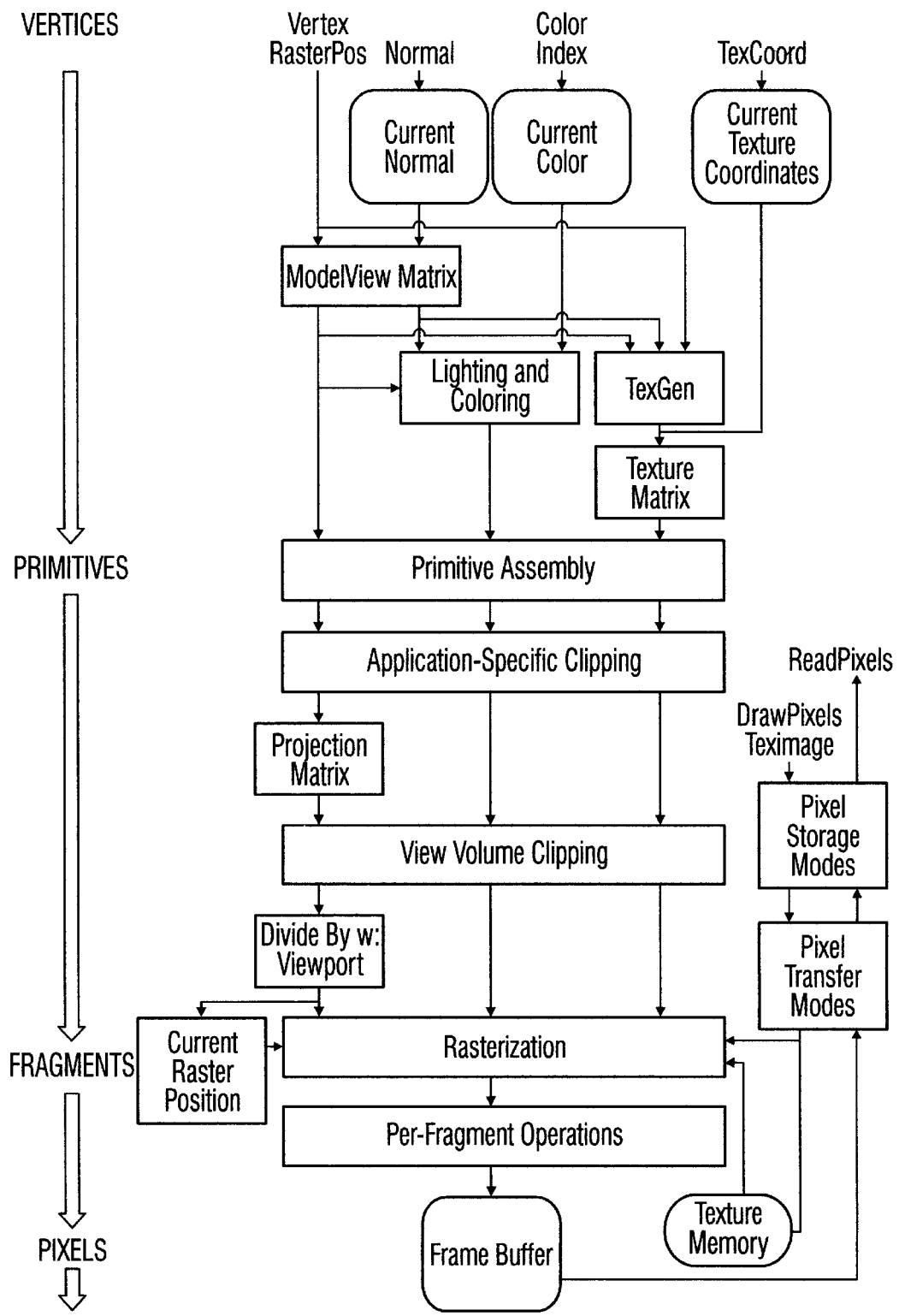
FIG. 1B is an expanded version of FIG. 1A, and shows the flow of operations defined by the OpenGL standard.

The numerous innovative teachings of the present application will be described with particular reference to the presently preferred embodiment (by way of example, and not of limitation). The presently preferred embodiment is a GLINT™ GiGi™ 3D rendering chip. The Hardware Reference Manual and Programmer's Reference Manual for this chip describe further details of this sample embodiment, and are both hereby incorporated by reference. Both are available, as of the effective filing date of this application, from 3Dlabs Inc. Ltd., 181 Metro Drive, Suite 520, San Jose Calif. 95110.

The text on pages 14–134 is taken from the description of the core graphics processor on which the presently preferred embodiment is based. The description of the particular structure and process of the presently preferred embodiment immediately follows.

The GLINT Graphics Processor

Definitions

The following definitions may help in understanding the exact meaning of terms used in the text of this application:
application: a computer program which uses graphics animation.
depth (Z) buffer: A memory buffer containing the depth component of a pixel. Used to, for example, eliminate hidden surfaces.
blt double-buffering: A technique for achieving smooth animation, by rendering only to an undisplayed back buffer, and then copying the back buffer to the front once drawing is complete.
FrameCount Planes: Used to allow higher animation rates by enabling DRAM local buffer pixel data, such as depth (Z), to be cleared down quickly.
frame buffer: An area of memory containing the displayable color buffers (front, back, left, right, overlay, underlay). This memory is typically separate from the local buffer.
local buffer: An area of memory which may be used to store non-displayable pixel information: depth(Z), stencil, FrameCount and GID planes. This memory is typically separate from the framebuffer.
pixel: Picture element. A pixel comprises the bits in all the buffers (whether stored in the local buffer or framebuffer), corresponding to a particular location in the framebuffer.
stencil buffer: A buffer used to store information about a pixel which controls how subsequent stencilled pixels at the same location may be combined with the current value in the framebuffer. Typically used to mask complex two-dimensional shapes.

Preferred Chip Embodiment—Overview

The GLINT™ high performance graphics processors combine workstation class 3D graphics acceleration, and state-of-the-art 2D performance in a single chip. All 3D rendering operations are accelerated by GLINT, including Gouraud shading, texture mapping, depth buffering, anti-aliasing, and alpha blending.

The scalable memory architecture of GLINT makes it ideal for a wide range of graphics products, from PC boards to high-end workstation accelerators.

There will be several of the GLINT family of graphics processors: the GLINT 300SX™ is the primary preferred embodiment which is described herein in great detail, and the GLINT 300TX™ is a planned alternative embodiment which is also mentioned hereinbelow. The two devices are generally compatible, with the 300TX adding local texture storage and texel address generation for all texture modes.

FIG. 2A is an overview of the graphics rendering chip of the presently preferred embodiment (i.e. the GLINT 300SX™).

General Concept

The overall architecture of the GLINT chip is best viewed using the software paradigm of a message passing system. In this system all the processing blocks are connected in a long pipeline with communication with the adjacent blocks being done through message passing. Between each block there is a small amount of buffering, the size being specific to the local communications requirements and speed of the two blocks.

The message rate is variable and depends on the rendering mode. The messages do not propagate through the system at a fixed rate typical of a more traditional pipeline system. If the receiving block can not accept a message, because its input buffer is full, then the sending block stalls until space is available.

The message structure is fundamental to the whole system as the messages are used to control, synchronize and inform each block about the processing it is to undertake. Each message has two fields—a 32 bit data field and a 9 bit tag field. (This is the minimum width guaranteed, but some local block to block connections may be wider to accommodate more data.) The data field will hold color information, coordinate information, local state information, etc. The tag field is used by each block to identify the message type so it knows how to act on it.

Each block, on receiving a message, can do one of several things:
  Not recognize the message so it just passes it on to the next block.
  Recognize it as updating some local state (to the block) so the local state is updated and the message terminated, i.e. not passed on to the next block.
  Recognize it as a processing action, and if appropriate to the unit, the processing work specific to the unit is done. This may entail sending out new messages such as Color and/or modifying the initial message before sending it on. Any new messages are injected into the message stream before the initial message is forwarded on. Some examples will clarify this.
  When the Depth Block receives a message 'new fragment', it will calculate the corresponding depth and do the depth test. If the test passes then the 'new fragment' message is passed to the next unit. If the test fails then the message is modified and passed on. The temptation is not to pass the message on when the test fails (because the pixel is not going to be updated), but other units downstream need to keep their local DDA units in step. (In the present application, the messages are being described in general terms so as not to be bogged down in detail at this stage. The details of what a 'new fragment' message actually specifies (i.e. coordinate, color information) is left till later. In general, the term "pixel" is used to describe the picture element on the screen or in memory. The term "fragment" is used to describe the part of a polygon or other primitive which projects onto a pixel. Note that a fragment may only cover a part of a pixel.)
  When the Texture Read Unit (if enabled) gets a 'new fragment' message, it will calculate the texture map addresses, and will accordingly provide 1, 2, 4 or 8 texels to the next unit together with the appropriate number of interpolation coefficients.

Each unit and the message passing are conceptually running asynchronous to all the others. However, in the presently preferred embodiment there is considerable synchrony because of the common clock.

How does the host process send messages? The message data field is the 32 bit data written by the host, and the message tag is the bottom 9 bits of the address (excluding the byte resolution address lines). Writing to a specific address causes the message type associated with that address to be inserted into the message queue. Alternatively, the on-chip DMA controller may fetch the messages from the host's memory.

The message throughput, in the presently preferred embodiment, is 50M messages per second and this gives a fragment throughput of up to 50M per second, depending on what is being rendered. Of course, this rate will predictably be further increased over time, with advances in process technology and clock rates.

Linkage

Figure 2B:
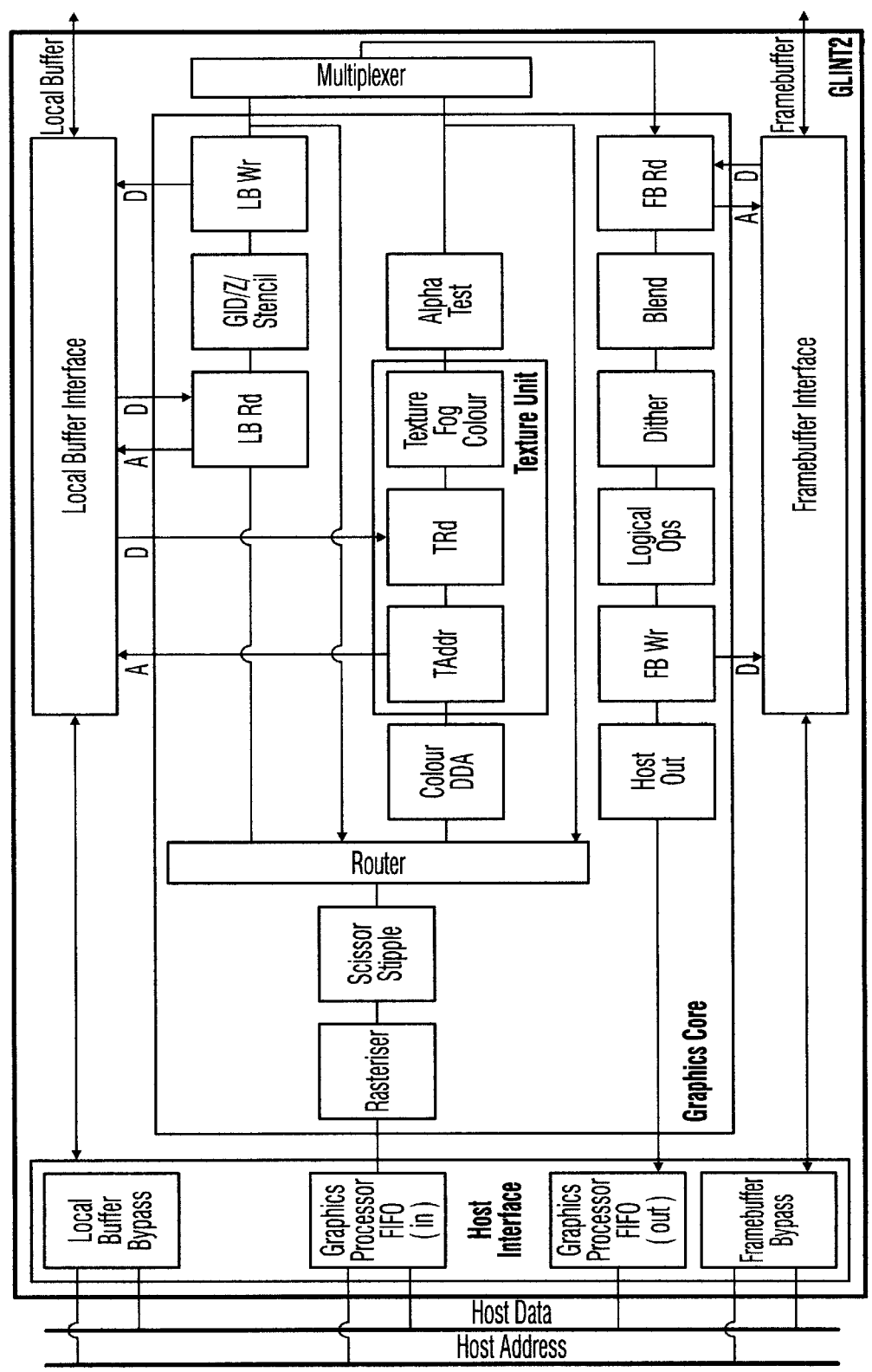
FIG. 2B is an alternative embodiment of the graphics rendering chip of FIG. 2A, which includes additional texture-manipulation capabilities.

The block diagram of FIG. 2A shows how the units are connected together in the GLINT 300SX embodiment, and the block diagram of FIG. 2B shows how the units are connected together in the GLINT 300TX embodiment. Some general points are:

The following functionality is present in the 300TX, but missing from the 300SX: The Texture Address (TAddr) and Texture Read (TRd) Units are missing. Also, the router and multiplexer are missing from this section, so the unit ordering is Scissor/Stipple, Color DDA, Texture Fog Color, Alpha Test, LB Rd, etc.

In the embodiment of FIG. 2B, the order of the units can be configured in two ways. The most general order (Router, Color DDA, Texture Unit, Alpha Test, LB Rd, GID/Z/Stencil, LB Wr, Multiplexer) and will work in all modes of OpenGL. However, when the alpha test is disabled it is much better to do the Graphics ID, depth and stencil tests before the texture operations rather than after. This is because the texture operations have a high processing cost and this should not be spent on fragments which are later rejected because of window, depth or stencil tests.

The loop back to the host at the bottom provides a simple synchronization mechanism. The host can insert a Sync command and when all the preceding rendering has finished the sync command will reach the bottom host interface which will notify the host the sync event has occurred.

Benefits

The very modular nature of this architecture gives great benefits. Each unit lives in isolation from all the others and has a very well defined set of input and output messages. This allows the internal structure of a unit (or group of units) to be changed to make algorithmic/speed/gate count trade-offs.

The isolation and well defined logical and behavioral interface to each unit allows much better testing and verification of the correctness of a unit.

The message passing paradigm is easy to simulate with software, and the hardware design is nicely partitioned. The architecture is self synchronizing for mode or primitive changes.

The host can mimic any block in the chain by inserting messages which that block would normally generate. These message would pass through the earlier blocks to the mimicked block unchanged and from then onwards to the rest of the blocks which cannot tell the message did not originate from the expected block. This allows for an easy work around mechanism to correct any flaws in the chip. It also allows other rasterization paradigms to be implemented outside of the chip, while still using the chip for the low level pixel operations.

"A Day in the Life of a Triangle"

Before we get too detailed in what each unit does it is worth while looking in general terms at how a primitive (e.g. triangle) passes through the pipeline, what messages are generated, and what happens in each unit. Some simplifications have been made in the description to avoid detail which would otherwise complicate what is really a very simple process. The primitive we are going to look at is the familiar Gouraud shaded Z buffered triangle, with dithering. It is assumed any other state (i.e. depth compare mode) has been set up, but (for simplicity) such other states will be mentioned as they become relevant.

The application generates the triangle vertex information and makes the necessary OpenGL calls to draw it.

The OpenGL server/library gets the vertex information, transforms, clips and lights it. It calculates the initial values and derivatives for the values to interpolate ($X_{left}$, $X_{right}$, red, green, blue and depth) for unit change in dx and $dxdy_{left}$. All these values are in fixed point integer and have unique message tags. Some of the values (the depth derivatives) have more than 32 bits to cope with the dynamic range and resolution so are sent in two halves Finally, once the derivatives, start and end values have been sent to GLINT the 'render triangle' message is sent.

On GLINT: The derivative, start and end parameter messages are received and filter down the message stream to the appropriate blocks. The depth parameters and derivatives to the Depth Unit; the RGB parameters and derivative to the Color DDA Unit; the edge values and derivatives to the Rasterizer Unit.

The 'render triangle' message is received by the rasterizer unit and all subsequent messages (from the host) are blocked until the triangle has been rasterized (but not necessarily written to the frame store). A 'prepare to render' message is passed on so any other blocks can prepare themselves.

The Rasterizer Unit walks the left and right edges of the triangle and fills in the spans between. As the walk progresses messages are send to indicate the direction of the next step: StepX or StepYDomEdge. The data field holds the current (x, y) coordinate. One message is sent per pixel within the triangle boundary. The step messages are duplicated into two groups: an active group and a passive group. The messages always start off in the active group but may be changed to the passive group if this pixel fails one of the tests (e.g. depth) on its path down the message stream. The two groups are distinguished by a single bit in the message tag. The step messages (in either form) are always passed throughout the length of the message stream, and are used by all the DDA units to keep their interpolation values in step. The step message effectively identifies the fragment and any other messages pertaining to this fragment will always precede the step message in the message stream.

The Scissor and Stipple Unit. This unit does 4 tests on the fragment (as embodied by the active step message). The screen scissor test takes the coordinates associated with the step message, converts them to be screen relative (if necessary) and compares them against the screen boundaries. The other three tests (user scissor, line stipple and area stipple) are disabled for this example. If the enabled tests pass then the active step is forwarded onto the next unit, otherwise it is changed into a passive step and then forwarded.

The Color DDA unit responds to an active step message by generating a Color message and sending this onto the next unit. The active step message is then forwarded to the next unit. The Color message holds, in the data field, the current RGBA value from the DDA. If the step message is passive then no Color message is generated. After the Color message is sent (or would have been sent) the step message is acted on to increment the DDA in the correct direction, ready for the next pixel.

Texturing, Fog and Alpha Tests Units are disabled so the messages just pass through these blocks.

In general terms the Local Buffer Read Unit reads the Graphic ID, Stencil and Depth information from the Local Buffer and passes it onto the next unit. More specifically it does:

1. If the step message is passive then no further action occurs.
2. On an active step message it calculates the linear address in the local buffer of the required data. This is done using the (X, Y) position recorded in the step message and locally stored information on the 'screen width' and window base address. Separate read and write addresses are calculated.
3. The addresses are passed to the Local Buffer Interface Unit and the identified local buffer location read. The write address is held for use later.
4. Sometime later the local buffer data is returned and is formatted into a consistent internal format and inserted into a 'Local Buffer Data' message and passed on to the next unit. The message data field is made wider to accommodate the maximum Local Buffer width of 52 bits (32 depth, 8 stencil, 4 graphic ID, 8 frame count) and this extra width just extends to the Local Buffer Write block. The actual data read from the local buffer can be in several formats to allow narrower width memories to be used in cost sensitive systems. The narrower data is formatted into a consistent internal format in this block.

The Graphic ID, Stencil and Depth Unit just passes the Color message through and stores the LBData message until the step message arrives. A passive step message would just pass straight through. When the active step message is received the internal Graphic ID, stencil and depth values are compared with the ones in the LBData message as specified by this unit's mode information. If the enabled tests pass then the new local buffer data is sent in the LBWriteData message to the next unit and the active step message forwarded. If any of the enabled tests fail then an LBCancelWrite message is sent followed by the equivalent passive step message. The depth DDA is stepped to update the local depth value.

The Local Buffer Write Unit performs any writes which are necessary. The LBWriteData message has its data formatted into the external local buffer format and this is posted to the Local Buffer Interface Unit to be written into the memory (the write address is already waiting in the Local Buffer Interface Unit). The LBWriteCancel message just informs the Local Buffer Interface Unit that the pending write address is no longer needed and can be discarded. The step message is just passed through.

In general terms the Framebuffer Read Unit reads the color information from the framebuffer and passes it onto the next unit. More specifically it does:

1. If the step message is passive then no further action occurs.
2. On an active step message it calculates the linear address in the framebuffer of the required data. This is done using the (X, Y) position recorded in the step message and locally stored information on the 'screen width' and window base address. Separate read and write addresses are calculated.
3. The addresses are passed to the Framebuffer Interface Unit and the identified framebuffer location read. The write address is held for use later.
4. Sometime later the color data is returned and inserted into a 'Frame Buffer Data' message and passed on to the next unit. The actual data read from the framestore can be in several formats to allow narrower width memories to be used in cost sensitive systems. The formatting of the data is deferred until the Alpha Blend Unit as it is the only unit which needs to match it up with the internal formats. In this example no alpha blending or logical operations are taking place, so reads are disabled and hence no read address is sent to the Framebuffer Interface Unit. The Color and step messages just pass through.

The Alpha Blend Unit is disabled so just passes the messages through.

The Dither Unit stores the Color message internally until an active step is received. On receiving this it uses the least significant bits of the (X, Y) coordinate information to dither the contents of the Color message. Part of the dithering process is to convert from the internal color format into the format of the framebuffer. The new color is inserted into the Color message and passed on, followed by the step message.

The Logical Operations are disabled so the Color message is just converted into the FBWriteData message (just the tag changes) and forwarded on to the next unit. The step message just passes through.

The Framebuffer Write Unit performs any writes which are necessary. The FBWriteData message has its data posted to the Framebuffer Interface Unit to be written into the memory (the write address is already waiting in the Framebuffer Interface Unit). The step message is just passed through.

The Host Out Unit is mainly concerned with synchronization with the host so for this example will just consume any messages which reach this point in the message stream.

This description has concentrated on what happens as one fragment flows down the message stream. It is important to remember that at any instant in time there are many fragments flowing down the message stream and the further down they reach the more processing has occurred.

Interfacing Between Blocks

FIG. 2A shows the FIFO buffering and lookahead connections which are used in the presently preferred embodiment. The FIFOs are used to provide an asynchronous interface between blocks, but are expensive in terms of gate count. Note that most of these FIFOs are only one stage deep (except where indicated), which reduces their area. To maintain performance, lookahead connections are used to accelerate the "startup" of the pipeline. For example, when the Local-Buffer-Read block issues a data request, the Texture/Fog/Color blocks also receive this, and begin to transfer data accordingly. Normally a single-entry deep FIFO cannot be read and written in the same cycle, as the writing side doesn't know that the FIFO is going to be read in that cycle (and hence become eligible to be written). The look-ahead feature give the writing side this insight, so that single-cycle transfer can be achieved. This accelerates the throughput of the pipeline.

Programming Model

The following text describes the programming model for GLINT.

GLINT as a Register file

The simplest way to view the interface to GLINT is as a flat block of memory-mapped registers (i.e. a register file). This register file appears as part of Region 0 of the PCI address map for GLINT. See the GLINT Hardware Reference Manual for details of this address map.

When a GLINT host software driver is initialized it can map the register file into its address space. Each register has an associated address tag, giving its offset from the base of the register file (since all registers reside on a 64-bit boundary, the tag offset is measured in multiples of 8 bytes). The most straightforward way to load a value into a register is to write the data to its mapped address. In reality the chip interface comprises a 16 entry deep FIFO, and each write to a register causes the written value and the register's address tag to be written as a new entry in the FIFO.

Programming GLINT to draw a primitive consists of writing initial values to the appropriate registers followed by a write to a command register. The last write triggers the start of rendering.

GLINT has approximately 200 registers. All registers are 32 bits wide and should be 32-bit addressed. Many registers are split into bit fields, and it should be noted that bit 0 is the least significant bit.

Register Types

GLINT has three main types of register:

Control Registers

Command Registers

Internal Registers

Control Registers are updated only by the host—the chip effectively uses them as read-only registers. Examples of control registers are the Scissor Clip unit min and max registers. Once initialized by the host, the chip only reads these registers to determine the scissor clip extents.

Command Registers are those which, when written to, typically cause the chip to start rendering (some command registers such as ResetPickResult or Sync do not initiate rendering). Normally, the host will initialize the appropriate control registers and then write to a command register to initiate drawing. There are two types of command registers: begin-draw and continue-draw. Begin-draw commands cause rendering to start with those values specified by the control registers. Continue-draw commands cause drawing to continue with internal register values as they were when the previous drawing operation completed. Making use of continue-draw commands can significantly reduce the amount of data that has to be loaded into GLINT when drawing multiple connected objects such as polylines. Examples of command registers include the Render and ContinueNewLine registers.

For convenience this application will usually refer to "sending a Render command to GLINT" rather than saying (more precisely) "the Render Command register is written to, which initiates drawing".

Internal Registers are not accessible to host software. They are used internally by the chip to keep track of changing values. Some control registers have corresponding internal registers. When a begin-draw command is sent and before rendering starts, the internal registers are updated with the values in the corresponding control registers. If a continue-draw command is sent then this update does not happen and drawing continues with the current values in the internal registers. For example, if a line is being drawn then the StartXDom and StartY control registers specify the (x, y) coordinates of the first point in the line. When a begin-draw command is sent these values are copied into internal registers. As the line drawing progresses these internal registers are updated to contain the (x, y) coordinates of the pixel being drawn. When drawing has completed the internal registers contain the (x, y) coordinates of the next point that would have been drawn. If a continue-draw command is now given these final (x, y) internal values are not modified and further drawing uses these values. If a begin-draw command had been used the internal registers would have been reloaded from the StartXDom and StartY registers.

For the most part internal registers can be ignored. It is helpful to appreciate that they exist in order to understand the continue-draw commands.

GLINT I/O Interface

There are a number of ways of loading GLINT registers for a given context:

The host writes a value to the mapped address of the register

The host writes address-tag/data pairs into a host memory buffer and uses the on-chip DMA to transfer this data to the FIFO.

The host can perform a Block Command Transfer by writing address and data values to the FIFO interface registers.

In all cases where the host writes data values directly to the chip (via the register file) it has to worry about FIFO overflow. The InFIFOSpace register indicates how many free entries remain in the FIFO. Before writing to any register the host must ensure that there is enough space left in the FIFO. The values in this register can be read at any time. When using DMA, the DMA controller will automatically ensure that there is room in the FIFO before it performs further transfers. Thus a buffer of any size can be passed to the DMA controller.

FIFO Control

The description above considered the GLINT interface to be a register file. More precisely, when a data value is written to a register this value and the address tag for that register are combined and put into the FIFO as a new entry. The actual register is not updated until GLINT processes this entry. In the case where GLINT is busy performing a time consuming operation (e.g. drawing a large texture mapped polygon), and not draining the FIFO very quickly, it is possible for the FIFO to become full. If a write to a register is performed when the FIFO is full no entry is put into the FIFO and that write is effectively lost.

The input FIFO is 16 entries deep and each entry consists of a tag/data pair. The InFIFOSpace register can be read to determine how many entries are free. The value returned by this register will never be greater than 16.

To check the status of the FIFO before every write is very inefficient, so it is preferably checked before loading the data for each rectangle. Since the FIFO is 16 entries deep, a further optimization is to wait for all 16 entries to be free after every second rectangle. Further optimizations can be made by moving dXDom, dXSub and dY outside the loop (as they are constant for each rectangle) and doing the FIFO wait after every third rectangle.

The InFIFOSpace FIFO control register contains a count of the number of entries currently free in the FIFO. The chip increments this register for each entry it removes from the FIFO and decrements it every time the host puts an entry in the FIFO.

The DMA Interface

Loading registers directly via the FIFO is often an inefficient way to download data to GLINT. Given that the FIFO can accommodate only a small number of entries, GLINT has to be frequently interrogated to determine how much space is left. Also, consider the situation where a given API function requires a large amount of data to be sent to GLINT. If the FIFO is written directly then a return from this function is not possible until almost all the data has been consumed by GLINT. This may take some time depending on the types of primitives being drawn.

To avoid these problems GLINT provides an on-chip DMA controller which can be used to load data from arbitrary sized (<64K 32-bit words) host buffers into the FIFO. In its simplest form the host software has to prepare a host buffer containing register address tag descriptions and data values. It then writes the base address of this buffer to the DMAAddress register and the count of the number of words to transfer to the DMACount register. Writing to the DMACount register starts the DMA transfer and the host can now perform other work. In general, if the complete set of rendering commands required by a given call to a driver function can be loaded into a single DMA buffer then the driver function can return. Meanwhile, in parallel, GLINT is reading data from the host buffer and loading it into its FIFO. FIFO overflow never occurs since the DMA controller automatically waits until there is room in the FIFO before doing any transfers.

The only restriction on the use of DMA control registers is that before attempting to reload the DMACount register the host software must wait until previous DMA has completed. It is valid to load the DMAAddress register while the previous DMA is in progress since the address is latched internally at the start of the DMA transfer.

Using DMA leaves the host free to return to the application, while in parallel, GLINT is performing the DMA and drawing. This can increase performance significantly over loading a FIFO directly. In addition, some algorithms require that data be loaded multiple times (e.g. drawing the same object across multiple clipping rectangles). Since the GLINT DMA only reads the buffer data, it can be downloaded many times simply by restarting the DMA. This can be very beneficial if composing the buffer data is a time consuming task.

The host can use this hardware capability in various ways. For example, a further optional optimization is to use a double buffered mechanism with two DMA buffers. This allows the second buffer to be filled before waiting for the previous DMA to complete, thus further improving the parallelism between host and GLINT processing. Thus, this optimization is dependent on the allocation of the host memory. If there is only one DMA host buffer then either it is being filled or it is being emptied—it cannot be filled and emptied at the same time, since there is no way for the host and DMA to interact once the DMA transfer has started. The host is at liberty to allocate as many DMA buffers as it wants; two is the minimum to do double buffering, but allocating many small buffers is generally better, as it gives the benefits of double buffering together with low latency time, so GLINT is not idle while large buffer is being filled up. However, use of many small buffers is of course more complicated.

In general the DMA buffer format consists of a 32-bit address tag description word followed by one or more data words. The DMA buffer consists of one or more sets of these formats. The following paragraphs describe the different types of tag description words that can be used.

DMA Tag Description Format

There are 3 different tag addressing modes for DMA: hold, increment and indexed. The different DMA modes are provided to reduce the amount of data which needs to be transferred, hence making better use of the available DMA bandwidth. Each of these is described in the following sections.

Hold Format

In this format the 32-bit tag description contains a tag value and a count specifying the number of data words following in the buffer. The DMA controller writes each of the data words to the same address tag. For example, this is useful for image download where pixel data is continuously written to the Color register. The bottom 9 bits specify the register to which the data should be written; the high-order 16 bits specify the number of data words (minus 1) which follow in the buffer and which should be written to the address tag (note that the 2-bit mode field for this format is zero so a given tag value can simply be loaded into the low order 16 bits).

A special case of this format is where the top 16 bits are zero indicating that a single data value follows the tag (i.e. the 32-bit tag description is simply the address tag value itself). This allows simple DMA buffers to be constructed which consist of tag/data pairs.

Increment Format

This format is similar to the hold format except that as each data value is loaded the address tag is incremented (the value in the DMA buffer is not changed; GLINT updates an internal copy). Thus, this mode allows contiguous GLINT registers to be loaded by specifying a single 32-bit tag value followed by a data word for each register. The low-order 9 bits specify the address tag of the first register to be loaded. The 2 bit mode field is set to 1 and the high-order 16 bits are set to the count (minus 1) of the number of registers to update. To enable use of this format, the GLINT register file has been organized so that registers which are frequently loaded together have adjacent address tags. For example, the 32 AreaStipplePattern registers can be loaded as follows:

AreaStipplePattern0, Count=31, Mode=1 row 0 bits row 1 bits

. . .

row 31 bits

Indexed Format

GLINT address tags are 9 bit values. For the purposes of the Indexed DMA Format they are organized into major groups and within each group there are up to 16 tags. The low-order 4 bits of a tag give its offset within the group. The high-order 5 bits give the major group number.

The following Register Table lists the individual registers with their Major Group and Offset in the presently preferred embodiment:

Register Table

The following table lists registers by group, giving their tag values and indicating their type. The register groups may be used to improve data transfer rates to GLINT when using DMA.

The following types of register are distinguished:

| Unit | Register | Major Group (hex) | Offset (hex) | Type |
|---|---|---|---|---|
| Rasterizer | StartXDom | 00 | 0 | Control |
| | dXDom | 00 | 1 | Control |
| | StartXSub | 00 | 2 | Control |
| | dXSub | 00 | 3 | Control |
| | StartY | 00 | 4 | Control |
| | dY | 00 | 5 | Control |
| | Count | 00 | 6 | Control |
| | Render | 00 | 7 | Command |
| | ContinueNewLine | 00 | 8 | Command |
| | ContinueNewDom | 00 | 9 | Command |
| | ContinueNewSub | 00 | A | Command |
| | Continue | 00 | B | Command |
| | FlushSpan | 00 | C | Command |
| | BitMaskPattern | 00 | D | Mixed |
| Rasterizer | PointTable[0–3] | 01 | 0–3 | Control |
| | RasterizerMode | 01 | 4 | Control |
| Scissor Stipple | ScissorMode | 03 | 0 | Control |
| | ScissorMinXY | 03 | 1 | Control |
| | ScissorMaxXY | 03 | 2 | Control |
| | ScreenSize | 03 | 3 | Control |
| | AreaStippleMode | 03 | 4 | Control |
| | LineStippleMode | 03 | 5 | Control |
| | LoadLineStipple Counters | 03 | 6 | Control |
| | UpdateLineStipple Counters | 03 | 7 | Command |
| | SaveLineStipple State | 03 | 8 | Command |
| | WindowOrigin | 03 | 9 | Control |
| Scissor Stipple | AreaStipplePattern[0–31] | 04 05 | 0-F 0-F | Control |
| Texture Color/Fog | Texel0 | 0C | 0 | Control |
| | Texel1 | 0C | 1 | Control |
| | Texel2 | 0C | 2 | Control |
| | Texel3 | 0C | 3 | Control |
| | Texel4 | 0C | 4 | Control |
| | Texel5 | 0C | 5 | Control |
| | Texel6 | 0C | 6 | Control |
| | Texel7 | 0C | 7 | Control |
| | Interp0 | 0C | 8 | Control |
| | Interp1 | 0C | 9 | Control |
| | Interp2 | 0C | A | Control |
| | Interp3 | 0C | B | Control |
| | Interp4 | 0C | C | Control |
| | TextureFilter | 0C | D | Control |
| Texture/Fog Color | TextureColor Mode | 0D | 0 | Control |
| | TextureEnvColor | 0D | 1 | Control |
| | FogMode | 0D | 2 | Control |
| | FogColor | 0D | 3 | Control |
| | FStart | 0D | 4 | Control |
| | dFdx | 0D | 5 | Control |
| | dFdyDom | 0D | 6 | Control |
| Color DDA | RStart | 0F | 0 | Control |
| | dRdx | 0F | 1 | Control |
| | dRdyDom | 0F | 2 | Control |
| | GStart | 0F | 3 | Control |
| | dGdx | 0F | 4 | Control |
| | dGdyDom | 0F | 5 | Control |
| | BStart | 0F | 6 | Control |
| | dBdx | 0F | 7 | Control |
| | dBdyDom | 0F | 8 | Control |
| | AStart | 0F | 9 | Control |
| | dAdx | 0F | A | Control |
| | dAdyDom | 0F | B | Control |
| | ColorDDAMode | 0F | C | Control |
| | ConstantColor | 0F | D | Control |
| | Color | 0F | E | Mixed |
| Alpha Test | AlphaTestMode | 10 | 0 | Control |
| | AntialiasMode | 10 | 1 | Control |
| Alpha Blend | AlphaBlendMode | 10 | 2 | Control |
| Dither | DitherMode | 10 | 3 | Control |
| Logical Ops | FBSoftwareWrite Mask | 10 | 4 | Control |
| | LogicalOpMode | 10 | 5 | Control |
| | FBWriteData | 10 | 6 | Control |
| LB Read | LBReadMode | 11 | 0 | Control |
| | LBReadFormat | 11 | 1 | Control |
| | LBSourceOffset | 11 | 2 | Control |
| | LBStencil | 11 | 5 | Output |
| | LBDepth | 11 | 6 | Output |
| | LBWindowBase | 11 | 7 | Control |
| LB Write | LBWriteMode | 11 | 8 | Control |
| | LBWriteFormat | 11 | 9 | Control |
| GID/Stencil/ Depth | Window | 13 | 0 | Control |
| | StencilMode | 13 | 1 | Control |
| | StencilData | 13 | 2 | Control |
| | Stencil | 13 | 3 | Mixed |
| | DepthMode | 13 | 4 | Control |
| | Depth | 13 | 5 | Mixed |
| | ZStartU | 13 | 6 | Control |
| | ZStartL | 13 | 7 | Control |
| | dZdxU | 13 | 8 | Control |
| | dZdxL | 13 | 9 | Control |
| | dZdyDomU | 13 | A | Control |
| | dZdyDomL | 13 | B | Control |
| | FastClearDepth | 13 | C | Control |
| FB Read | FBReadMode | 15 | 0 | Control |
| | FBSourceOffset | 15 | 1 | Control |
| | FBPixelOffset | 15 | 2 | Control |
| | FBColor | 15 | 3 | Output |
| | FBWindowBase | 15 | 6 | Control |
| FB Write | FBWriteMode | 15 | 7 | Control |
| | FBHardwareWrite Mask | 15 | 8 | Control |
| | FBBlockColor | 15 | 9 | Control |
| Host Out | FilterMode | 18 | 0 | Control |
| | StatisticMode | 18 | 1 | Control |
| | MinRegion | 18 | 2 | Control |
| | MaxRegion | 18 | 3 | Control |
| | ResetPickResult | 18 | 4 | Command |
| | MinHitRegion | 18 | 5 | Command |
| | MaxHitRegion | 18 | 6 | Command |
| | PickResult | 18 | 7 | Command |
| | Sync | 18 | 8 | Command |

This format allows up to 16 registers within a group to be loaded while still only specifying a single address tag description word.

If the Mode of the address tag description word is set to indexed mode, then the high-order 16 bits are used as a mask to indicate which registers within the group are to be used. The bottom 4 bits of the address tag description word are unused. The group is specified by bits 4 to 8. Each bit in the mask is used to represent a unique tag within the group. If a bit is set then the corresponding register will be loaded. The number of bits set in the mask determines the number of data words that should be following the tag description word in the DMA buffer. The data is stored in order of increasing corresponding address tag.

DMA Buffer Addresses

Host software must generate the correct DMA buffer address for the GLINT DMA controller. Normally, this means that the address passed to GLINT must be the physical address of the DMA buffer in host memory. The buffer must also reside at contiguous physical addresses as accessed by GLINT. On a system which uses virtual memory for the address space of a task, some method of allocating contiguous physical memory, and mapping this into the address space of a task, must be used.

If the virtual memory buffer maps to non-contiguous physical memory, then the buffer must be divided into sets of contiguous physical memory pages and each of these sets transferred separately. In such a situation the whole DMA buffer cannot be transferred in one go; the host software must wait for each set to be transferred. Often the best way to handle these fragmented transfers is via an interrupt handler.

DMA Interrupts

GLINT provides interrupt support, as an alternative means of determining when a DMA transfer is complete. If enabled, the interrupt is generated whenever the DMACount register changes from having a non-zero to having a zero value. Since the DMACount register is decremented every time a data item is transferred from the DMA buffer this happens when the last data item is transferred from the DMA buffer.

To enable the DMA interrupt, the DMAInterruptEnable bit must be set in the IntEnable register. The interrupt handler should check the DMAFlag bit in the IntFlags register to determine that a DMA interrupt has actually occurred. To clear the interrupt a word should be written to the IntFlags register with the DMAFlag bit set to one.

This scheme frees the processor for other work while DMA is being completed. Since the overhead of handling an interrupt is often quite high for the host processor, the scheme should be tuned to allow a period of polling before sleeping on the interrupt.

Output FIFO and Graphics Processor FIFO Interface

To read data back from GLINT an output FIFO is provided. Each entry in this FIFO is 32-bits wide and it can hold tag or data values. Thus its format is unlike the input FIFO whose entries are always tag/data pairs (we can think of each entry in the input FIFO as being 41 bits wide: 9 bits for the tag and 32 bits for the data). The type of data written by GLINT to the output FIFO is controlled by the FilterMode register. This register allows filtering of output data in various categories including the following:

Depth: output in this category results from an image upload of the Depth buffer.

Stencil: output in this category results from an image upload of the Stencil buffer.

Color: output in this category results from an image upload of the framebuffer.

Synchronization: synchronization data is sent in response to a Sync command.

The data for the FilterMode register consists of 2 bits per category. If the least significant of these two bits is set (0x1) then output of the register tag for that category is enabled; if the most significant bit is set (0x2) then output of the data for that category is enabled. Both tag and data output can be enabled at the same time. In this case the tag is written first to the FIFO followed by the data.

For example, to perform an image upload from the framebuffer, the FilterMode register should have data output enabled for the Color category. Then, the rectangular area to be uploaded should be described to the rasterizer. Each pixel that is read from the framebuffer will then be placed into the output FIFO. If the output FIFO becomes full, then GLINT will block internally until space becomes available. It is the programmer's responsibility to read all data from the output FIFO. For example, it is important to know how many pixels should result from an image upload and to read exactly this many from the FIFO.

To read data from the output FIFO the OutputFIFOWords register should first be read to determine the number of entries in the FIFO (reading from the FIFO when it is empty returns undefined data). Then this many 32-bit data items are read from the FIFO. This procedure is repeated until all the expected data or tag items have been read. The address of the output FIFO is described below.

Note that all expected data must be read back. GLINT will block if the FIFO becomes full. Programmers must be careful to avoid the deadlock condition that will result if the host is waiting for space to become free in the input FIFO while GLINT is waiting for the host to read data from the output FIFO.

Graphics Processor FIFO Interface

GLINT has a sequence of 1K×32 bit addresses in the PCI Region 0 address map called the Graphics Processor FIFO Interface. To read from the output FIFO any address in this range can be read (normally a program will choose the first address and use this as the address for the output FIFO). All 32-bit addresses in this region perform the same function: the range of addresses is provided for data transfer schemes which force the use of incrementing addresses.

Writing to a location in this address range provides raw access to the input FIFO. Again, the first address is normally chosen. Thus the same address can be used for both input and output FIFOs. Reading gives access to the output FIFO; writing gives access to the input FIFO.

Writing to the input FIFO by this method is different from writing to the memory mapped register file. Since the register file has a unique address for each register, writing to this unique address allows GLINT to determine the register for which the write is intended. This allows a tag/data pair to be constructed and inserted into the input FIFO. When writing to the raw FIFO address an address tag description must first be written followed by the associated data. In fact, the format of the tag descriptions and the data that follows is identical to that described above for DMA buffers. Instead of using the GLINT DMA it is possible to transfer data to GLINT by constructing a DMA-style buffer of data and then copying each item in this buffer to the raw input FIFO address. Based on the tag descriptions and data written GLINT constructs tag/data pairs to enter as real FIFO entries. The DMA mechanism can be thought of as an automatic way of writing to the raw input FIFO address.

Note, that when writing to the raw FIFO address the FIFO full condition must still be checked by reading the InFIFOSpace register. However, writing tag descriptions does not cause any entries to be entered into the FIFO: such a write simply establishes a set of tags to be paired with the subsequent data. Thus, free space need be ensured only for actual data items that are written (not the tag values). For example, in the simplest case where each tag is followed by a single data item, assuming that the FIFO is empty, then 32 writes are possible before checking again for free space.

Other Interrupts

GLINT also provides interrupt facilities for the following:

Sync: If a Sync command is sent and the Sync interrupt has been enabled then once all rendering has been completed, a data value is entered into the Host Out FIFO, and a Sync interrupt is generated when this value reaches the output end of the FIFO. Synchronization is described further in the next section.

External: this provides the capability for external hardware on a GLINT board (such as an external video timing generator) to generate interrupts to the host processor.

Error: if enabled the error interrupt will occur when GLINT detects certain error conditions, such as an attempt to write to a full FIFO.

Vertical Retrace: if enabled a vertical retrace interrupt is generated at the start of the video blank period.

Each of these are enabled and cleared in a similar way to the DMA interrupt.

Synchronization

There are three main cases where the host must synchronize with GLINT:

before reading back from registers before directly accessing the framebuffer or the localbuffer via the bypass mechanism framebuffer management tasks such as double buffering Synchronizing with GLINT implies waiting for any pending DMA to complete and waiting for the chip to complete any processing currently being performed. The following pseudo-code shows the general scheme:

```
GLINTData data ;
// wait for DMA to complete
while (*DMACount != 0) {
    poll or wait for interrupt
}
while (*InFIFOSpace < 2) {
    ;    // wait for free space in the FIFO
}
// enable sync output and send the Sync command
data.Word = 0 ;
data.FilterMode.Synchronization = 0x1 ;
FilterMode (data.Word) ;
Sync(0x0) ;
/* wait for the sync output data */
do {
    while (*OutFIFOWords == 0)
        ;    // poll waiting for data in output
    FIFO
}while (*OutputFIFO != Sync_tag) ;
```

Initially, we wait for DMA to complete as normal. We then have to wait for space to become free in the FIFO (since the DMA controller actually loads the FIFO). We need space for 2 registers: one to enable generation of an output sync value, and the Sync command itself. The enable flag can be set at initialization time. The output value will be generated only when a Sync command has actually been sent, and GLINT has then completed all processing.

Rather than polling it is possible to use a Sync interrupt as mentioned in the previous section. As well as enabling the interrupt and setting the filter mode, the data sent in the Sync command must have the most significant bit set in order to generate the interrupt. The interrupt is generated when the tag or data reaches the output end of the Host Out FIFO. Use of the Sync interrupt has to be considered carefully as GLINT will generally empty the FIFO more quickly than it takes to set up and handle the interrupt.

Host Framebuffer Bypass

Normally, the host will access the framebuffer indirectly via commands sent to the GLINT FIFO interface. However, GLINT does provide the whole framebuffer as part of its address space so that it can be memory mapped by an application. Access to the framebuffer via this memory mapped route is independent of the GLINT FIFO.

Drivers may choose to use direct access to the framebuffer for algorithms which are not supported by GLINT. The framebuffer bypass supports big-endian, little-endian and GIB-endian formats.

A driver making use of the framebuffer bypass mechanism should synchronize framebuffer accesses made through the FIFO with those made directly through the memory map. If data is written to the FIFO and then an access is made to the framebuffer, it is possible that the framebuffer access will occur before the commands in the FIFO have been fully processed. This lack of temporal ordering is generally not desirable.

Framebuffer Dimensions and Depth

At reset time the hardware stores the size of the framebuffer in he FBMemoryControl register. This register can be read by software to determine the amount of VRAM on the display adapter. For a given amount of VRAM, software can configure different screen resolutions and off-screen memory regions.

The framebuffer width must be set up in the FBReadMode register. The first 9 bits of this register define 3 partial products which determine the offset in pixels from one scanline to the next. Typically, these values will be worked out at initialization time and a copy kept in software. When this register needs to be modified the software copy is retrieved and any other bits modified before writing to the register.

Once the offset from one scanline to the next has been established, determining the visible screen width and height becomes a clipping issue. The visible screen width and height are set up in the ScreenSize register and enabled by setting the ScreenScissorEnable bit in the ScissorMode register.

The framebuffer depth (8, 16 or 32-bit) is controlled by the FBModeSel register. This register provides a 2 bit field to control which of the three pixel depths is being used. The pixel depth can be changed at any time but this should not be attempted without first synchronizing with GLINT. The FBModeSel register is not a FIFO register and is updated immediately it is written. If GLINT is busy performing rendering operations, changing the pixel depth will corrupt that rendering.

Normally, the pixel depth is set at initialization time. To optimize certain 2D rendering operations it may be desirable to change it at other times. For example, if the pixel depth is normally 8 (or 16) bits, changing the pixel depth to 32 bits for the duration of a bitblt can quadruple (or double) the blt speed, when the blt source and destination edges are aligned on 32 bit boundaries. Once such a blt sequence has been set up the host software must wait and synchronize with GLINT and then reset the pixel depth before continuing with further rendering. It is not possible to change the pixel depth via the FIFO, thus explicit synchronization must always be used.

Host Localbuffer Bypass

As with the framebuffer, the localbuffer can be mapped in and accessed directly. The host should synchronize with GLINT before making any direct access to the localbuffer.

At reset time the hardware saves the size of the localbuffer in the LBMemoryControl register (localbuffer visible region size). In bypass mode the number of bits per pixel is either 32 or 64. This information is also set in the LBMemoryControl register (localbuffer bypass packing). This pixel packing defines the memory offset between one pixel and the next. A further set of 3 bits (localbuffer width) in the LBMemoryControl register defines the number of valid bits per pixel. A typical localbuffer configuration might be 48 bits per pixel but in bypass mode the data for each pixel starts on a 64-bit boundary. In this case valid pixel data will be contained in bits 0 to 47. Software must set the LBReadFormat register to tell GLINT how to interpret these valid bits.

Host software must set the width in pixels of each scanline of the localbuffer in the LBReadMode FIFO register. The first 9 bits of this register define 3 partial products which determine the offset in pixels from one scanline to the next. As with the framebuffer partial products, these values will usually be worked out at initialization time and a copy kept in software. When this register needs to be modified the software copy is retrieved and any other bits modified before writing to the register. If the system is set up so that each pixel in the framebuffer has a corresponding pixel in the localbuffer then this width will be the same as that set for the framebuffer.

The localbuffer is accessible via Regions 1 and 3 of the PCI address map for GLINT. The localbuffer bypass supports big-endian and little-endian formats. These are described in a later section.

Register Read Back

Under some operating environments, multiple tasks will want access to the GLINT chip. Sometimes a server task or driver will want to arbitrate access to GLINT on behalf of multiple applications. In these circumstances, the state of the GLINT chip may need to be saved and restored on each context switch. To facilitate this, the GLINT control registers can be read back. (However, internal and command registers cannot be read back.)

To perform a context switch the host must first synchronize with GLINT. This means waiting for outstanding DMA to complete, sending a Sync command and waiting for the sync output data to appear in the output FIFO. After this the registers can be read back.

To read a GLINT register the host reads the same address which would be used for a write, i.e. the base address of the register file plus the offset value for the register.

Note that since internal registers cannot be read back care must be taken when context switching a task which is making use of continue-draw commands. Continue-draw commands rely on the internal registers maintaining previous state. This state will be destroyed by any rendering work done by a new task. To prevent this, continue-draw commands should be performed via DMA since the context switch code has to wait for outstanding DMA to complete. Alternatively, continue-draw commands can be performed in a non-preemptable code segment.

Normally, reading back individual registers should be avoided. The need to synchronize with the chip can adversely affect performance. It is usually more appropriate to keep a software copy of the register which is updated when the actual register is updated.

Byte Swapping

Internally GLINT operates in little-endian mode. However, GLINT is designed to work with both big- and little-endian host processors. Since the PCIBus specification defines that byte ordering is preserved regardless of the size of the transfer operation, GLINT provides facilities to handle byte swapping. Each of the Configuration Space, Control Space, Framebuffer Bypass and Localbuffer Bypass memory areas have both big and little endian mappings available. The mapping to use typically depends on the endian ordering of the host processor.

The Configuration Space may be set by a resistor in the board design to be either little endian or big endian.

The Control Space in PCI address region 0, is 128K bytes in size, and consists of two 64K sized spaces. The first 64K provides little endian access to the control space registers; the second 64K provides big endian access to the same registers.

The framebuffer bypass consists of two PCI address regions: Region 2 and Region 4. Each is independently configurable to by the Aperture0 and Aperture1 control registers respectively, to one of three modes: no byte swap, 16-bit swap, full byte swap. Note that the 16 bit mode is needed for the following reason. If the framebuffer is configured for 16-bit pixels and the host is big-endian then simply byte swapping is not enough when a 32-bit access is made (to write two pixels). In this case, the required effect is that the bytes are swapped within each 16-bit word, but the two 16-bit halves of the 32-bit word are not swapped. This preserves the order of the pixels that are written as well as the byte ordering within each pixel. The 16 bit mode is referred to as GIB-endian in the PCI Multimedia Design Guide, version 1.0.

The localbuffer bypass consists of two PCI address regions: Region 1 and Region 3. Each is independently configurable to by the Aperture0 and Aperture1 control registers respectively, to one of two modes: no byte swap, full byte swap.

To save on the size of the address space required for GLINT, board vendors may choose to turn off access to the big endian regions (3 and 4) by the use of resistors on the board.

There is a bit available in the DMAControl control register to enable byte swapping of DMA data. Thus for big-endian hosts, this control bit would normally be enabled.

Red and Blue Swapping

For a given graphics board the RAMDAC and/or API will usually force a given interpretation for true color pixel values. For example, 32-bit pixels will be interpreted as either ARGB (alpha at byte 3, red at byte 2, green at byte 1 and blue at byte 0) or ABGR (blue at byte 2 and red at byte 0). The byte position for red and blue may be important for software which has been written to expect one byte order or the other, in particular when handling image data stored in a file.

GLINT provides two registers to specify the byte positions of blue and red internally. In the Alpha Blend Unit the AlphaBlendMode register contains a 1-bit field called ColorOrder. If this bit is set to zero then the byte ordering is ABGR; if the bit is set to one then the ordering is ARGB. As well as setting this bit in the Alpha Blend unit, it must also be set in the Color Formatting unit. In this unit the DitherMode register contains a Color Order bit with the same interpretation. The order applies to all of the true color pixel formats, regardless of the pixel depth.

Hardware Data Structures

Some of the hardware data structure implementations used in the presently preferred embodiment will now be described in detail. Of course these examples are provided merely to illustrate the presently preferred embodiment in great detail, and do not necessarily delimit any of the claimed inventions.

Localbuffer

The localbuffer holds the per pixel information corresponding to each displayed pixel and any texture maps. The per pixel information held in the localbuffer are Graphic ID (GID), Depth, Stencil and Frame Count Planes (FCP). The possible formats for each of these fields, and their use are covered individually in the following sections.

The maximum width of the localbuffer is 48 bits, but this can be reduced by changing the external memory configuration, albeit at the expense of reducing the functionality or dynamic range of one or more of the fields.

The localbuffer memory can be from 16 bits (assuming a depth buffer is always needed) to 48 bits wide in steps of 4 bits. The four fields supported in the localbuffer, their allowed lengths and positions are shown in the following table:

| Field | Lengths | Start bit positions |
| --- | --- | --- |
| Depth | 16, 24, 32 | 0 |
| Stencil | 0, 4, 8 | 16, 20, 24, 28, 32 |
| FrameCount | 0, 4, 8 | 16, 20, 24, 28, 32, 36, 40 |
| GID | 0, 4 | 16, 20, 24, 28, 32, 36, 40, 44, 48 |

The order of the fields is as shown with the depth field at the least significant end and GID field at the most significant end. The GID is at the most significant end so that various combinations of the Stencil and FrameCount field widths can be used on a per window basis without the position of the GID fields moving. If the GID field is in a different positions in different windows then the ownership tests become impossible to do.

The GID, FrameCount, Stencil and Depth fields in the localbuffer are converted into the internal format by right justification if they are less than their internal widths, i.e. the unused bits are the most significant bits and they are set to 0.

The format of the localbuffer is specified in two places: the LBReadFormat register and the LBWriteFormat register.

It is still possible to part populate the localbuffer so other combinations of the field widths are possible (i.e. depth field width of 0), but this may give problems if texture maps are to be stored in the localbuffer as well.

Any non-bypass read or write to the localbuffer always reads or writes all 48 bits simultaneously.

GID field

The 4 bit GID field is used for pixel ownership tests to allow per pixel window clipping. Each window using this facility is assigned one of the GID values, and the visible pixels in the window have their GID field set to this value. If the test is enabled the current GID (set to correspond with the current window) is compared with the GID in the localbuffer for each fragment. If they are equal this pixel belongs to the window so the localbuffer and framebuffer at this coordinate may be updated.

Using the GID field for pixel ownership tests is optional and other methods of achieving the same result are:

- clip the primitive to the window's boundary (or rectangular tiles which make up the window's area) and render only the visible parts of the primitive
- use the scissor test to define the rectangular tiles which make up the window's visible area and render the primitive once per tile (This may be limited to only those tiles which the primitive intersects).

Depth Field

The depth field holds the depth (Z) value associated with a pixel and can be 16, 24 or 32 bits wide.

Stencil Field

The stencil field holds the stencil value associated with a pixel and can be 0, 4 or 8 bits wide.

The width of the stencil buffer is also stored in the StencilMode register and is needed for clamping and masking during the update methods. The stencil compare mask should be set up to exclude any absent bits from the stencil compare operation.

FrameCount Field

The Frame Count Field holds the frame count value associated with a pixel and can be 0, 4 or 8 bits wide. It is used during animation to support a fast clear mechanism to aid the rapid clearing of the depth and/or stencil fields needed at the start of each frame.

In addition to the fast clear mechanism the extent of all updates to the localbuffer and framebuffer can be recorded (MinRegion and MaxRegion registers) and read back (MinHitRegion and MaxHitRegion commands) to give the bounding box of the smallest area to clear. For some applications this will be significantly smaller than the whole window or screen, and hence faster.

The fast clear mechanism provides a method where the cost of clearing the depth and stencil buffers can be amortized over a number of clear operations issued by the application. This works as follows:

The window is divided up into n regions, where n is the range of the frame counter (16 or 256). Every time the application issues a clear command the reference frame counter is incremented (and allowed to roll over if it exceeds its maximum value) and the nth region is cleared only. The clear updates the depth and/or stencil buffers to the new values and the frame count buffer with the reference value. This region is much smaller than the full window and hence takes less time to clear.

When the localbuffer is subsequently read and the frame count is found to be the same as the reference frame count (held in the Window register) the localbuffer data is used directly. However, if the frame count is found to be different from the reference frame count (held in the Window register) the data which would have been written, if the localbuffer had been cleared properly, is substituted for the stale data returned from the read. Any new writes to the localbuffer will set the frame count to the reference value so the next read on this pixel works normally without the substitution. The depth data to substitute is held in the FastClearDepth register and the stencil data to substitute is held in the StencilData register (along with other stencil information).

The fast clear mechanism does not present a total solution as the user can elect to clear just the stencil planes or just the depth planes, or both. The situation where the stencil planes only are 'cleared' using the fast clear method, then some rendering is done and then the depth planes are 'cleared' using the fast clear will leave ambiguous pixels in the localbuffer. The driver software will need to catch this situation, and fall back to using a per pixel write to do the second clear. Which field(s) the frame count plane refers to is recorded in the Window register.

When clear data is substituted for real memory data (during normal rendering operations) the depth write mask and stencil write masks are ignored to mimic the OpenGL operation when a buffer is cleared.

Localbuffer Coordinates

The coordinates generated by the rasterizer are 16 bit 2's complement numbers, and so have the range +32767 to −32768. The rasterizer will produce values in this range, but any which have a negative coordinate, or exceed the screen width or height (as programmed into the ScreenSize register) are discarded.

Coordinates can be defined window relative or screen relative and this is only relevant when the coordinate gets converted to an actual physical address in the localbuffer. In general it is expected that the windowing system will use absolute coordinates and the graphics system will use relative coordinates (to be independent of where the window really is).

GUI systems (such as Windows, Windows NT and X) usually have the origin of the coordinate system at the top left corner of the screen but this is not true for all graphics systems. For instance OpenGL uses the bottom left corner as its origin. The WindowOrigin bit in the LBReadMode register selects the top left (0) or bottom left (1) as the origin.

The actual equations used to calculate the localbuffer address to read and write are:

Bottom left origin:
Destination address=LBWindowBase−Y*W+X
Source address=LBWindowBase−Y*W+X+LBSourceOffset Top left origin:
Destination address=LBWindowBase+Y*W+X
Source address=LBWindowBase+Y*W+X+LBSourceOffset where:

X is the pixel's X coordinate.

Y is the pixel's Y coordinate.

LBWindowBase holds the base address in the localbuffer of the current window.

LBSourceOffset is normally zero except during a copy operation where data is read from one address and written to another address. The offset between source and destination is held in the LBSourceOffset register.

W is the screen width. Only a subset of widths are supported and these are encoded into the PP0, PP1 and PP2 fields in the LBReadMode register.

These address calculations translate a 2D address into a linear address.

The Screen width is specified as the sum of selected partial products so a full multiply operation is not needed. The partial products are selected by the fields PP0, PP1 and PP2 in the LBReadMode register.

For arbitrary width screens, for instance bitmaps in 'off screen' memory, the next largest width from the table must be chosen. The difference between the table width and the bitmap width will be an unused strip of pixels down the right hand side of the bitmap.

Note that such bitmaps can be copied to the screen only as a series of scanlines rather than as a rectangular block. However, often windowing systems store offscreen bitmaps in rectangular regions which use the same stride as the screen. In this case normal bitblts can be used.

Texture Memory

The localbuffer is used to hold textures in the GLINT 300TX variant. In the GLINT 300SX variant the texture information is supplied by the host.

Framebuffer

The framebuffer is a region of memory where the information produced during rasterization is written prior to being displayed. This information is not restricted to color but can include window control data for LUT management and double buffering.

The framebuffer region can hold up to 32 MBytes and there are very few restrictions on the format and size of the individual buffers which make up the video stream. Typical buffers include:

True color or color index main planes,

Overlay planes,

Underlay planes,

Window ID planes for LUT and double buffer management,

Cursor planes.

Any combination of these planes can be supported up to a maximum of 32 MBytes, but usually it is the video level processing which is the limiting factor. The following text examines the options and choices available from GLINT for rendering, copying, etc. data to these buffers.

To access alternative buffers either the FBPixelOffset register can be loaded, or the base address of the window held in the FBWindow-Base register can be redefined. This is described in more detail below.

Buffer Organization

Each buffer resides at an address in the framebuffer memory map. For rendering and copying operations the actual buffer addresses can be on any pixel boundary. Display hardware will place some restrictions on this as it will need to access the multiple buffers in parallel to mix the buffers together depending on their relative priority, opacity and double buffer selection. For instance, visible buffers (rather than offscreen bitmaps) will typically need to be on a page boundary.

Consider the following highly configured example with a 1280×1024 double buffered system with 32 bit main planes (RGBA), 8 bit overlay and 4 bits of window control information (WID).

Combining the WID and overlay planes in the same 32 bit pixel has the advantage of reducing the amount of data to copy when a window moves, as only two copies are required—one for the main planes and one for the overlay and WID planes.

Note the position of the overlay and WID planes. This was not an arbitrary choice but one imposed by the (presumed) desire to use the color processing capabilities of GLINT (dither and interpolation) in the overlay planes. The conversion of the internal color format to the external one stored in the framebuffer depends on the size and position of the component. Note that GLINT does not support all possible configurations. For example; if the overlay and WID bits were swapped, then eight bit color index starting at bit 4 would be required to render to the overlay, but this is not supported.

Framebuffer Coordinates

Coordinate generation for the framebuffer is similar to that for the localbuffer, but there are some key differences.

As was mentioned before, the coordinates generated by the rasterizer are 16 bit 2's complement numbers. Coordinates can be defined as window relative or screen relative, though this is only relevant when the coordinate gets converted to an actual physical address in the framebuffer. The WindowOrigin bit in the FBReadMode register selects top left (0) or bottom left (1) as the origin for the framebuffer.

The actual equations used to calculate the framebuffer address to read and write are:

Bottom left origin:
Destination address=FBWindowBase−Y*W+X+FBPixelOffset
Source address=FBWindowBase−Y*W+X+FBPixelOffset+FBSourceOffset Top left origin:
Destination address=FBWindowBase+Y*W+X+FBPixelOffset
Source address=FBWindowBase+Y*W+X+FBPixelOffset+FBSourceOffset These address calculations translate a 2D address into a linear address, so non power of two framebuffer widths (i.e. 1280) are economical in memory.

The width is specified as the sum of selected partial products so a full multiply operation is not needed. The partial products are selected by the fields PP0, PP1 and PP2 in the FBReadMode register. This is the same mechanism as is used to set the width of the localbuffer, but the widths may be set independently.

For arbitrary screen sizes, for instance when rendering to 'off screen' memory such as bitmaps the next largest width from the table must be chosen. The difference between the table width and the bitmap width will be an unused strip of pixels down the right hand side of the bitmap.

Note that such bitmaps can be copied to the screen only as a series of scanlines rather than as a rectangular block.

However, often windowing systems store offscreen bitmaps in rectangular regions which use the same stride as the screen. In this case normal bitblts can be used.

Color Formats

The contents of the framebuffer can be regarded in two ways:

As a collection of fields of up to 32 bits with no meaning or assumed format as far as GLINT is concerned. Bit planes may be allocated to control cursor, LUT, multi-buffer visibility or priority functions. In this case GLINT will be used to set and clear bit planes quickly but not perform any color processing such as interpolation or dithering. All the color processing can be disabled so that raw reads and writes are done and the only operations are write masking and logical ops. This allows the control planes to be updated and modified as necessary. Obviously this technique can also be used for overlay buffers, etc. providing color processing is not required.

As a collection of one or more color components. All the processing of color components, except for the final write mask and logical ops are done using the internal color format of 8 bits per red, green, blue and alpha color channels. The final stage before write mask and logical ops processing converts the internal color format to that required by the physical configuration of the framebuffer and video logic. The nomenclature n@m means this component is n bits wide and starts at bit position m in the framebuffer. The least significant bit position is 0 and a dash in a column indicates that this component does not exist for this mode. The ColorOrder is specified by a bit in the DitherMode register.

Some important points to note:

The alpha channel is always associated with the RGB color channels rather than being a separate buffer. This allows it to be moved in parallel and to work correctly in multi-buffer updates and double buffering. If the framebuffer is not configured with an alpha channel (e.g. 24 bit framebuffer width with 8:8:8:8 RGB format) then some of the rendering modes which use the retained alpha buffer cannot be used. In these cases the NoAlphaBuffer bit in the AlphaBlendMode register should be set so that an alpha value of 255 is substituted. For the RGB modes where no alpha channel is present (e.g. 3:3:2) then this substitution is done automatically.

For the Front and Back modes the data value is replicated into both buffers.

All writes to the framebuffer try to update all 32 bits irrespective of the color format. This may not matter if the memory planes don't exist, but if they are being used (as overlay planes, for example) then the write masks (FBSoftwareWriteMask or FBHardwareWriteMask) must be set up to protect the alternative planes.

When reading the framebuffer RGBA components are scaled to their internal width of 8 bits, if needed for alpha blending.

CI values are left justified with the unused bits (if any) set to zero and are subsequently processed as the red component. The result is replicated into each of the streams G,B and A giving four copies for CI8 and eight copies for CI4.

The 4:4:4:4 Front and Back formats are designed to support 12 bit double buffering with 4 bit Alpha, in a 32 bit system.

The 3:3:2 Front and Back formats are designed to support 8 bit double buffering in a 16 bit system.

The 1:2:1 Front and Back formats are designed to support 4 bit double buffering in an 8 bit system.

It is possible to have a color index buffer at other positions as long as reduced functionality is acceptable. For example a 4 bit CI buffer at bit position 16 can be achieved using write masking and 4:4:4:4 Front format with color interpolation, but dithering is lost.

The format information needs to be stored in two places: the DitherMode register and the AlphaBlendMode register.

|  | Format | Name | R | G | B | A |
|---|---|---|---|---|---|---|
| Color Order: RGB | 0 | 8:8:8:8 | 8@0 | 8@8 | 8@16 | 8@24 |
|  | 1 | 5:5:5:5 | 5@0 | 5@5 | 5@10 | 5@15 |
|  | 2 | 4:4:4:4 | 4@0 | 4@4 | 4@8 | 4@12 |
|  | 3 | 4:4:4:4 Front | 4@0 4@4 | 4@8 4@12 | 4@16 4@20 | 4@24 4@28 |
|  | 4 | 4:4:4:4 Back | 4@0 4@4 | 4@8 4@12 | 4@16 4@20 | 4@24 4@28 |
|  | 5 | 3:3:2 Front | 3@0 3@8 | 3@3 3@11 | 2@6 2@14 | — |
|  | 6 | 3:3:2 Back | 3@0 3@8 | 3@3 3@11 | 2@6 2@14 | — |
|  | 7 | 1:2:1 Front | 1@0 1@4 | 2@1 2@5 | 1@3 1@7 | — |
|  | 8 | 1:2:1 Back | 1@0 1@4 | 2@1 2@5 | 1@3 1@7 | — |
| Color Order: BGR | 0 | 8:8:8:8 | 8@16 | 8@8 | 8@0 | 8@24 |
|  | 1 | 5:5:5:5 | 5@10 | 5@5 | 5@0 | 5@15 |
|  | 2 | 4:4:4:4 | 4@8 | 4@4 | 4@0 | 4@12 |
|  | 3 | 4:4:4:4 Front | 4@16 4@20 | 4@8 4@12 | 4@0 4@4 | 4@24 4@28 |
|  | 4 | 4:4:4:4 Back | 4@16 4@20 | 4@8 4@12 | 4@0 4@4 | 4@24 4@28 |
|  | 5 | 3:3:2 Front | 3@5 3@13 | 3@2 3@10 | 2@0 2@8 | — |
|  | 6 | 3:3:2 Back | 3@5 3@13 | 3@2 3@10 | 2@0 2@8 | — |
|  | 7 | 1:2:1 Front | 1@3 1@7 | 2@1 2@5 | 1@0 1@4 | — |
|  | 8 | 1:2:1 Back | 1@3 1@7 | 2@1 2@5 | 1@0 1@4 | — |
| CI | 14 | C18 | 8@0 | 0 | 0 | 0 |
|  | 15 | C14 | 4@0 | 0 | 0 | 0 |

Overlays and Underlays

In a GUI system there are two possible relationships between the overlay planes (or underlay) and the main planes.

The overlay planes are fixed to the main planes, so that if the window is moved then both the data in the main planes and overlay planes move together.

The overlay planes are not fixed to the main planes but floating, so that moving a window only moves the associated main or overlay planes.

In the fixed case both planes can share the same GID. The pixel offset is used to redirect the reads and writes between the main planes and the overlay (underlay) buffer. The pixel ownership tests using the GID field in the localbuffer work as expected.

In the floating case different GIDs are the best choice, because the same GID planes in the localbuffer can not be used for pixel ownership tests. The alternatives are not to use the GID based pixel ownership tests for one of the buffers but rely on the scissor clipping, or to install a second set of GID planes so each buffer has it's own set. GLINT allows either approach.

If rendering operations to the main and overlay planes both need the depth or stencil buffers, and the windows in each overlap then each buffer will need its own exclusive depth and/or stencil buffers. This is easily achieved with GLINT by assigning different regions in the localbuffer to each of the buffers. Typically this would double the localbuffer memory requirements.

One scenario where the above two considerations do not cause problems, is when the overlay planes are used exclusively by the GUI system, and the main planes are used for the 3D graphics.

VRAM Modes

High performance systems will typically use VRAM for the framebuffer and the extended functionality of VRAM over DRAM can be used to enhance performance for many rendering tasks.

Hardware Write Masks.

These allow write masking in the framebuffer without incurring a performance penalty. If hardware write masks are not available, GLINT must be programmed to read the memory, merge the value with the new value using the write mask, and write it back.

To use hardware write masking, the required write mask is written to the FBHardwareWriteMask register, the FBSoftwareWriteMask register should be set to all 1's, and the number of framebuffer reads is set to 0 (for normal rendering). This is achieved by clearing the ReadSource and ReadDestination enables in the FBReadMode register.

To use software write masking, the required write mask is written to the FBSoftwareWriteMask register and the number of framebuffer reads is set to 1 (for normal rendering). This is achieved by setting the ReadDestination enable in the FBReadMode register.

Block Writes

Block writes cause consecutive pixels in the framebuffer to be written simultaneously. This is useful when filling large areas but does have some restrictions:

No pixel level clipping is available;

No depth or stencil testing can be done;

All the pixels must be written with the same value so no color interpolation, blending, dithering or logical ops can be done; and The area is defined in screen relative coordinates.

Block writes are not restricted to rectangular areas and can be used for any trapezoid. Hardware write masking is available during block writes.

The following registers need to be set up before block fills can be used:

FBBlockColor register with the value to write to each pixel; and

FBWriteMode register with the block width field.

Sending a Render command with the PrimitiveType field set to "trapezoid" and the FastFillEnable and FastFillIncrement fields set up will then cause block filling of the area. Note that during a block fill of a trapezoid any inappropriate state is ignored so even if color interpolation, depth testing and logical ops, for example, are enabled they have no effect.

The block sizes supported are 8, 16 and 32 pixels. GLINT takes care of filling any partial blocks at the end of spans.

Graphics Programming

GLINT provides a rich variety of operations for 2D and 3D graphics supported by its Pipelined architecture.

The Graphics Pipeline

Figure 2C:
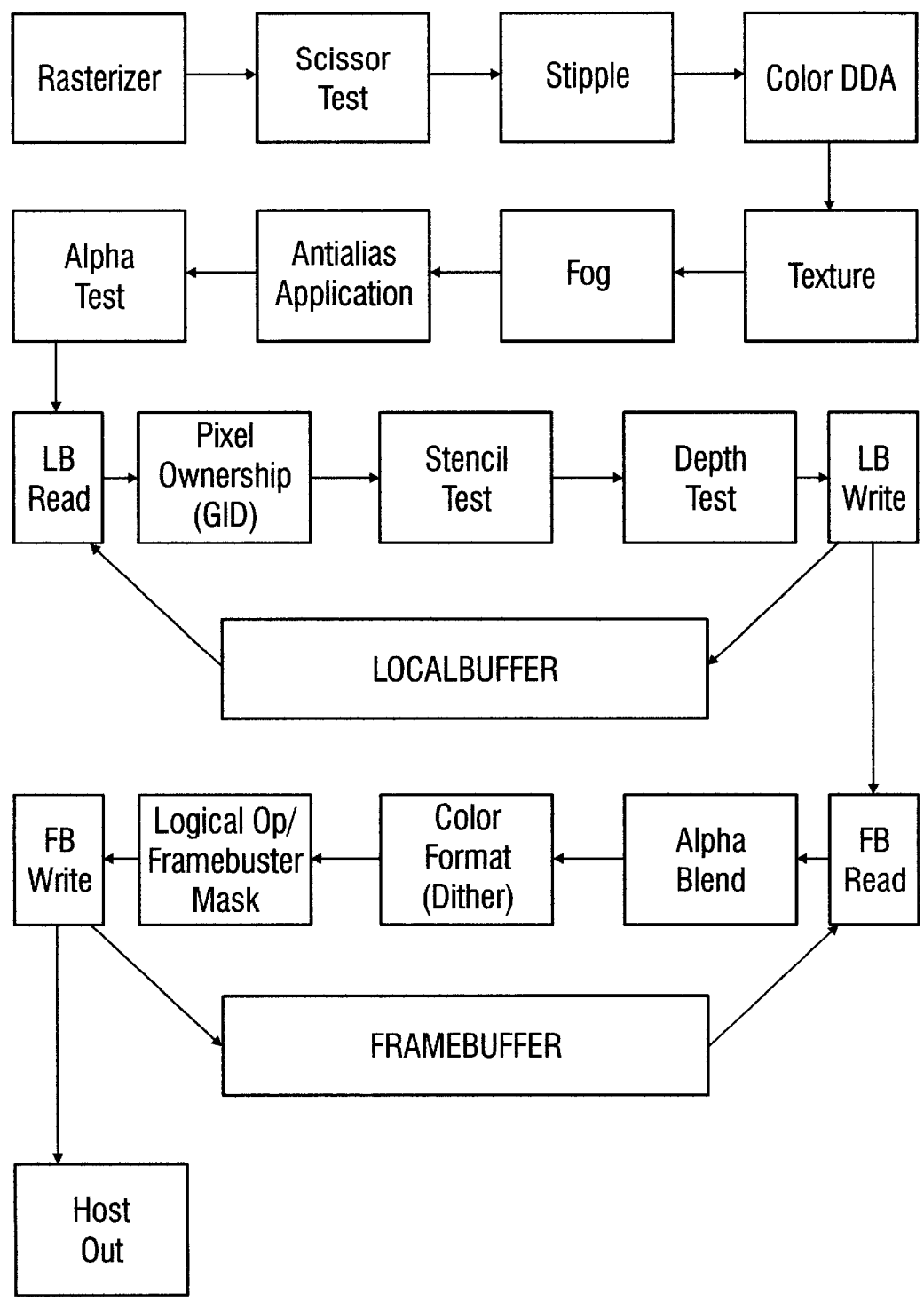
FIG. 2C is a more schematic view of the sequence of operations performed in the graphics rendering chip of FIG. 2A.
Figure 2E:
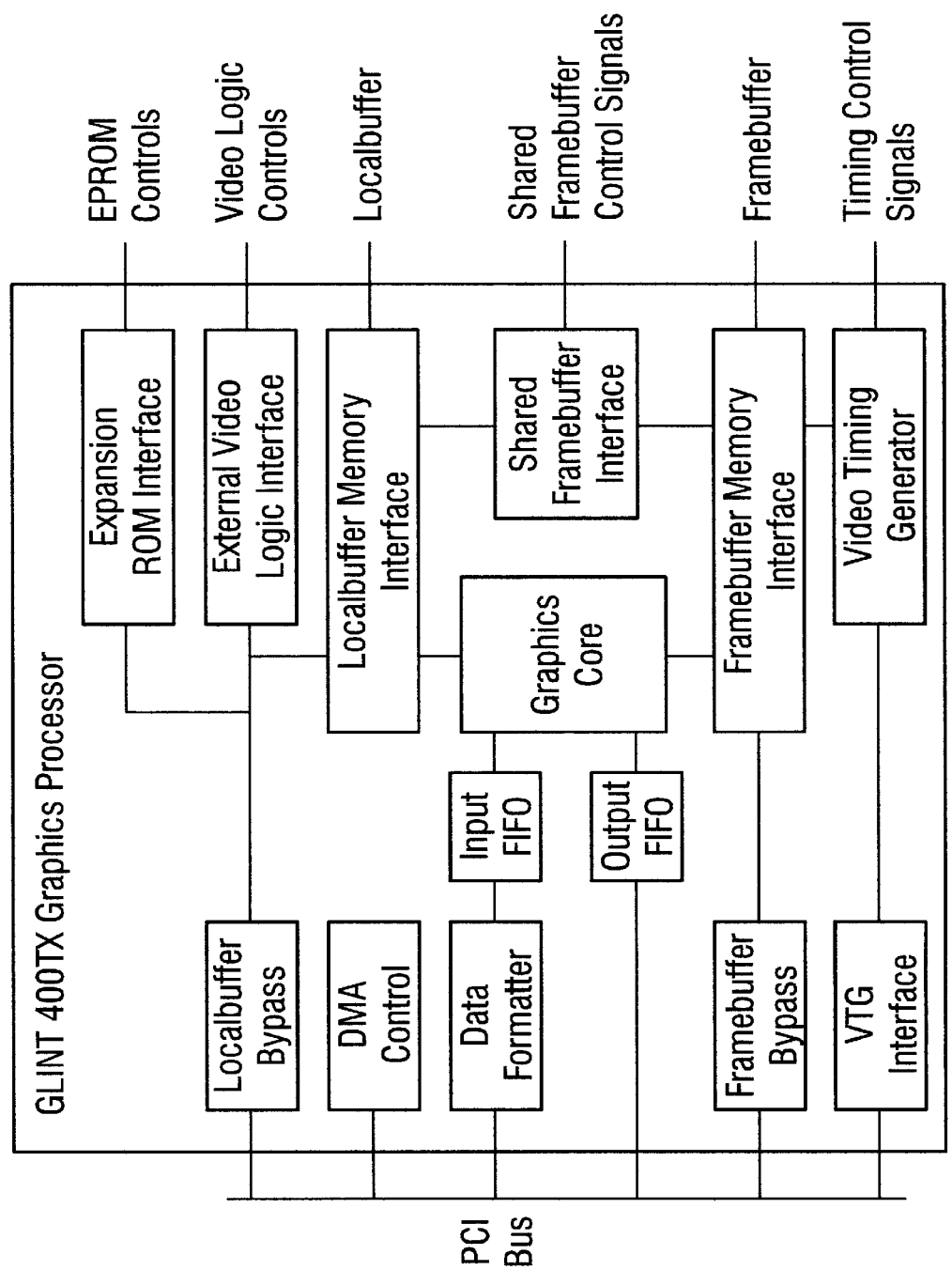
FIG. 2E is yet another view of the graphics rendering chip of FIG. 2A, showing how the functions of the core pipeline of FIG. 2C are combined with various external interface functions.

This section describes each of the units in the graphics Pipeline. FIG. 2C shows a schematic of the pipeline. In this diagram, the localbuffer contains the pixel ownership values (known as Graphic IDs), the FrameCount Planes (FCP), Depth (Z) and Stencil buffer. The framebuffer contains the Red, Green, Blue and Alpha bitplanes. The operations in the Pipeline include:

Rasterizer scan converts the given primitive into a series of fragments for processing by the rest of the pipeline.

Scissor Test clips out fragments that lie outside the bounds of a user defined scissor rectangle and also performs screen clipping to stop illegal access outside the screen memory.

Stipple Test masks out certain fragments according to a specified pattern. Line and area stipples are available.

Color DDA is responsible for generating the color information (True Color RGBA or Color Index(CI)) associated with a fragment.

Texture is concerned with mapping a portion of a specified image (texture) onto a fragment. The process involves filtering to calculate the texture color, and application which applies the texture color to the fragment color.

Fog blends a fog color with a fragment's color according to a given fog factor. Fogging is used for depth cuing images and to simulate atmospheric fogging.

Antialias Application combines the incoming fragment's alpha value with its coverage value when antialiasing is enabled.

Alpha Test conditionally discards a fragment based on the outcome of a comparison between the fragments alpha value and a reference alpha value.

Pixel Ownership is concerned with ensuring that the location in the framebuffer for the current fragment is owned by the current visual. Comparison occurs between the given fragment and the Graphic ID value in the localbuffer, at the corresponding location, to determine whether the fragment should be discarded.

Stencil Test conditionally discards a fragment based on the outcome of a test between the given fragment and the value in the stencil buffer at the corresponding location. The stencil buffer is updated dependent on the result of the stencil test and the depth test.

Depth Test conditionally discards a fragment based on the outcome of a test between the depth value for the given fragment and the value in the depth buffer at the corresponding location. The result of the depth test can be used to control the updating of the stencil buffer.

Alpha Blending combines the incoming fragment's color with the color in the framebuffer at the corresponding location.

Color Formatting converts the fragment's color into the format in which the color information is stored in the framebuffer. This may optionally involve dithering.

The Pipeline structure of GLINT is very efficient at processing fragments, for example, texture mapping calculations are not actually performed on fragments that get clipped out by scissor testing. This approach saves substantial computational effort. The pipelined nature does however mean that when programming GLINT one should be aware of what all the pipeline stages are doing at any time. For example, many operations require both a read and/or write to the localbuffer and framebuffer; in this case it is not sufficient to set a logical operation to XOR and enable logical operations, but it is also necessary to enable the reading/writing of data from/to the framebuffer.

A Gouraud Shaded Triangle

We may now revisit the "day in the life of a triangle" example given above, and review the actions taken in greater detail. Again, the primitive being rendered will be a Gouraud shaded, depth buffered triangle. For this example assume that the triangle is to be drawn into a window which has its colormap set for RGB as opposed to color index operation. This means that all three color components; red, green and blue, must be handled. Also, assume the coordinate origin is bottom left of the window and drawing will be from top to bottom. GLINT can draw from top to bottom or bottom to top.

Consider a triangle with vertices, $v_1$, $v_2$ and $v_3$ where each vertex comprises X, Y and Z coordinates. Each vertex has a different color made up of red, green and blue (R, G and B) components. The alpha component will be omitted for this example.

Initialization

GLINT requires many of its registers to be initialized in a particular way, regardless of what is to be drawn, for instance, the screen size and appropriate clipping must be set up. Normally this only needs to be done once and for clarity this example assumes that all initialization has already been done.

Other state will change occasionally, though not usually on a per primitive basis, for instance enabling Gouraud shading and depth buffering.

Dominant and Subordinate Sides of a Triangle

Figure 4A:
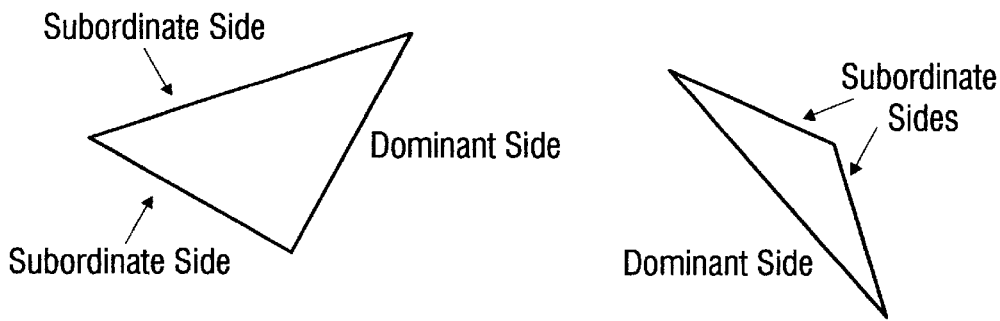
FIG. 4A illustrates the definition of the dominant side and the subordinate sides of a triangle.

As shown in FIG. 4A, the dominant side of a triangle is that with the greatest range of Y values. The choice of dominant side is optional when the triangle is either flat bottomed or flat topped.

GLINT always draws triangles starting from the dominant edge towards the subordinate edges. This simplifies the calculation of set up parameters as will be seen below.

These values allow the color of each fragment in the triangle to be determined by linear interpolation. For example, the red component color value of a fragment at $X_n$, $Y_m$ could be calculated by:

adding $dRdy_{13}$, for each scanline between $Y_1$ and $Y_n$, to $R_1$.

then adding dRdx for each fragment along scanline $Y_n$ from the left edge to $X_n$.

The example chosen has the 'knee,' i.e. vertex 2, on the right hand side, and drawing is from left to right. If the knee were on the left side (or drawing was from right to left), then the Y deltas for both the subordinate sides would be needed to interpolate the start values for each color component (and the depth value) on each scanline. For this reason GLINT always draws triangles starting from the dominant edge and towards the subordinate edges. For the example triangle, this means left to right.

Register Set Up for Color Interpolation

For the example triangle, the GLINT registers must be set as follows, for color interpolation. Note that the format for color values is 24bit, fixed point 2's complement.

```
// Load the color start and delta values to draw
// a triangle
RStart (R₁)
GStart (G₁)
BStart (B₁)
dRdyDom (dRdy₁₃)      // To walk up the dominant edge
dGdyDom (dGdy₁₃)
dBdyDom (dBdy₁₃)
dRdx (dRdx)      // To walk along the scanline
dGdx (dGdx)
dBdx (dBdx)
```

Calculating Depth Gradient Values

To draw from left to right and top to bottom, the depth gradients (or deltas) required for interpolation are:

$$dZdy_{13} = \frac{Z_3 - Z_1}{Y_3 - Y_1}$$

And from the plane equation:

$$dZdx = \left\{(Z_1 - Z_3)\frac{(Y_2 - Y_3)}{c}\right\} - \left\{(Z_2 - Z_3)\frac{(Y_3 - Y_1)}{c}\right\}$$

where $$c = |(X_1 - X_3)(Y_2 - Y_3) - (X_2 - X_3)(Y_1 - Y_1)|$$

The divisor, shown here as c, is the same as for color gradient values. The two deltas $dZdy_{13}$ and dZdx allow the Z value of each fragment in the triangle to be determined by linear interpolation, just as for the color interpolation.

Register Set Up for Depth Testing

Internally GLINT uses fixed point arithmetic. Each depth value must be converted into a 2's complement 32.16 bit fixed point number and then loaded into the appropriate pair of 32 bit registers. The 'Upper' or 'U' registers store the integer portion, whilst the 'Lower' or 'L' registers store the 16 fractional bits, left justified and zero filled.

For the example triangle, GLINT would need its registers set up as follows:

```
// Load the depth start and delta values
// to draw a triangle
ZStartU (Z1_MS)
ZStartL (Z1_LS)
dzdyDomU (dZdy13_MS)
dZdyDomL (dZdy13_LS)
dZdxU (dZdx_MS)
dZdxL (dZdx_LS)
```

Calculating the Slopes for each Side

GLINT draws filled shapes such as triangles as a series of spans with one span per scanline. Therefore it needs to know the start and end X coordinate of each span. These are determined by 'edge walking'. This process involves adding one delta value to the previous span's start X coordinate and another delta value to the previous span's end x coordinate to determine the X coordinates of the new span. These delta values are in effect the slopes of the triangle sides. To draw from left to right and top to bottom, the slopes of the three sides are calculated as:

$$dX_{13} = \frac{X_3 - X_1}{Y_3 - Y_1} \quad dX_{12} = \frac{X_2 - X_1}{Y_2 - Y_1} \quad dX_{23} = \frac{X_3 - X_2}{Y_3 - Y_2}$$

This triangle will be drawn in two parts, top down to the 'knee' (i.e. vertex 2), and then from there to the bottom. The dominant side is the left side so for the top half:

$$dX\text{Dom} = dX_{13}$$

$$dX\text{Sub} = dX_{12}$$

The start X,Y, the number of scanlines, and the above deltas give GLINT enough information to edge walk the top half of the triangle. However, to indicate that this is not a flat topped triangle (GLINT is designed to rasterize screen aligned trapezoids and flat topped triangles), the same start position in terms of X must be given twice as StartXDom and StartXSub.

To edge walk the lower half of the triangle, selected additional information is required. The slope of the dominant edge remains unchanged, but the subordinate edge slope needs to be set to:

$$dX\text{Sub}=dX_{23}$$

Also the number of scanlines to be covered from $Y_2$ to $Y_3$ needs to be given. Finally to avoid any rounding errors accumulated in edge walking to $X_2$ (which can lead to pixel errors), StartXSub must be set to $X_2$.

Rasterizer Mode

The GLINT rasterizer has a number of modes which have effect from the time they are set until they are modified and can thus affect many primitives. In the case of the Gouraud shaded triangle the default value for these modes are suitable.

Subpixel Correction

GLINT can perform subpixel correction of all interpolated values when rendering aliased trapezoids. This correction ensures that any parameter (color/depth/texture/fog) is correctly sampled at the center of a fragment. Subpixel correction will generally always be enabled when rendering any trapezoid which is smooth shaded, textured, fogged or depth buffered. Control of subpixel correction is in the Render command register described in the next section, and is selectable on a per primitive basis.

Rasterization

GLINT is almost ready to draw the triangle. Setting up the registers as described here and sending the Render command will cause the top half of the example triangle to be drawn.

For drawing the example triangle, all the bit fields within the Render command should be set to 0 except the PrimitiveType which should be set to trapezoid and the SubPixelCorrectionEnable bit which should be set to TRUE.

// Draw triangle with knee
// Set deltas
StartXDom ($X_1$<<16) // Converted to 16.16 fixed point
dXDom $(((X_3-X_1)<<16)/(Y_3-Y_1))$
StartXSub ($X_1$<<16)
dXSub $(((X_2-X_1)<<16)/(Y_2-Y_1))$
StartY ($Y_1$<<16)
dY (−1<<16)
Count ($Y_1-Y_2$)
// Set the render command mode
render.PrimitiveType=GLINT_TRAPEZOID_PRIMITIVE
render.SubPixelCorrectionEnable=TRUE
// Draw the top half of the triangle
Render (render)

After the Render command has been issued, the registers in GLINT can immediately be altered to draw the lower half of the triangle. Note that only two registers need be loaded and the command ContinueNewSub sent. Once GLINT has received ContinueNewSub, drawing of this sub-triangle will begin.

// Setup the delta and start for the new edge
StartXSub ($X_2$<<16)
dXSub $(((X_3-X_2)<<16)/(Y_3-Y_2))$
// Draw sub-triangle
ContinueNewSub ($Y_2-Y_3$) // Draw lower half Rasterizer Unit The rasterizer decomposes a given primitive into a series of fragments for processing by the rest of the Pipeline.

GLINT can directly rasterize:

aliased screen aligned trapezoids
aliased single pixel wide lines
aliased single pixel points
antialiased screen aligned trapezoids
antialiased circular points All other primitives are treated as one or more of the above, for example an antialiased line is drawn as a series of antialiased trapezoids.

Trapezoids

GLINT's basic area primitives are screen aligned trapezoids. These are characterized by having top and bottom edges parallel to the X axis. The side edges may be vertical (a rectangle), but in general will be diagonal. The top or bottom edges can degenerate into points in which case we are left with either flat topped or flat bottomed triangles. Any polygon can be decomposed into screen aligned trapezoids or triangles. Usually, polygons are decomposed into triangles because the interpolation of values over non-triangular polygons is ill defined. The rasterizer does handle flat topped and flat bottomed 'bow tie' polygons which are a special case of screen aligned trapezoids.

To render a triangle, the approach adopted to determine which fragments are to be drawn is known as 'edge walking'. Suppose the aliased triangle shown in FIG. 4A was to be rendered from top to bottom and the origin was bottom left of the window. Starting at (X1, Y1) then decrementing Y and using the slope equations for edges 1–2 and 1–3, the intersection of each edge on each scanline can be calculated. This results in a span of fragments per scanline for the top trapezoid. The same method can be used for the bottom trapezoid using slopes 2–3 and 1–3.

It is usually required that adjacent triangles or polygons which share an edge or vertex are drawn such that pixels which make up the edge or vertex get drawn exactly once. This may be achieved by omitting the pixels down the left or the right sides and the pixels along the top or lower sides. GLINT has adopted the convention of omitting the pixels down the right hand edge. Control of whether the pixels along the top or lower sides are omitted depends on the start Y value and the number of scanlines to be covered. With the example, if StartY=Y1 and the number of scanlines is set to Y1-Y2, the lower edge of the top half of the triangle will be excluded. This excluded edge will get drawn as part of the lower half of the triangle.

To minimize delta calculations, triangles may be scan converted from left to right or from right to left. The direction depends on the dominant edge, that is the edge which has the maximum range of Y values. Rendering always proceeds from the dominant edge towards the relevant subordinate edge. In the example above, the dominant edge is 1–3 so rendering will be from right to left.

The sequence of actions required to render a triangle (with a 'knee') is:

Load the edge parameters and derivatives for the dominant edge and the first subordinate edges in the first triangle.

Send the Render command. This starts the scan conversion of the first triangle, working from the dominant edge. This means that for triangles where the knee is on the left we are scanning right to left, and vice versa for triangles where the knee is on the right.

Load the edge parameters and derivatives for the remaining subordinate edge in the second triangle.

Send the ContinueNewSub command. This starts the scan conversion of the second triangle.

Pseudocode for the above example is:

```
// Set the rasterizer mode to the default
RasterizerMode (0)
// Setup the start values and the deltas.
// Note that the X and Y coordinates are converted
// to 16.16 format
StartXDom (X1<<16)
dxDom (((X3- X1)<<16)/(Y3 - Y1))
StartXSub (X1<<16)
dxSub (((X2- X1)<<16)/(Y2 - Y1))
StartY (Y1<<16)
dY (-1<<16)                  // Down the screen
Count (Y1 - Y2)
// Set the render mode to aliased primitive with
// subpixel correction.
render.PrimitiveType = GLINT_TRAPEZOID_PRIMITIVE
render.SubpixelCorrectionEnable = GLINT_TRUE
render.AntialiasEnable = GLINT_DISABLE
// Draw top half of the triangle
Render (render)
// Set the start and delta for the second half of
// the triangle.
StartXSub (X2<<16)
dXSub (((X3- X2)<<16)/(Y3 - Y2))
// Draw lower half of triangle
ContinueNewSub (abs(Y2 - Y3))
```

After the Render command has been sent, the registers in GLINT can immediately be altered to draw the second half of the triangle. For this, note that only two registers need be loaded and the command ContinueNewSub be sent. Once drawing of the first triangle is complete and GLINT has received the ContinueNewSub command, drawing of this sub-triangle will start. The ContinueNewSub command register is loaded with the remaining number of scanlines to be rendered.

Lines

Single pixel wide aliased lines are drawn using a DDA algorithm, so all GLINT needs by way of input data is StartX, StartY, dX, dY and length.

For polylines, a ContinueNewLine command (analogous to the Continue command used at the knee of a triangle) is used at vertices.

When a Continue command is issued some error will be propagated along the line. To minimize this, a choice of actions are available as to how the DDA units are restarted on the receipt of a Continue command. It is recommended that for OpenGL rendering the ContinueNewLine command is not used and individual segments are rendered.

Antialiased lines, of any width, are rendered as antialiased screen-aligned trapezoids.

Points

GLINT supports a single pixel aliased point primitive. For points larger than one pixel trapezoids should be used. In this case the PrimitiveType field in the Render command should be set to equal GLINT_POINT_PRIMITIVE.

Antialiasing

GLINT uses a subpixel point sampling algorithm to antialias primitives. GLINT can directly rasterize antialiased trapezoids and points. Other primitives are composed from these base primitives.

The rasterizer associates a coverage value with each fragment produced when antialiasing. This value represents the percentage coverage of the pixel by the fragment. GLINT supports two levels of antialiasing quality:

normal, which represents 4×4 pixel subsampling high, which represents 8×8 pixel subsampling.

Selection between these two is made by the AntialiasingQuality bit within the Render command register.

When rendering antialiased primitives with GLINT the FlushSpan command is used to terminate rendering of a primitive. This is due to the nature of GLINT antialiasing. When a primitive is rendered which does not happen to complete on a scanline boundary, GLINT retains antialiasing information about the last sub-scanline(s) it has processed, but does not generate fragments for them unless a FlushSpan command is received. The commands ContinueNewSub, ContinueNewDom or Continue can then be used, as appropriate, to maintain continuity between adjacent trapezoids. This allows complex antialiased primitives to be built up from simple trapezoids or points.

Figure 4B:
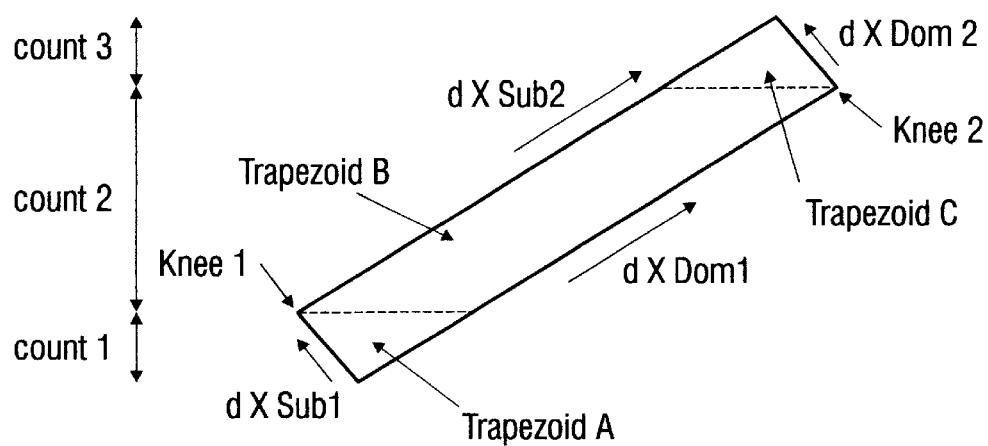
FIG. 4B illustrates the sequence of rendering an Anti-aliased Line primitive.

To illustrate this consider using screen aligned trapezoids to render an antialiased line. The line will in general consist of three screen aligned trapezoids as shown in FIG. 4B. This Figure illustrates the sequence of rendering an Antialiased Line primitive. Note that the line has finite width.

The procedure to render the line is as follows:

```
// Setup the blend and coverage application units
// as appropriate—not shown
// In this example only the edge deltas are shown
// loaded into registers for clarity. In reality
// start X and Y values are required
// Render Trapezoid A
dY(1<<16)
dXDom(dXDom1<<16)
dXSub(dXSub1<<16)
Count(count1)
render.PrimitiveType=GLINT_TRAPEZOID
render.AntialiasEnable=GLINT TRUE
render.AntialiasQuality=GLINT_MIN_ANTIALIAS
render.CoverageEnable=GLINT_TRUE
Render(render)
// Render Trapezoid B
dXSub(dXSub2<<16)
ContinueNewSub(count2)
// Render Trapezoid C
dXDom(dXDom2<<16)
ContinueNewDom(count3)
// Now we have finished the primitive flush out
// the last scanline
FlushSpan( )
```

Note that when rendering antialiased primitives, any count values should be given in subscanlines, for example if the quality is 4×4 then any scanline count must be multiplied by 4 to convert it into a subscanline count. Similarly, any delta value must be divided by 4.

When rendering, AntialiasEnable must be set in the Antialias-Mode register to scale the fragments color by the coverage value. An appropriate blending function should also be enabled.

Note, when rendering antialiased bow-ties, the coverage value on the cross-over scanline may be incorrect.

GLINT can render small antialiased points. Antialiased points are treated as circles, with the coverage of the boundary fragments ranging from 0% to 100%. GLINT supports:

point radii of 0.5 to 16.0 in steps of 0.25 for 4×4 antialiasing point radii of 0.25 to 8.0 in steps of 0.125 for 8×8 antialiasing To scan convert an antialiased point as a circle, GLINT traverses the boundary in sub scanline steps to calculate the coverage value. For this, the sub-scanline intersections are calculated incrementally using a small table. The table holds the change in X for a step in Y. Symmetry is used so the table only holds the delta values for one quadrant.

StartXDom, StartXSub and StartY are set to the top or bottom of the circle and dY set to the subscanline step. In the case of an even diameter, the last of the required entries in the table is set to zero.

Since the table is configurable, point shapes other than circles can be rendered. Also if the StartXDom and StartXSub values are not coincident then horizontal thick lines with rounded ends, can be rendered.

Block Write Operation

GLINT supports VRAM block writes with block sizes of 8, 16 and 32 pixels. The block write method does have some restrictions: None of the per pixel clipping, stipple, or fragment operations are available with the exception of write masks. One subtle restriction is that the block coordinates will be interpreted as screen relative and not window relative when the pixel mask is calculated in the Framebuffer Units.

Any screen aligned trapezoid can be filled using block writes, not just rectangles.

The use of block writes is enabled by setting the FastFillEnable and FastFillIncrement fields in the Render command register. The framebuffer write unit must also be configured.

Note only the Rasterizer, Framebuffer Read and Framebuffer Write units are involved in block filling. The other units will ignore block write fragments, so it is not necessary to disable them.

Sub Pixel Precision and Correction

As the rasterizer has 16 bits of fraction precision, and the screen width used is typically less than $2^{16}$ wide a number of bits called subpixel precision bits, are available. Consider a screen width of 4096 pixels. This figure gives a subpixel precision of 4 bits ($4096=2^{12}$). The extra bits are required for a number of reasons:

antialiasing (where vertex start positions can be supplied to subpixel precision)

when using an accumulation buffer (where scans are rendered multiple times with jittered input vertices)

for correct interpolation of parameters to give high quality shading as described below GLINT supports subpixel correction of interpolated values when rendering aliased trapezoids. Subpixel correction ensures that all interpolated parameters associated with a fragment (color, depth, fog, texture) are correctly sampled at the fragment's center. This correction is required to ensure consistent shading of objects made from many primitives. It should generally be enabled for all aliased rendering which uses interpolated parameters.

Subpixel correction is not applied to antialiased primitives.

Bitmaps

A Bitmap primitive is a trapezoid or line of ones and zeros which control which fragments are generated by the rasterizer. Only fragments where the corresponding Bitmap bit is set are submitted for drawing. The normal use for this is in drawing characters, although the mechanism is available for all primitives. The Bitmap data is packed contiguously into 32 bit words so that rows are packed adjacent to each other. Bits in the mask word are by default used from the least significant end towards the most significant end and are applied to pixels in the order they are generated in.

The rasterizer scans through the bits in each word of the Bitmap data and increments the X,Y coordinates to trace out the rectangle of the given width and height. By default, any set bits (1) in the Bitmap cause a fragment to be generated, any reset bits (0) cause the fragment to be rejected.

The selection of bits from the BitMaskPattern register can be mirrored, that is, the pattern is traversed from MSB to LSB rather than LSB to MSB. Also, the sense of the test can be reversed such that a set bit causes a fragment to be rejected and vice versa. This control is found in the RasterizerMode register.

When one Bitmap word has been exhausted and pixels in the rectangle still remain then rasterization is suspended until the next write to the BitMaskPattern register. Any unused bits in the last Bitmap word are discarded.

Image Copy/Upload/Download

GLINT supports three "pixel rectangle" operations: copy, upload and download. These can apply to the Depth or Stencil Buffers (held within the localbuffer) or the framebuffer.

It should be emphasized that the GLINT copy operation moves RAW blocks of data around buffers. To zoom or re-format data, in the presently preferred embodiment, external software must upload the data, process it and then download it again.

To copy a rectangular area, the rasterizer would be configured to render the destination rectangle, thus generating fragments for the area to be copied. GLINT copy works by adding a linear offset to the destination fragment's address to find the source fragment's address.

Note that the offset is independent of the origin of the buffer or window, as it is added to the destination address. Care must be taken when the source and destination overlap to choose the source scanning direction so that the overlapping area is not overwritten before it has been moved. This may be done by swapping the values written to the StartXDom and StartXSub, or by changing the sign of dY and setting StartY to be the opposite side of the rectangle.

Localbuffer copy operations are correctly tested for pixel ownership. Note that this implies two reads of the localbuffer, one to collect the source data, and one to get the destination GID for the pixel ownership test.

GLINT buffer upload/downloads are very similar to copies in that the region of interest is generated in the rasterizer. However, the localbuffer and framebuffer are generally configured to read or to write only, rather than both read and write. The exception is that an image load may use pixel ownership tests, in which case the localbuffer destination read must be enabled.

Units which can generate fragment values, the color DDA unit for example, should generally be disabled for any copy/upload/download operations.

Warning: During image upload, all the returned fragments must be read from the Host Out FIFO, otherwise the GLINT pipeline will stall. In addition it is strongly recommended that any units which can discard fragments (for instance the following tests: bitmask, alpha, user scissor, screen scissor, stipple, pixel ownership, depth, stencil), are disabled otherwise a shortfall in pixels returned may occur, also leading to deadlock.

Note that because the area of interest in copy/upload/download operations is defined by the rasterizer, it is not limited to rectangular regions.

Color formatting can be used when performing image copies, uploads and downloads. This allows data to be formatted from, or to, any of the supported GLINT color formats.

Rasterizer Mode

A number of long-term modes can be set using the Rasterizer-Mode register, these are:

Mirror BitMask: This is a single bit flag which specifies the direction bits are checked in the BitMask register. If the bit is reset, the direction is from least significant to most significant (bit 0 to bit 3), if the bit is set, it is from most significant to least significant (from bit 31 to bit 0).

an error accumulates in the DDA value. GLINT provides for greater control of the error by doing one of the following:

leaving the DDA running, which means errors will be propagated along a line.

or setting the fraction bits to either zero, a half or almost a half (0x7FFF).

Bias Coordinates: Only the integer portion of the values in the DDAs are used to generate fragment addresses. Often the actual action required is a rounding of values, this can be achieved by setting the bias coordinate bit to true which will automatically add almost a half (0x7FFF) to all input coordinates.

Rasterizer Unit Registers

Real coordinates with fractional parts are provided to the rasterizer in 2's complement 16 bit integer, 16 bit fraction format. The following Table lists the command registers which control the rasterizer unit:

| Register Name | Description |
| --- | --- |
| Render | Starts the rasterization process |
| ContinueNewDom | Allows the rasterization to continue with a new dominant edge. The dominant edge DDA is reloaded with the new parameters. The subordinate edge is carried on from the previous trapezoid. This allows any convex polygon to be broken down into a collection of trapezoids, with continuity maintained across boundaries. The data field holds the number of scanlines (or sub scanlines) to fill. Note this count does not get loaded into the Count register. |
| ContinueNewSub | Allows the rasterization to continue with a new subordinate edge. The subordinate DDA is reloaded with the new parameters. The dominant edge is carried on from the previous trapezoid. This is useful when scan converting triangles with a 'knee' (i.e. two subordinate edges). The data field holds the number of scanlines (or sub scanlines) to fill. Note this count does not get loaded into the Count register. |
| Continue | Allows the rasterization to continue after new delta value(s) have been loaded, but does not cause either of the trapezoid's edge DDAs to be reloaded. The data field holds the number of scanlines (or sub scanlines) to fill. Note this count does not get loaded into the Count register. |
| ContinueNewLine | Allows the rasterization to continue for the next segment in a polyline. The XY position is carried on from the previous line, but the fraction bits in the DDAs can be: kept, set to zero, half, or nearly one half, under control of the RasterizerMode. The data field holds the number of scanlines to fill. Note this count does not get loaded into the Count register. The use of ContinueNewLine is not recommended for OpenGL because the DDA units will start with a slight error as compared with the value they would have been loaded with for the second and subsequent segments. |
| FlushSpan | Used when antialiasing to force the last span out when not all sub spans may be defined. |

Invert BitMask: This is a single bit which controls the sense of the accept/reject test when using a Bitmask. If the bit is reset then when the BitMask bit is set the fragment is accepted and when it is reset the fragment is rejected. When the bit is set the sense of the test is reversed.

Fraction Adjust: These 2 bits control the action taken by the rasterizer on receiving a ContinueNewLine command. As GLINT uses a DDA algorithm to render lines, The following Table shows the control registers of the rasterizer, in the presently preferred embodiment:

| | |
| --- | --- |
| RasterizerMode | Defines the long term mode of operation of the rasterizer. |
| StartXDom | Initial X value for the dominant edge in trapezoid filling, or initial X value in line drawing. |
| dXDom | Value added when moving from one scanline (or sub |

-continued

| | |
|---|---|
| RasterizerMode | Defines the long term mode of operation of the rasterizer. scanline) to the next for the dominant edge in trapezoid filling. Also holds the change in X when plotting lines so for Y major lines this will be some fraction (dx/dy), otherwise it is normally ± 1.0, depending on the required scanning direction. |
| StartXSub | Initial X value for the subordinate edge. |
| dXSub | Value added when moving from one scanline (or sub scanline) to the next for the subordinate edge in trapezoid filling. |
| StartY | Initial scanline (or sub scanline) in trapezoid filling, or initial Y position for line drawing. |
| dY | Value added to Y to move from one scanline to the next. For X major lines this will be some fraction (dy/dx), otherwise it is normally ± 1.0, depending on the required scanning direction. |
| Count | Number of pixels in a line. Number of scanlines in a trapezoid. Number of sub scanlines in an antialiased trapezoid. Diameter of a point in sub scanlines. |
| BitMaskPattern | Value used to control the BitMask stipple operation (if enabled). |
| PointTable0 PointTable1 PointTable2 PointTable3 | Antialias point data table. There are 4 words in the table and the register tag is decoded to select a word. |

For efficiency, the Render command register has a number of bit fields that can be set or cleared per render operation, and which qualify other state information within GLINT. These bits are AreaStippleEnable, LineStippleEnable, ResetLineStipple, TextureEnable FogEnable, CoverageEnable and SubpixelCorrection.

One use of this feature can occur when a window is cleared to a background color. For normal 3D primitives, stippling and fog operations may have been enabled, but these are to be ignored for window clears. Initially the FogMode, AreaStippleMode and LineStippleMode registers are enabled through the UnitEnable bits. Now bits need only be set or cleared within the Render command to achieve the required result, removing the need for the FogMode, AreaStippleMode and LineStippleMode registers to be loaded for every render operation.

The bitfields of the Render command register, in the presently preferred embodiment, are detailed below:

| Bit | Name | Description |
|---|---|---|
| 0 | Area-Stipple-Enable | This bit, when set, enables area stippling of the fragments produced during rasterization. Note that area stipple in the Stipple Unit must be enabled as well for stippling to occur. When this bit is reset no area stippling occurs irrespective of the setting of the area stipple enable bit in the Stipple Unit. This bit is useful to temporarily force no area stippling for this primitive. |
| 1 | Line-Stipple-Enable | This bit, when set, enables line stippling of the fragments produced during rasterization in the Stipple Unit. Note that line stipple in the Stipple Unit must be enabled as well for stippling to occur. When this bit is reset no line stippling occurs irrespective of the setting of the line stipple enable bit in the Stipple Unit. This bit is useful to temporarily force no line stippling for this primitive. |
| 2 | Reset-Line-Stipple | This bit, when set, causes the line stipple counters in the Stipple Unit to be reset to zero, and would typically be used for the first segment in a polyline. This action is also qualified by the LineStippleEnable bit and also the stipple enable bits in the Stipple Unit. When this bit is reset the stipple counters carry on from where they left off (if line stippling is enabled) |
| 3 | FastFillEnable | This bit, when set, causes fast block filling of primitives. When this bit is reset the normal rasterization process occurs. |
| 4, 5 | Fast-Fill-Increment | This two bit field selects the block size the framebuffer supports. The sizes supported and the corresponding codes are:<br>0 = 8 pixels<br>1 = 16 pixels<br>2 = 32 pixels |
| 6, 7 | Primitive-Type | This two bit field selects the primitive type to rasterize. The primitives are:<br>0 = Line<br>1 = Trapezoid<br>2 = Point |
| 8 | Antialias-Enable | This bit, when set, causes the generation of sub scanline data and the coverage value to be calculated for each fragment. The number of sub pixel samples to use is controlled by the AntialiasingQuality bit. When this bit is reset normal rasterization occurs. |
| 9 | Anti-aliasing Quality | This bit, when set, sets the sub pixel resolution to be 8×8 When this bit is reset the sub pixel resolution is 4×4. |

-continued

| Bit | Name | Description |
|---|---|---|
| 10 | UsePointTable | When this bit and the AntialiasingEnable are set, the dx values used to move from one scanline to the next are derived from the Point Table. |
| 11 | SyncOnBitMask | This bit, when set, causes a number of actions: The least significant bit or most significant bit (depending on the MirrorBitMask bit) in the Bit Mask register is extracted and optionally inverted (controlled by the InvertBitMask bit). If this bit is 0 then the corresponding fragment is culled from being drawn. After every fragment the Bit Mask register is rotated by one bit. If all the bits in the Bit Mask register have been used then rasterization is suspended until a new BitMaskPattern is received. If any other register is written while the rasterization is suspended then the rasterization is aborted. The register write which caused the abort is then processed as normal. Note the behavior is slightly different when the SyncOnHostData bit is set to prevent a deadlock from occurring. In this case the rasterization doesn't suspend when all the bits have been used and if new BitMaskPattern data words are not received in a timely manner then the subsequent fragments will just reuse the bitmask. |
| 12 | SyncOnHostData | When this bit is set a fragment is produced only when one of the following registers has been written by the host: Depth, FBColor, Stencil or Color. If SyncOnBitMask is reset, then if any register other than one of these four is written to, the rasterization is aborted. If SyncOnBitMask is set, then if any register other than one of these four, or BitMaskPattern, is written to, the rasterization is aborted. The register write which caused the abort is then processed as normal. Writing to the BitMaskPattern register doesn't cause any fragments to be generated, but just updates the BitMask register. |
| 13 | TextureEnable | This bit, when set, enables texturing of the fragments produced during rasterization. Note that the Texture Units must be suitably enabled as well for any texturing to occur. When this bit is reset no texturing occurs irrespective of the setting of the Texture Unit controls. This bit is usetul to temporarily force no texturing for this primitive. |
| 14 | FogEnable | This bit, when set, enables fogging of the fragments produced during rasterization. Note that the Fog Unit must be suitably enabled as well for any fogging to occur. When this bit is reset no fogging occurs irrespective of the setting of the Fog Unit controls. This bit is useful to temporarily force no fogging for this primitive. |
| 15 | CoverageEnable | This bit, when set, enables the coverage value produced as part of the antialiasing to weight the alpha value in the alpha test unit. Note that this unit must be suitably enabled as well. When this bit is reset no coverage application occurs irrespective of the setting of the AntialiasMode in the Alpha Test unit. |
| 16 | SubPixelCorrection Enable | This bit, when set enables the sub pixel correction of the color, depth, fog and texture values at the start of a scanline. When this bit is reset no correction is done at the start of a scanline. Sub pixel corrections are only applied to aliased trapezoids. |

A number of long-term rasterizer modes are stored in the RasterizerMode register as shown below:

| Bit | Name | Description |
|---|---|---|
| 0 | MirrorBitMask | When this bit is set the bitmask bits are consumed from the most significant end towards the least significant end. When this bit is reset the bitmask bits are consumed from the least significant end towards the most significant end. |
| 1 | InvertBitMask | When this bit is set the bitmask is inverted first before being tested. |
| 2, 3 | FractionAdjust | These bits control the action of a ContinueNewLine command and specify how the fraction bits in the Y and XDom DDAs are adjusted 0: No adjustment is done 1: Set the fraction bits to zero 2: Set the fraction bits to half 3: Set the fraction to nearly half, i.e. 0x7fff |
| 4, 5 | BiasCoordinates | These bits control how much is added onto the StartXDom, StartXSub and StartY values when they are loaded into the DDA units. The original registers are not affected: 0: Zero is added 1: Half is added 2: Nearty half, i.e. 0x7fff is added |

Scissor Unit

Two scissor tests are provided in GLINT, the User Scissor test and the Screen Scissor test. The user scissor checks each fragment against a user supplied scissor region; the screen scissor checks that the fragment lies within the screen.

This test may reject fragments if some part of a window has been moved off the screen. It will not reject fragments if part of a window is simply overlapped by another window (GID testing can be used to detect this).

Stipple Unit

Stippling is a process whereby each fragment is checked against a bit in a defined pattern, and is rejected or accepted depending on the result of the stipple test. If it is rejected it undergoes no further processing; otherwise it proceeds down the pipeline. GLINT supports two types of stippling, line and area.

Area Stippling

A 32×32 bit area stipple pattern can be applied to fragments. The least significant n bits of the fragment's (X,Y) coordinates, index into a 2D stipple pattern. If the selected bit in the pattern is set, then the fragment passes the test, otherwise it is rejected. The number of address bits used, allow regions of 1,2,4,8,16 and 32 pixels to be stippled. The address selection can be controlled independently in the X and Y directions. In addition the bit pattern can be inverted or mirrored. Inverting the bit pattern has the effect of changing the sense of the accept/reject test. If the mirror bit is set the most significant bit of the pattern is towards the left of the window, the default is the converse.

In some situations window relative stippling is required but coordinates are only available screen relative. To allow window relative stippling, an offset is available which is added to the coordinates before indexing the stipple table. X and Y offsets can be controlled independently.

Line Stippling

In this test, fragments are conditionally rejected on the outcome of testing a linear stipple mask. If the bit is zero then the test fails, otherwise it passes. The line stipple pattern is 16 bits in length and is scaled by a repeat factor r (in the range 1 to 512). The stipple mask bit b which controls the acceptance or rejection of a fragment is determined using:

$$b = (\text{floor}(s/r)) \bmod 16$$

where s is the stipple counter which is incremented for every fragment (normally along the line). This counter may be reset at the start of a polyline, but between segments it continues as if there were no break.

The stipple pattern can be optionally mirrored, that is the bit pattern is traversed from most significant to least significant bits, rather than the default, from least significant to most significant.

Color DDA Unit

The color DDA unit is used to associate a color with a fragment produced by the rasterizer. This unit should be enabled for rendering operations and disabled for pixel rectangle operations (i.e. copies, uploads and downloads). Two color modes are supported by GLINT, true color RGBA and color index (CI).

Gouraud Shading

When in Gouraud shading mode, the color DDA unit performs linear interpolation given a set of start and increment values. Clamping is used to ensure that the interpolated value does not underflow or overflow the permitted color range.

For a Gouraud shaded trapezoid, GLINT interpolates from the dominant edge of a trapezoid to the subordinate edges. This means that two increment values are required per color component, one to move along the dominant edge and one to move across the span to the subordinate edge.

Note that if one is rendering to multiple buffers and has initialized the start and increment values in the color DDA unit, then any subsequent Render command will cause the start values to be reloaded.

If subpixel correction has been enabled for a primitive, then any correction required will be applied to the color components.

Flat Shading

In flat shading mode, a constant color is associated with each fragment. This color is loaded into the ConstantColor register.

Texture Unit

The texture unit combines the incoming fragment's color (generated in the color DDA unit) with a value derived from interpolating texture map values (texels).

Texture application consists of two stages; derivation of the texture color from the texels (a filtering process) and then application of the texture color to the fragment's color, which is dependent on the application mode (Decal, Blend or Modulate).

GLINT 300SX compared with the GLINT 300TX Both the GLINT 300SX and GLINT 300TX support all the filtering and application modes described in this section. However, when using the GLINT 300SX, texel values, interpolants and texture filter selections are supplied by the host. This implies that texture coordinate interpolation and texel extraction are performed by the host using texture maps resident on the host. The recommended technique for performing texture mapping using the GLINT 300SX is to scan convert primitives on the host and render fragments as GLINT point primitives.

The GLINT 300TX automatically generates all data required for texture application as textures are stored in the localbuffer and texture parameter interpolation with full perspective correction takes place within the processor. Thus the GLINT 300TX is the processor of choice when full texture mapping acceleration is desired, the GLINT 300SX is more suitable in applications where the performance of texture mapping is not critical.

Texture Color Generation.

Texture color generation supports all the filter modes of OpenGL, that is:

| | |
|---|---|
| Minification: | Nearest |
| | Linear |
| | NearestMipMapNearest |
| | NearestMipMapLinear |
| | LinearMipMapNearest |
| | LinearMipMapLinear |
| Magnification: | Nearest |
| | Linear |

Minification is the name given to the filtering process used whereby multiple texels map to a fragment, while magnification is the name given to the filtering process whereby only a portion of a single texel maps to a single fragment.

Nearest is the simplest form of texture mapping where the nearest texel to the sample location is selected with no filtering applied.

Linear is a more sophisticated algorithm which is dependent on the type of primitive. For lines (which are 1D), it involves linear interpolation between the two nearest texels, for polygons and points which are considered to have finite area, linear is in fact bi-linear interpolation which interpolates between the nearest 4 texels.

Mip Mapping is a technique to allow the efficient filtering of texture maps when the projected area of the fragment covers more than one texel (ie. minification). A hierarchy of texture maps is held with each one being half the size (or one quarter the area) of the preceding one. A pair of maps are selected, based on the projected area of the texture. In terms of filtering this means that three filter operations are performed: one on the first map, one on the second map and one between the maps. The first filter name (Nearest or Linear) in the MipMap name specifies the filtering to do on the two maps, and the second filter name specifies the filtering to do between maps. So for instance, linear mapping between two maps, with linear interpolation between the results is supported (LinearMipMapLinear), but linear interpolation on one map, nearest on the other map, and linear interpolation between the two is not supported.

The filtering process takes a number of texels and interpolants, and with the current texture filter mode produces a texture color.

Fog Unit

The fog unit is used to blend the incoming fragment's color (generated by the color DDA unit, and potentially modified by the texture unit) with a predefined fog color. Fogging can be used to simulate atmospheric fogging, and also to depth cue images.

Fog application has two stages; derivation of the fog index for a fragment, and application of the fogging effect. The fog index is a value which is interpolated over the primitive using a DDA in the same way color and depth are interpolated. The fogging effect is applied to each fragment using one of the equations described below.

Note that although the fog values are linearly interpolated over a primitive the fog values can be calculated on the host using a linear fog function (typically for simple fog effects and depth cuing) or a more complex function to model atmospheric attenuation. This would typically be an exponential function.

Fog Index Calculation—The Fog DDA

The fog DDA is used to interpolate the fog index (f) across a primitive. The mechanics are similar to those of the other DDA units, and horizontal scanning proceeds from dominant to subordinate edge as discussed above.

The DDA has an internal range of approximately +511 to −512, so in some cases primitives may exceed these bounds. This problem typically occurs for very large polygons which span the whole depth of a scene. The correct solution is to tessellate the polygon until polygons lie within the acceptable range, but the visual effect is frequently negligible and can often be ignored.

The fog DDA calculates a fog index value which is clamped to lie in the range 0.0 to 1.0 before it is used in the appropriate fogging equation. (Fogging is applied differently depending on the color mode.)

Antialias Application Unit

Antialias application controls the combining of the coverage value generated by the rasterizer with the color generated in the color DDA units. The application depends on the color mode, either RGBA or Color Index (CI).

Antialias Application

When antialiasing is enabled this unit is used to combine the coverage value calculated for each fragment with the fragment's alpha value. In RGBA mode the alpha value is multiplied by the coverage value calculated in the rasterizer (its range is 0% to 100%). The RGB values remain unchanged and these are modified later in the Alpha Blend unit which must be set up appropriately. In CI mode the coverage value is placed in the lower 4 bits of the color field. The Color Look Up Table is assumed to be set up such that each color has 16 intensities associated with it, one per coverage entry.

Polygon Antialiasing

When using GLINT to render antialiased polygons, depth buffering cannot be used. This is because the order the fragments are combined in is critical in producing the correct final color. Polygons should therefore be depth sorted, and rendered front to back, using the alpha blend modes: SourceAlphaSaturate for the source blend function and One for the destination blend function. In this way the alpha component of a fragment represents the percentage pixel coverage, and the blend function accumulates coverage until the value in the alpha buffer equals one, at which point no further contributions can made to a pixel.

For the antialiasing of general scenes, with no restrictions on rendering order, the accumulation buffer is the preferred choice. This is indirectly supported by GLINT via image uploading and downloading, with the accumulation buffer residing on the host.

When antialiasing, interpolated parameters which are sampled within a fragment (color, fog and texture), will sometimes be unrepresentative of a continuous sampling of a surface, and care should be taken when rendering smooth shaded antialiased primitives. This problem does not occur in aliased rendering, as the sample point is consistently at the center of a pixel.

Alpha Test Unit

The alpha test compares a fragment's alpha value with a reference value. Alpha testing is not available in color index (CI) mode. The alpha test conditionally rejects a fragment based on the comparison between a reference alpha value and one associated with the fragment.

Localbuffer Read/Write Unit

The localbuffer holds the Graphic ID, FrameCount, Stencil and Depth data associated with a fragment. The localbuffer read/write unit controls the operation of GID testing, depth testing and stencil testing.

Localbuffer Read

The LBReadMode register can be configured to make 0, 1 or 2 reads of the localbuffer. The following are the most common modes of access to the localbuffer:

Normal rendering without depth, stencil or GID testing. This requires no localbuffer reads or writes.

Normal rendering without depth or stencil testing and with GID testing. This requires a localbuffer read to get the GID from the localbuffer.

Normal rendering with depth and/or stencil testing required which conditionally requires the localbuffer to be updated. This requires localbuffer reads and writes to be enabled.

Copy operations. Operations which copy all or part of the localbuffer with or without GID testing. This requires reads and writes enabled.

Image upload/download operations. Operations which download depth or stencil information to the local buffer or read depth, stencil fast clear or GID from the localbuffer.

Localbuffer Write

Writes to the localbuffer must be enabled to allow any update of the localbuffer to take place. The LBWriteMode register is a single bit flag which controls updating of the buffer.

Pixel Ownership (GID) Test Unit

Any fragment generated by the rasterizer may undergo a pixel ownership test. This test establishes the current fragment's write permission to the localbuffer and framebuffer.

Pixel Ownership Test

The ownership of a pixel is established by testing the GID of the current window against the GID of a fragment's destination in the GID buffer. If the test passes, then a write can take place, otherwise the write is discarded. The sense of the test can be set to one of: always pass, always fail, pass if equal, or pass if not equal. Pass if equal is the normal mode. In GLINT the GID planes, if present, are 4 bits deep allowing 16 possible Graphic ID's. The current GID is established by setting the Window register.

If the unit is disabled fragments pass through undisturbed.

Stencil Test Unit

The stencil test conditionally rejects fragments based on the outcome of a comparison between the value in the stencil buffer and a reference value. The stencil buffer is updated according to the current stencil update mode which depends on the result of the stencil test and the depth test.

Stencil Test

This test only occurs if all the preceding tests (bitmask, scissor, stipple, alpha, pixel ownership) have passed. The stencil test is controlled by the stencil function and the stencil operation. The stencil function controls the test between the reference stencil value and the value held in the stencil buffer. The stencil operation controls the updating of the stencil buffer, and is dependent on the result of the stencil and depth tests.

If the stencil test is enabled then the stencil buffer will be updated depending on the outcome of both the stencil and the depth tests (if the depth test is not enabled the depth result is set to pass).

In addition a comparison bit mask is supplied in the StencilData register. This is used to establish which bits of the source and reference value are used in the stencil function test. In addition it should normally be set to exclude the top four bits when the stencil width has been set to 4 bits in the StencilMode register.

The source stencil value can be from a number of places as controlled by a field in the StencilMode register:

| LBWriteData Stencil | Use |
| --- | --- |
| Test logic | This is the normal mode. |
| Stencil register | This is used, for instance, in the OpenGL draw pixels function where the host supplies the stencil values in the Stencil register. This is used when a constant stencil value is needed, for example, when clearing the stencil buffer when fast clear planes are not available. |
| LBSourceData: (stencil value read from the localbuffer) | This is used, for instance, in the OpenGL copy pixels function when the stencil planes are to be copied to the destination. The source is offset from the destination by the value in LBSourceOffset register. |
| Source stencil value read from the localbuffer | This is used, for instance, in the OpenGL copy pixels function when the stencil planes in the destination are not to be updated. The stencil data will come either from the localbuffer date, or the FCStencil register, depending on whether fast clear operations are enabled. |

Depth Test Unit

The depth (Z) test, if enabled, compares a fragment's depth against the corresponding depth in the depth buffer. The result of the depth test can effect the updating of the stencil buffer if stencil testing is enabled. This test is only performed if all the preceding tests (bitmask, scissor, stipple, alpha, pixel ownership, stencil) have passed. The source value can be obtained from a number of places as controlled by a field in the DepthMode register:

| Source | Use |
| --- | --- |
| DDA (see below) | This is used for normal Depth buffered 3D rendering. |
| Depth register | This is used, for instance, in the OpenGL draw pixels function where the host supplies the depth values through the Depth register. Alternatively this is used when a constant depth value is needed, for example, when clearing the depth buffer (when fast clear planes are not available) or 2D rendering where the depth is held constant. |
| LBSourceData: Source depth value from the localbuffer | This is used, for instance, in the OpenGL copy pixels function when the depth planes are to be copied to the destination. |
| Source Depth | This is used, for instance, in the OpenGL copy pixels function when the depth planes in the destination are not updated. The depth data will come either from the localbuffer or the FCDepth register depending the state of the Fast Clear modes in operation. |

When using the depth DDA for normal depth buffered rendering operations the depth values required are similar to those required for the color values in the color DDA unit:

ZStart=Start Z Value dZdYDom=Increment along dominant edge.

dZdX=Increment along the scan line.

The dZdX value is not required for Z-buffered lines.

The depth unit must be enabled to update the depth buffer. If it is disabled then the depth buffer will only be updated if ForceL-BUpdate is set in the Window register.

Framebuffer Read/Write Unit

Before rendering can take place GLINT must be configured to perform the correct framebuffer read and write operations. Framebuffer read and write modes effect the operation of alpha blending, logic ops, write masks, image upload/download operations and the updating of pixels in the framebuffer.

Framebuffer Read

The FBReadMode register allows GLINT to be configured to make 0, 1 or 2 reads of the framebuffer. The following are the most common modes of access to the framebuffer: Note that avoiding unnecessary additional reads will enhance performance.

Rendering operations with no logical operations, software write-masking or alpha blending. In this case no read of the framebuffer is required and framebuffer writes should be enabled.

Rendering operations which use logical ops, software write masks or alpha blending. In these cases the destination pixel must be read from the framebuffer and framebuffer writes must be enabled.

Image copy operations. Here setup varies depending on whether hardware or software write masks are used. For software write masks, the framebuffer needs two reads, one for the source and one for the destination. When hardware write masks are used (or when the software write mask allows updating of all bits in a pixel) then only one read is required.

Image upload. This requires reading of the destination framebuffer reads to be enabled and framebuffer writes to be disabled.

Image download. In this case no framebuffer read is required (as long as software writemasking and logic ops are disabled) and the write must be enabled.

For both the read and the write operations, an offset is added to the calculated address. The source offset (FBSourceOffset) is used for copy operations. The pixel offset (FBPixelOffset) can be used to allow multi-buffer updates. The offsets should be set to zero for normal rendering.

The data read from the framebuffer may be tagged either FBDefault (data which may be written back into the framebuffer or used in some manner to modify the fragment color) or FBColor (data which will be uploaded to the host). The table below summarizes the framebuffer read/write control for common rendering operations:

| Read-Source | ReadDestination | Writes | Read Data Type | Rendering Operation |
|---|---|---|---|---|
| Disabled | Disabled | Enabled | — | Rendering with no logical operations, software write masks or blending. |
| Disabled | Disabled | Enabled | — | Image download. |
| Disabled | Enabled | Disabled | FBColor | Image upload. |
| Enabled | Disabled | Enabled | FBDefault | Image copy with hardware write masks. |
| Disabled | Enabled | Enabled | FBDefault | Rendering using logical operations, software write masks or blending. |
| Enabled | Enabled | Enabled | FBDefault | Image copy with software writemasks. |

Framebuffer Write

Framebuffer writes must be enabled to allow the framebuffer to be updated. A single 1 bit flag controls this operation.

The framebuffer write unit is also used to control the operation of fast block fills, if supported by the framebuffer. Fast fill rendering is enabled via the FastFillEnable bit in the Render command register, the framebuffer fast block size must be configured to the same value as the FastFillIncrement in the Render command register. The FBBlockColor register holds the data written to the framebuffer during a block fill operation and should be formatted to the 'raw' framebuffer format. When using the framebuffer in 8 bit packed mode the data should be replicated into each byte. When using the framebuffer in packed 16 bit mode the data should be replicated into the top 16 bits.

When uploading images the UpLoadData bit can be set to allow color formatting (which takes place in the Alpha Blend unit).

It should be noted that the block write capability provided by the chip of the presently preferred embodiment is itself believed to be novel. According to this new approach, a graphics system can do masked block writes of variable length (e.g. 8, 16, or 32 pixels, in the presently preferred embodiment). The rasterizer defines the limits of the block to be written, and hardware masking logic in the framebuffer interface permits the block to be filled in, with a specified primitive, only up to the limits of the object being rendered. Thus the rasterizer can step by the Block Fill increment. This permits the block-write capabilities of the VRAM chips to be used optimally, to minimize the length which must be written by separate writes per pixel.

Alpha Blend Unit

Alpha blending combines a fragment's color with those of the corresponding pixel in the framebuffer. Blending is supported in RGBA mode only.

Alpha Blending

The alpha blend unit combines the fragment's color value with that stored in the framebuffer, using the blend equation:

$$C_o = C_s S + C_d D$$

where: $C_o$ is the output color; $C_s$ is the source color (calculated internally); $C_d$ is the destination color read from the framebuffer; S is the source blending weight; and D is the destination blending weight. S and D are not limited to linear combinations; lookup functions can be used to implement other combining relations.

If the blend operations require any destination color components then the framebuffer read mode must be set appropriately.

Image Formatting

The alpha blend and color formatting units can be used to format image data into any of the supported GLINT framebuffer formats.

Consider the case where the framebuffer is in RGBA 4:4:4:4 mode, and an area of the screen is to be uploaded and stored in an 8 bit RGB 3:3:2 format. The sequence of operations is:

Set the rasterizer as appropriate

Enable framebuffer reads

Disable framebuffer writes and set the UpLoadData bit in the FBWriteMode register Enable the alpha blend unit with a blend function which passes the destination value and ignores the source value (source blend Zero, destination blend One) and set the color mode to RGBA 4:4:4:4

Set the color formatting unit to format the color of incoming fragments to an 8 bit RGB 3:3:2 framebuffer format.

The upload now proceeds as normal. This technique can be used to upload data in any supported format.

The same technique can be used to download data which is in any supported framebuffer format, in this case the rasterizer is set to sync with FBColor, rather than Color. In this case framebuffer writes are enabled, and the UpLoadData bit cleared.

Color Formatting Unit

The color formatting unit converts from GLINT's internal color representation to a format suitable to be written into the framebuffer. This process may optionally include dithering of the color values for framebuffers with less than 8 bits width per color component. If the unit is disabled then the color is not modified in any way.

As noted above, the framebuffer may be configured to be RGBA or Color Index (CI).

Color Dithering

GLINT uses an ordered dither algorithm to implement color dithering. Several types of dithering can be selected.

If the color formatting unit is disabled, the color components RGBA are not modified and will be truncated when placed in the framebuffer. In CI mode the value is rounded to the nearest integer. In both cases the result is clamped to a maximum value to prevent overflow.

In some situations only screen coordinates are available, but window relative dithering is required. This can be implemented by adding an optional offset to the coordinates before indexing the dither tables. The offset is a two bit number which is supplied for each coordinate, X and Y. The XOffset, YOffset fields in the DitherMode register control this operation, if window relative coordinates are used they should be set to zero.

Logical Op Unit

The logical op unit performs two functions; logic operations between the fragment color (source color) and a value from the framebuffer (destination color); and, optionally, control of a special GLINT mode which allows high performance flat shaded rendering.

High Speed Flat Shaded Rendering

A special GLINT rendering mode is available which allows high speed rendering of unshaded images. To use the mode the following constraints must be satisfied:

Flat shaded aliased primitive

No dithering required

No logical ops

No stencil, depth or GID testing required

No alpha blending

The following are available:

Bit masking in the rasterizer

Area and line stippling

User and Screen Scissor test

If all the conditions are met then high speed rendering can be achieved by setting the FBWriteData register to hold the framebuffer data (formatted appropriately for the framebuffer in use) and setting the UseConstantFBWriteData bit in the LogicalOpMode register. All unused units should be disabled.

This mode is most useful for 2D applications or for clearing the framebuffer when the memory does not support block writes. Note that FBWriteData register should be considered volatile when context switching.

Logical Operations

The logical operations supported by GLINT are:

| Mode | Name | Operation | Mode | Name | Operation |
|---|---|---|---|---|---|
| 0 | Clear | 0 | 8 | Nor | ~(S \| D) |
| 1 | And | S & D | 9 | Equivalent | ~(S ^ D) |
| 2 | And Reverse | S & ~D | 10 | Invert | ~D |
| 3 | Copy | S | 11 | Or Reverse | S \| ~D |
| 4 | And Inverted | ~S & D | 12 | Copy Invert | ~S |
| 5 | Noop | D | 13 | Or Invert | ~S \| D |
| 6 | Xor | S ^ D | 14 | Nand | ~(S & D) |
| 7 | Or | S \| D | 15 | Set | 1 |

Where:

S=Source (fragment) Color, D=Destination (framebuffer) Color.

For correct operation of this unit in a mode which takes the destination color, GLINT must be configured to allow reads from the framebuffer using the FBReadMode register.

GLINT makes no distinction between RGBA and CI modes when performing logical operations. However, logical operations are generally only used in CI mode.

Framebuffer Write Masks

Two types of framebuffer write masking are supported by GLINT, software and hardware. Software write masking requires a read from the framebuffer to combine the fragment color with the framebuffer color, before checking the bits in the mask to see which planes are writeable. Hardware write masking is implemented using VRAM write masks and no framebuffer read is required.

Software Write Masks

Software write masking is controlled by the FBSoftwareWriteMask register. The data field has one bit per framebuffer bit which when set, allows the corresponding framebuffer bit to be updated. When reset it disables writing to that bit. Software write masking is applied to all fragments and is not controlled by an enable/disable bit. However it may effectively be disabled by setting the mask to all 1's. Note that the ReadDestination bit must be enabled in the FBReadMode register when using software write masks, in which some of the bits are zero.

Hardware Write Masks

Hardware write masks, if available, are controlled using the FBHardwareWriteMask register. If the framebuffer supports hardware write masks, and they are to be used, then software write masking should be disabled (by setting all the bits in the FBSoftwareWriteMask register). This will result in fewer framebuffer reads when no logical operations or alpha blending is needed.

If the framebuffer is used in 8 bit packed mode, then an 8 bit hardware write mask must be replicated to all 4 bytes of the FBHardwareWriteMask register. If the framebuffer is in 16 bit packed mode then the 16 bit hardware write mask must be replicated to both halves of the FBHardwareWriteMask register.

Host Out Unit

Host Out Unit controls which registers are available at the output FIFO, gathering statistics about the rendering operations (picking and extent testing) and the synchronization of GLINT via the Sync register. These three functions are as follows:

Message filtering. This unit is the last unit in the core so any message not consumed by a preceding unit will end up here. These messages will fall in to three classifications: Rasterizer messages which are never consumed by the earlier units, messages associated with image uploads, and finally programmer mistakes where an invalid message was written to the input FIFO. Synchronization messages are a special category and are dealt with later. Any messages not filtered out are passed on the output FIFO.

Statistic Collection. Here the active step messages are used to record the extent of the rectangular region where rasterization has been occurring, or if rasterization has occurred inside a specific rectangular region. These facilities are useful for picking and debug activities.

Synchronization. It is often useful for the controlling software to find out when some rendering activity has finished, to allow the timely swapping or sharing of buffers, reading back of state, etc. To achieve this the software would send a Sync message and when this reached this unit any preceding messages or their actions are guaranteed to have finished. On receiving the Sync message it is entered into the FIFO and optionally generates an interrupt.

Sample Board-Level Embodiment

A sample board incorporating the GLINT chip may include simply:

the GLINT chip itself, which incorporates a PCI interface;

Video RAM (VRAM), to which the chip has read-write access through its frame buffer (FB) port;

DRAM, which provides a local buffer then made for such purposes as Z buffering; and a RAMDAC, which provides analog color values in accordance with the color values read out from the VRAM.

Thus one of the advantages of the chip of the presently preferred embodiment is that a minimal board implementation is a trivial task.

Figure 3A:
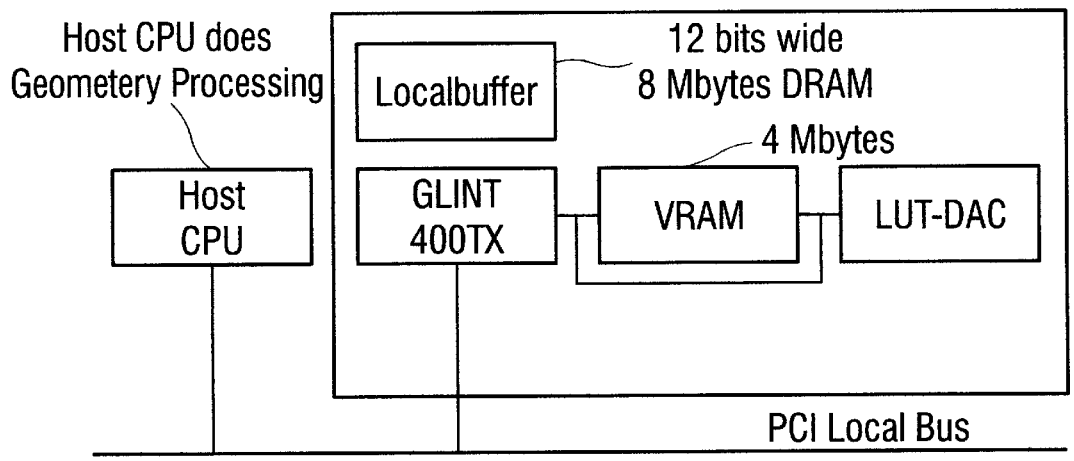
FIG. 3A shows a sample graphics board which incorporates the chip of FIG. 2A.

FIG. 3A shows a sample graphics board which incorporates the chip of FIG. 2A.

Figure 3B:
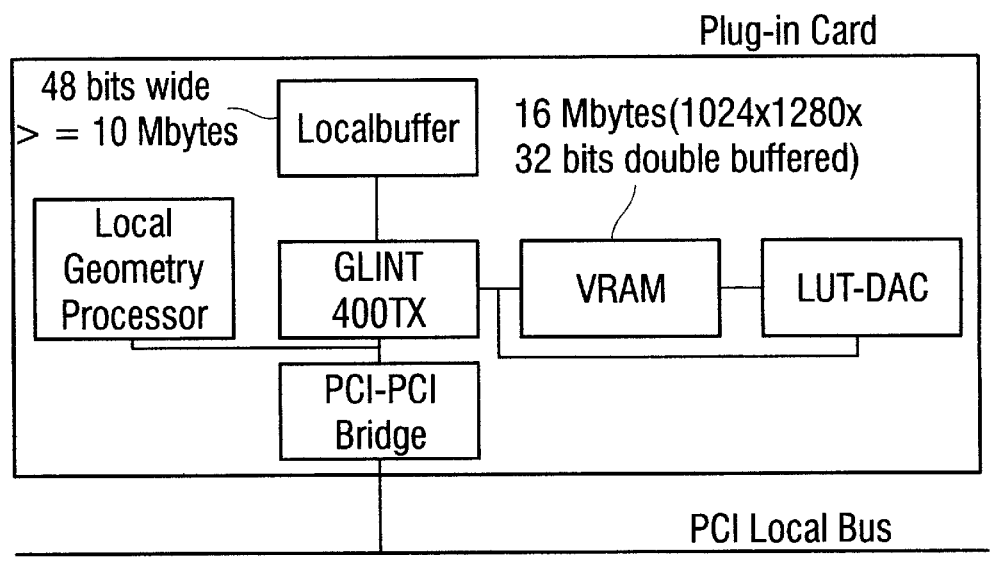
FIG. 3B shows another sample graphics board implementation, which differs from the board of FIG. 3A in that more memory and an additional component is used to achieve higher performance.

FIG. 3B shows another sample graphics board implementation, which differs from the board of FIG. 3A in that more memory and an additional component is used to achieve higher performance.

Figure 3C:
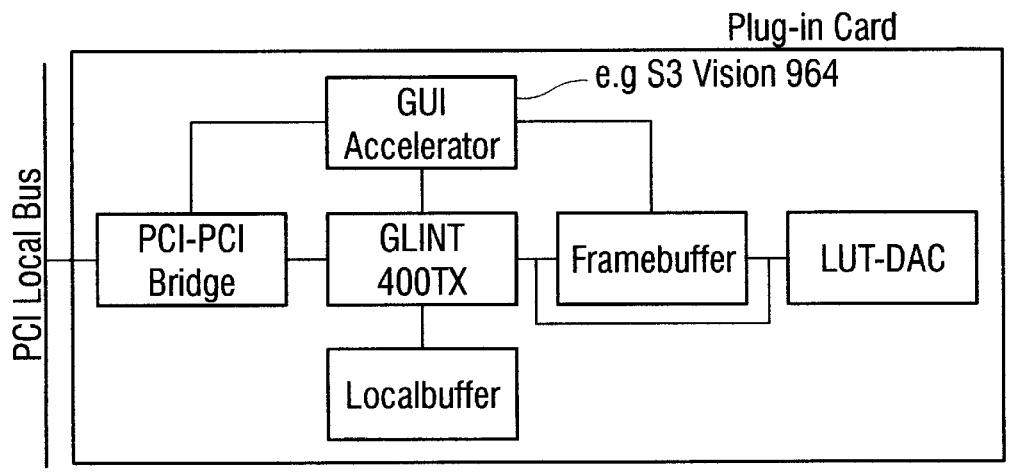
FIG. 3C shows another graphics board, in which the chip of FIG. 2A shares access to a common frame store with GUI accelerator chip.

FIG. 3C shows another graphics board, in which the chip of FIG. 2A shares access to a common frame store with GUI accelerator chip.

Figure 3D:
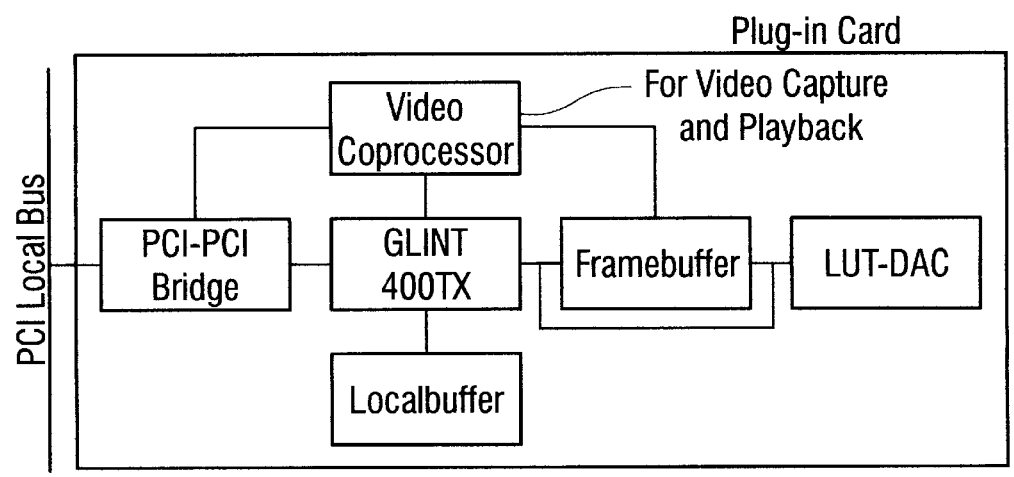
FIG. 3D shows another graphics board, in which the chip of FIG. 2A shares access to a common frame store with a video coprocessor (which may be used for video capture and playback functions.

FIG. 3D shows another graphics board, in which the chip of FIG. 2A shares access to a common frame store with a video coprocessor (which may be used for video capture and playback functions (e.g. frame grabbing).

Alternative Board Embodiment with Additional Video Processor

In the presently preferred embodiment, the frame buffer interface of the GLINT chip contains additional simple interface logic, so that two chips can both access the same frame buffer memory. This permits the GLINT chip to be combined with an additional chip for management to the graphics produced by the graphical user interface. This provides a migration path for users and applications who need to take advantage of the existing software investment and device drivers for various other graphics chips.

FIG. 3C shows another graphics board, in which the chip of FIG. 2A shares access to a common frame store with a GUI accelerator chip (such as an S3 chip). This provides a path for software migration, and also provides a way to separate 3D rendering tasks from 2D rendering.

In this embodiment, a shared framebuffer is used to enable multiple devices to read or write data to the same physical framebuffer memory. Example applications using the GLINT 300SX:

Using a video device as a coprocessor to GLINT, to grab live video into the framebuffer, for displaying video in a window or acquiring a video sequence;

Using GLINT as a 3D coprocessor to a 2D GUI accelerator, preserving an existing investment in 2D driver software.

In a coprocessor system, the framebuffer is a shared resource, and so access to the resource needs to be arbitrated. There are also other aspects of sharing a framebuffer that need to be considered:

Memory refreshing;

Transfer of data from the memory cells into the shift registers of the VRAM;

Control of writemasks and color registers. GLINT uses the S3 Shared Frame Buffer Interface (SFBI) to share a framebuffer. This interface is able to handle all of the above aspects for two devices sharing a frame buffer, with the GLINT acting as an arbitration master or slave.

Timing Considerations in Shared Frame-Buffer Interface

The Control Signals used in the Shared Framebuffer interface, in the presently preferred embodiment, are as follows:

GLINT as Primary Controller

FBReqN is internally re-synchronized to System Clock.

FBSelOEN remains negated.

FBGntN is asserted an unspecified amount of time after FBReqN is asserted. -Framebuffer Address, Data and Control lines are tri-stated by GLINT (the control lines should be held high by external pull-up resistors). The secondary controller is now free to drive the Framebuffer lines and access the memory.

FBGntN remains asserted until GLINT requires a framebuffer access, or a refresh or transfer cycle.

FBReqN must remain asserted while FBGntN is asserted.

When FBGntN is removed, the secondary controller must relinquish the address, data and control bus in a graceful manner—i.e. RAS, CAS, WE and OE must all be driven high before being tri-stated.

The secondary controller must relinquish the bus and negate FBReqN within 500 ns of FBGntN being negated.

Once FBReqN has been negated, it must remain inactive for at least 2 system clocks (40 ns at 50 MHz).

GLINT as a Secondary Controller

Framebuffer Refresh and VRAM transfer cycles by GLINT are turned off when GLINT is a secondary framebuffer controller.

GLINT asserts FBReqN whenever is requires a framebuffer access.

FBGntN is internally re-synchronized to system clock.

When FBGntN is asserted, GLINT drives FBselOEN to enable any external buffers used to drive the control signals, and then drives the framebuffer address, data and control lines to perform the memory access. FBReqN remains asserted while FBGntN is asserted.

When FBGntN is negated, GLINT finishes any outstanding memory cycles, drives the control lines inactive, negates FBselOEN and then tri-states the address, data and control lines, then releases FBReqN. GLINT guarantees to release FBReqN within 500 ns of FBGntN being negated.

GLINT will not reassert FBReqN within 4 system clock cycles (80 ns @ 50 MHz).

Considerations for Board-Level Implementations

The following are some points to be noted when implementing a shared framebuffer design with a GLINT 300SX:

Some 2D GUI Accelerators such as the S3 Vision964, and GLINT use configuration resistors on the framebuffer databus at reset. In this case care should be taken with the configuration setup where it effects read only registers inside either device. If conflicts exist that can not be resolved by the board initialization software, then the conflicts should be resolved by isolating the two devices from each other at reset so they can read the correct configuration information. This isolation need only be done for the framebuffer databus lines that cause problems;

GLINT should be configured as the secondary controller when used with an S3 GUI accelerator, as the S3 devices can only be primary controllers;

GLINT cannot be used on the daughter card interface as described in the S3 documentation, because this gives no access to the PCI bus. A suitable PCI bridge should be used in a design with a PCI 2D GUI accelerator and GLINT so they can both have access to the PCI bus;

The use of ribbon cable to carry the framebuffer signals between two PCI boards is not recommended, because of noise problems and the extra buffering required would impact performance;

The GLINT 300SX does not provide a way of sharing its localbuffer.

In addition to the above capabilities of the 300SX, the 300TX will also allow grabbing of live video into the localbuffer and real-time texture mapping of that video into the framebuffer for video manipulation effects.

The GLINT GiGi Preferred System Context

Derivation of Gigi from GLINT

Gigi is a derivative of GLINT and reuses much of its technology. The following table outlines how Gigi has been derived from GLINT, and major changes made.

| GLINT Unit | Gigi changes |
| --- | --- |
| Rasterizer | Antialiasing removed. |
| Scissor/Stipple | Line stipple removed; area stipple simplified to 8×8. |
| Color DDA | Size of color components reduced to 5.3, 5.3, 5.3, 5.3. |
| Texture Address | Support for mipmaps simplified to 2×2 averaging filter. |
| Texture Read | Similar. |
| Texture/Fog/Color | Support for linear interpolation simplified to 2×2 filter. Decal and blend texture modes not supported. Blend unit incorporated. |
| Alpha Test | Modified to do color key and color validity test. |
| Local Buffer Read | Similar. |
| GID/Z/Stencil | GID functionality not supported. Range of Z values reduced. Stencil simplifed to 1 bit. |
| Local Buffer Write | Similar. |
| Framebuffer Read | Similar. |
| Blend | Moved to the Texture/Fog/Color unit. |
| Dither | Similar. |
| Logic Ops | Similar. |
| Framebuffer Write | Similar. |
| Host Out | Similar. |

Gigi has added one extra unit to the core, host in, which is used to unpack data sent from the host.

The GLINT GiGi system further varies from the above description in that is does not differentiate externally between the local buffer and the framebuffer. This saves pins and allows efficient use of memory. Internally, the separate local buffer and framebuffer units have been kept; keeping them separate allows memory accesses of similar type to be grouped efficiently. They do occupy the same physical memory, and the local buffer and back frame buffer can be used as a common unified memory.

Access to the memory is handled by separate read and write units. If random reads and writes were done there would be a danger of stale data in the read unit being used after a location had been updated by the write unit. This does not happen within a primitive because the rasterization rules ensure that each pixel is touched only once, hence the complete primitive can be read before any of it is written.

It is possible that consecutive primitives could touch the same pixel, so safeguards are needed to make sure that all writes for one primitive have completed before reads begin for the next. This is triggered by the PrepareToRender message or Sync message which causes the localbuffer and framebuffer read units to suspend reads until the PrepareToRender or Sync message has reached the corresponding write unit.

The Sync message not only suspends reads until writes have completed, but also forces all writes to complete before the message is passed on to the next unit. When this message appears at the host out unit the complete chip will be synchronized. All data will have been written to memory and no units will be operating.

Synchronization is maintained between read and write units for particular buffer, but not between buffers of different types. Because the Gigi memory is unified it is possible to use the framebuffer unit to modify local buffer or texture buffer data. If this is done then the chip should be synchronized before the modified data is used. This is likely to happen when textures are downloaded through the framebuffer unit; a Sync message should be sent before the texture is used.

It would be possible to synchronize the texture read unit with the framebuffer write unit, but this would be inefficient for the common case of applying textures because the pipeline would stall until all writes for the previous primitive had completed. It is more efficient to synchronize the chip after texture download.

The GLINT GiGi further differs from the above description in its use of the innovative memory patching technique of the present application.

Innovative Use of Unified Local and Frame Buffers

The GLINT GiGi uses local memory to store front and back color buffers, a depth buffer, and texture maps. The memory is handled as a unified resource that can be allocated in different ways to suit the needs of the application. If depth buffering is not needed then the depth buffer memory can be used for texture or perhaps a third color buffer. If texturing is not needed then the texture map memory can be used for other things.

In a system using depth buffering there is normally one depth buffer and two color buffers; the front color buffer is displayed while the back buffer is drawn to. When the back buffer is complete it is swapped with the front buffer to be displayed while the next frame is drawn. The unified memory design of the chip of the presently preferred embodiment gives the innovative technique that combines the depth buffer with one of the color buffers.

The depth buffer is combined with the back buffer by performing the rendering in two passes. In the first pass depth information is drawn into the buffer and in the second pass color data is drawn into the buffer. This takes two passes of the image database, and requires the depth data to be the same size as the color data. In the presently preferred embodiment, a 16-bit depth buffer is used, so a 16 bit pixel size is also preferably used, such as five bits of red, green and blue, and one bit of alpha.

Half of the depth range is sacrificed so that depth data can be distinguished from color data; the most significant bit is set for color data and cleared for depth data. The simplest approach starts, in the presently preferred embodiment, by clearing the combined buffer to 0x7FFF. The depth test is set to pass if the new depth value is less than the old depth value, so the present image is to be rendered. Depth data is written to memory, but color data is not written. After the image has been drawn the buffer holds a record of the depth values "nearest" to the viewer, i.e. the visible objects or object portions on the display. The image is then redrawn with the depth test set to equal, i.e. the test passes if the current computed depth value for a given pixel equals the stored depth value from the first pass. On a pass, the new depth data is not written to the memory; instead, the color data is written in its place. Thus, the depth data in the buffer is replaced by color data that corresponds to a pixel of the same depth value.

When a color is written to memory, the MSB, the alpha bit, is set to 1. The chip of the preferred embodiment allows the alpha value of a color to be forced to 1 or to 0 when it is written to memory. This allows the internal alpha value to be used for blending effects, and the external alpha value to be used for control operations such as per pixel double buffering, overlays, or combined depth and color buffers. Because the most significant bit is set when a color is written over its depth value, it is not possible for it to be interpreted as a depth value, so it will not be replaced.

In an alternative embodiment, the first clear of the depth buffer is removed. The screen is cleared to a background color first, and then the depth values are drawn on top of the color data. The depth test still functions properly because the background color has the most significant bit set so all depth values will be less than it and the depth test will pass. This avoids one clear of the buffer which is a useful time saving, even using block fill modes in VRAMs to clear buffers very quickly.

The GLINT GiGi Memory Unit

The memory unit supports up to 12 Mbytes of memory that can be a combination of VRAM (4 MBytes) and DRAM (8 MBytes); it is 32 bits wide. All video display is from VRAM, with pixel sizes of 8, 16 and 24 (unpacked) bits.

Figure 5A:
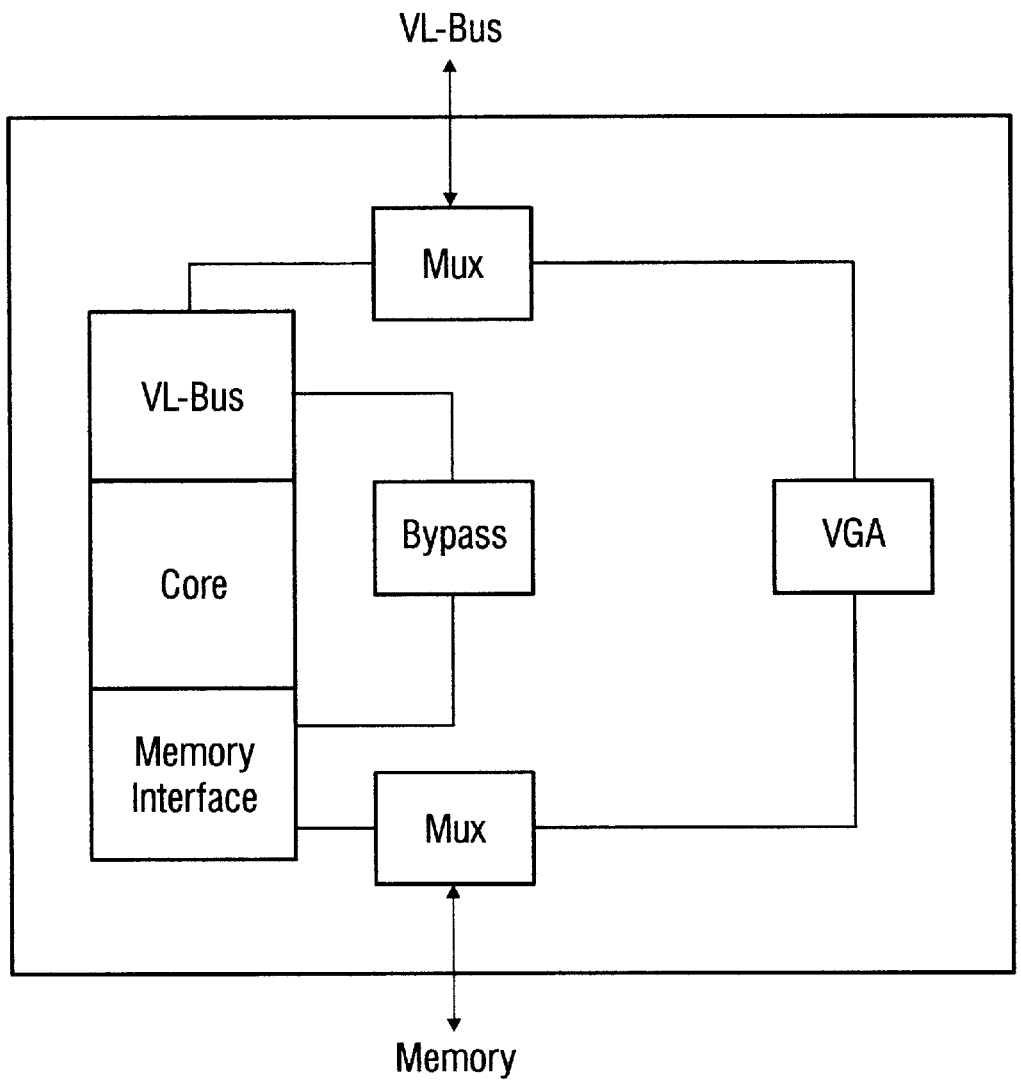
FIG. 5A is a block diagram of the graphics processor of the presently preferred embodiment.
Figure 5B:
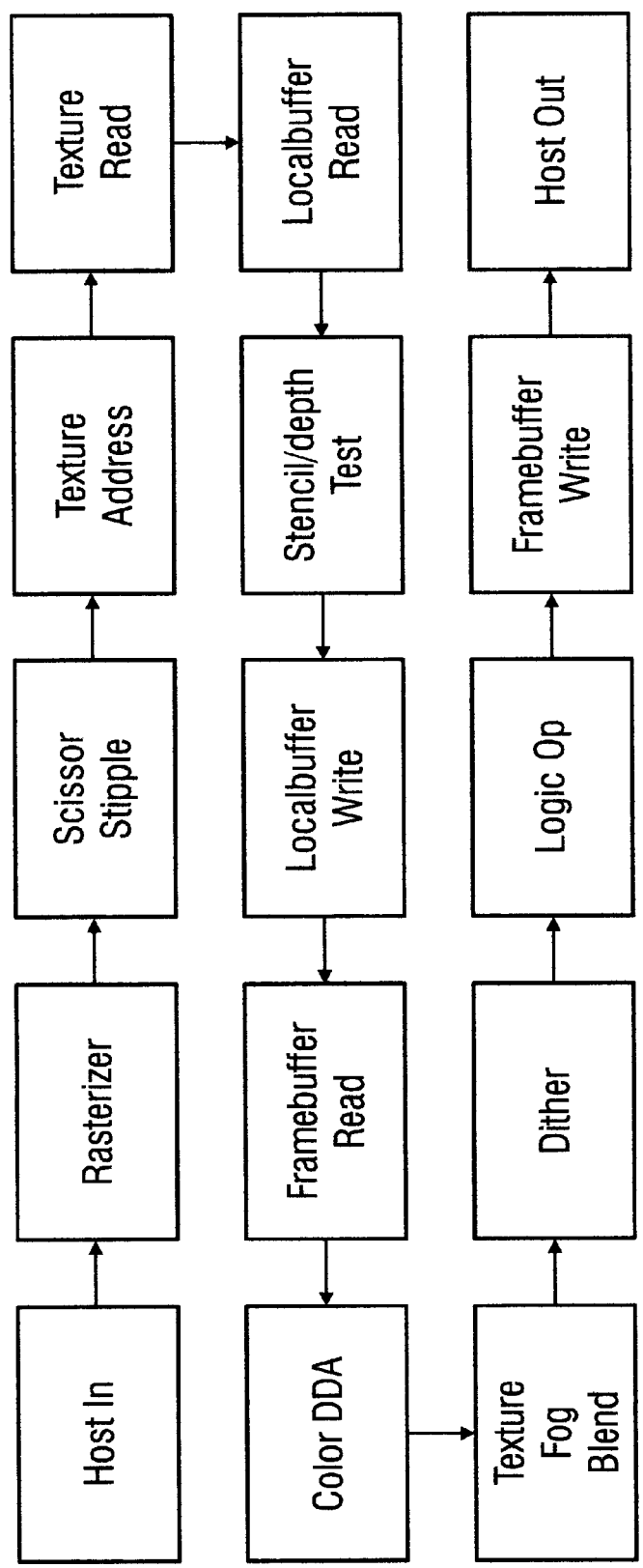
FIG. 5B is a view of the sequence of operations performed in the graphics rendering chip of the presently preferred embodiment.
Figure 5C:
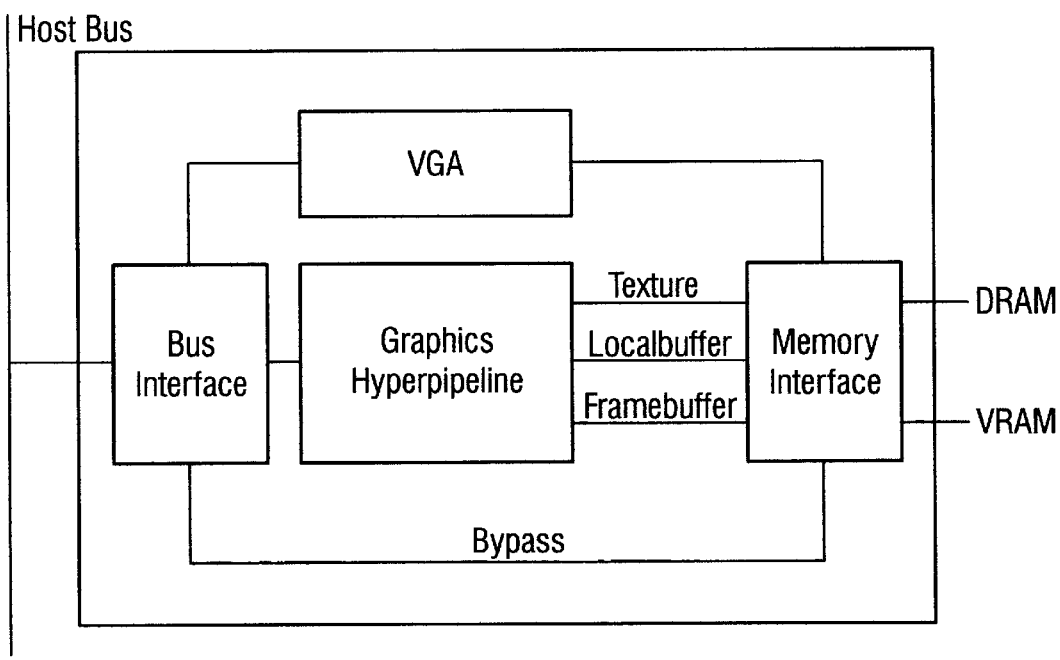
FIG. 5C shows a sample graphics board which incorporates the chip of the presently preferred embodiment.
Figure 5D:
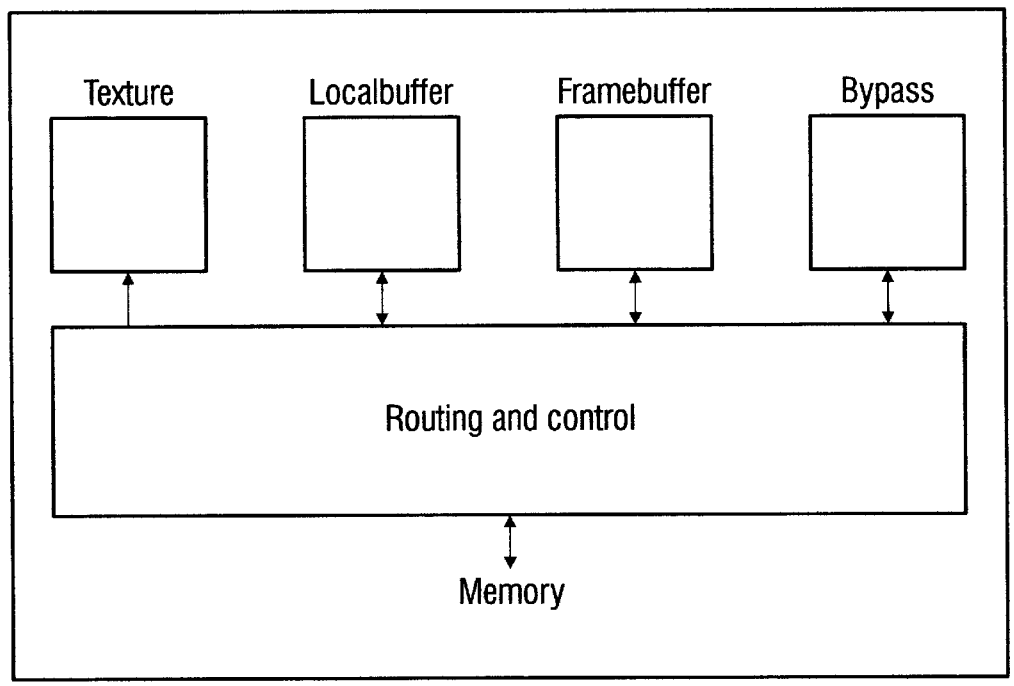
FIG. 5D is a block diagram of the memory unit of the presently preferred embodiment.

There are four interfaces to the memory unit. The texture, localbuffer and framebuffer connect directly to the core, the bypass comes from the bus interface. All the connections are read-write except the texture which is read only. A block diagram of the memory unit is shown in FIG. 5D.

The interfaces to the memory unit are all through fifos; this allows resynchronization and buffering. The order in which interfaces are serviced is important for performance, and is defined by the following rules:

1. Transfers have the highest priority.
2. Refresh has second priority.
3. Bypass has next priority to avoid bus time-outs.
4. The texture, local buffer and framebuffer have the same priority (lowest), but there are some sub-rules:
    4.1 Use the source that has the same type (i.e. read or write) as the last and does not cause a page break.
    4.2 Use the source that does not cause a page break.
    4.3 Use the next source in round-robin order of texture, local buffer, framebuffer.

Texture

The texture interface reads texture data from memory. It supplies addresses and accepts data through fifos. Data is read as 32 bit words and passed to the fifo in its raw format. The addresses are aligned to 32 bits and are valid for bits 23 to 2 inclusive.

Localbuffer

The localbuffer has separate fifos for read address, read data, write address and write data. The addresses are 22 bits wide (24 bit address aligned to 32 bits); the data fifos are 32 bits wide (the write data also has 2 word enable bits).

Framebuffer

The framebuffer has separate fifos for read address, read data, write address and write data. The addresses are 22 bits wide (24 bit address aligned to 32 bits); the data fifos are 32 bits wide (the write data also has 4 byte enable bits).

Bypass

The bypass does not use fifos for its interface; it has a single address register that holds the next address, and a single read data register and a single write data register. A bypass access can be for memory or control register; which is indicated by select lines supplied with the address.

Memory Control

The memory unit generates its own refresh signals; these are combined with signals from the video timing generator that can indicate the need for a VRAM shift register update.

Shared Framebuffer Interface

The memory unit supports the S3 shared framebuffer interface as a primary controller. It can accept requests, issues grants and control the output enables.

Memory Types

The memory can be composed of a mixture of VRAM and DRAM, but only data in VRAM can be displayed. The width of the memory is always 32 bits; up to two banks of VRAM and two banks of DRAM are supported. Possible memory configurations with common VRAM and DRAM parts are:

| Banks | 2 Mbit × 8 | 4 Mbit × 16 |
|---|---|---|
| 1 | 1 Mbyte | 1 Mbyte |
| 2 | 2 Mbytes | 2 Mbytes |
| 3 | 3 Mbytes | 3 Mbytes |
| 4 | 4 Mbytes | 4 Mbytes |

VRAM memory buffer configurations

| Banks | 4 Mbit × 16 | 16 Mbit × 16 |
|---|---|---|
| 1 | 1 Mbyte | 4 Mbytes |
| 2 | 2 Mbytes | 8 Mbytes |

DRAM memory buffer configuations

The memory control signals are programmable to allow for optimum operation at different Gigi clock speeds with memory systems using –50 to –80 speed parts. Gigi has been designed to work with memories with the following characteristics:

dual CAS;

CAS-BEFORE-RAS refresh;

split transfer cycles (VRAM only);

block fill modes (VRAM only, optional);

write masks (VRAM only, optional).

Internal Signal Definition

The memory unit uses the following signals to interface to the rest of the chip; signal meanings are with respect to the core.

| Name | Width | Source | Description |
|---|---|---|---|
| Texture | | | |
| TXRU = framebuffer read unit, MEM = memory unit. | | | |
| TXReadAddr | 22 | TXRU | Read address to read address fifo. |
| TXReadAddrStrobe | 1 | TXRU | Load data into read address fifo. |
| TXReadDataStrobe | 1 | TXRU | Advance read data fifo. |
| TXReadAddrFull | 1 | MEM | Read address fifo is full. |

-continued

| Name | Width | Source | Description |
| --- | --- | --- | --- |
| TXReadData | 32 | MEM | Read data from read data fifo. |
| TXReadDataValid | 1 | MEM | Data is valid in read data fifo. |
| Local Buffer | | | |
| LBRU = local buffer read unit, MEM = memory unit. | | | |
| LBReadAddr | 22 | LBRU | Read address to read address fifo. |
| LDReadCmd | 1 | LBRU | Suspend reads signal in read address fifo. |
| LBReadAddrStrobe | 1 | LBRU | Load address and control into fifo. |
| LBReadAddrFull | 1 | MEM | Read address fifo is full. |
| LBReadData | 32 | MEM | Read data from read data fifo. |
| LBReadDataValid | 1 | MEM | Data is valid in read data fifo. |
| LBReadDataStrobe | 1 | LBRU | Advance read data fifo. |
| LBWU = localbuffer write unit, MEM = memory unit. | | | |
| LBWriteAddr | 22 | LBWU | Write address to fifo. |
| LBWriteData | 32 | LBWU | Write data to fifo. |
| LBWriteEnables | 2 | LBWU | Short word enables to fifo. |
| LBWriteCmd | 1 | LBWU | Command to fifo. |
| LBWriteStrobe | 1 | LBWU | Load data into fifo. |
| LBWritesComplete | 1 | MEM | All outstanding writes have completed. |
| LBWriteFull | 1 | MEM | Fifo is full. |
| Framebuffer | | | |
| FBRU = framebuffer read unit, MEM = memory unit. | | | |
| FBReadAddr | 22 | FBRU | Read address to read address fifo. |
| FBReadCmd | 1 | FBRU | Suspend reads signal to read address fifo. |
| FBReadAddrStrobe | 1 | FBRU | Load data into read address fifo. |
| FBReadDataStrobe | 1 | FBRU | Advance read data fifo. |
| FBReadAddrFull | 1 | MEM | Read address fifo is full. |
| FBReadData | 32 | MEM | Read data from read data fifo. |
| FBReadDataValid | 1 | MEM | Data is valid in read data fifo. |
| FBWU = framebuffer write unit, MEM = memory unit. | | | |
| FBWriteAddr | 22 | FBWU | Address to fifo. |
| FBWriteData | 32 | FBWU | Data to fifo. |
| FBWriteEnables | 4 | FBWU | Byte enables to fifo. |
| FBWriteCmd | 3 | FBWU | Command data to fifo. |
| FBWriteStrobe | 1 | FBWU | Load fifo. |
| FBWriteFull | 1 | MEM | Write fifo full. |
| FBWritesComplete | 1 | MEM | All outstanding writes have completed. |

Memory Organization

The memory is divided into 4 banks of VRAM and 2 banks of DRAM. Not all the banks have to be fitted, the memory control register specifies the configuration. Banks of VRAM and DRAM are handled separately and have their own page detection logic. Banks of a particular type of memory are interleaved on 32 bit boundaries; as more banks are fitted they are interleaved with the existing parts. This extends the size of the memory page. The hardware block fill mechanism in the VRAMs uses the pixel write mask to specify which pixels should be written. The formation of the mask takes the number of banks into account. If the banks need different mask a number of accesses are done. If any of the banks need the same mask they are done in the same cycle. The block fill always handles 32 bytes regardless of the number of banks present.

The write per bit mask is loaded into an internal register; at each page break it is loaded into the memory. If the mask is aligned to byte boundaries it is handled by the byte enables so a mask of all ones is loaded. This allows accesses from the units which do not use the write mask (localbuffer, bypass) to access the area of memory without forcing a page break to reload the mask.

The Framebuffer Write Unit

The framebuffer write unit accepts texture data in its natural organization and writes the data to the memory on the fly according to the innovative patching techniques of the present disclosure. In this way, the memory patching is transparent to the user or programmer.

Packing, Copying and Block Fill in the Framebuffer Write Unit

The Framebuffer Write Unit combines accesses to bytes and 16 bitwords to minimize the number of accesses that are done to memory. The unit inspects the addresses and if consecutive ones are in the same 32 bit word the write is not done; only when the address is in a different 32 bit word does outstanding data get written to memory.

The fast block fill mechanism makes use of parallelism in the memory design and special features in the memory devices. Each VRAM memory part can write to 4 consecutive locations with one operation; the total number of memory locations filled depends on the number of memory parts fitted. A mask is generated and sent to the memory along with a block aligned address. The mask shows which pixels in the block should be written. A maximum of 32 pixels can be filled with one write, but the actual number will depend on the organization of the memory.

Packed copies move 32 bits at a time even though the real pixel size may be 8 or 16 bits. When packed copies are enabled the X values and count fed to the rasterizer should be divided by 2 or 4 (depending on the real pixel size); the Y values should stay as they are and the partial products kept the same. The address calculation scales the X value back to the correct pixel size before using it.

The PackedDataLimits message holds the left and right X values for the destination area of the screen in the native pixel format. The actual area rasterized by exceed this depending on the relative position of the source of the copy.

Any pixels falling outside these limits are not plotted. The relative offset field gives the number of pixels that the source data has to be adjusted by to align with the destination data.

Texture Read Unit Interface to Memory Unit

Figure 5E:
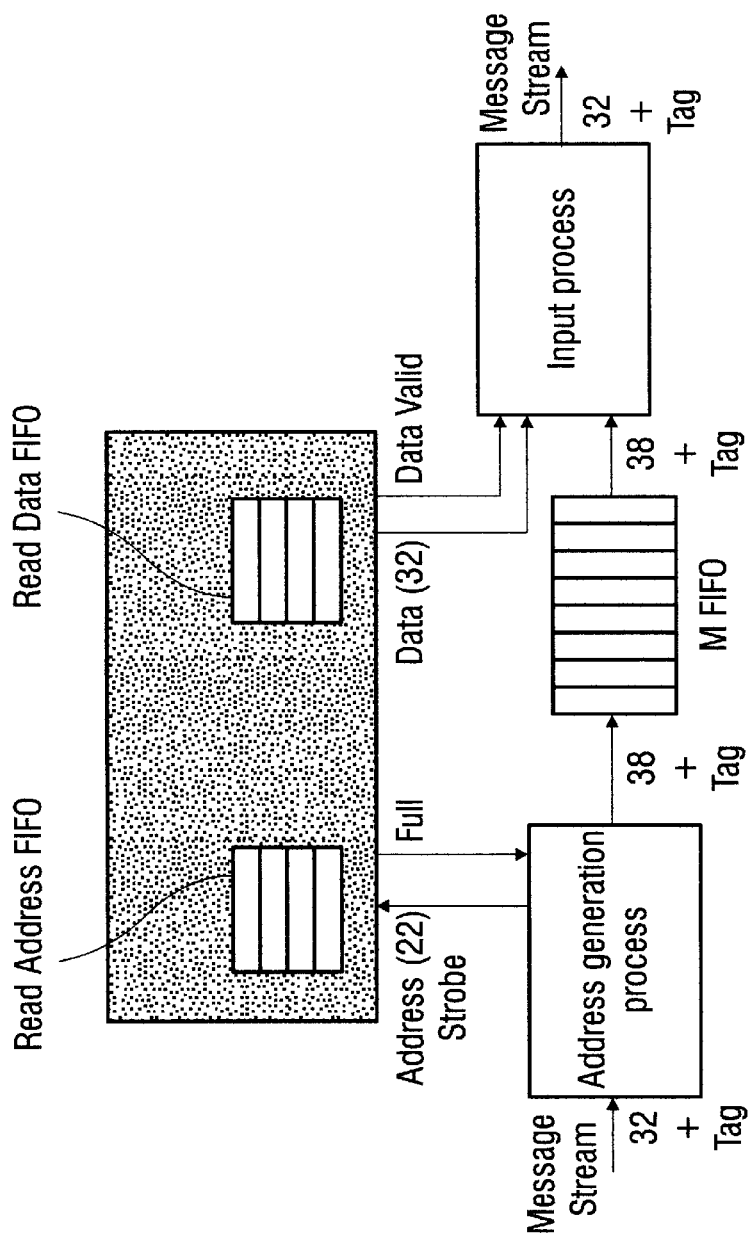
FIG. 5E is a block diagram of the texture read unit of the presently preferred embodiment.

The Texture Read Unit reads the patched texture data from the memory and restores its format before passing it to the graphics system. This translation is done transparently and on the fly. A block diagram of the Texture Read Unit is shown in FIG. 5E.

The table gives the signals that interface between the texture read unit and the memory unit. All signals are active high; the source column shows which unit generates the signal, TXRU=framebuffer read unit, MEM=memory unit.

| Name | Width | Source | Description |
|---|---|---|---|
| TXReadAddr | 22 | TXRU | Read address to read address fifo. |
| TXReadAddrStrobe | 1 | TXRU | Load data into read address fifo. |
| TXReadDataStrobe | 1 | TXRU | Advance read data fifo. |
| TXReadAddrFull | 1 | MEM | Read address fifo is full. |
| TXReadData | 32 | MEM | Read data from read data fifo. |
| TXReadDataValid | 1 | MEM | Data is valid in read data fifo. |

Addresses are always aligned to four bytes, so the lower 2 bits are always zero; these bits are not sent to the memory unit, so TXReadAddress is bits 23 to 2 inclusive of the address.

Texture Read Unit Address Generation

Address generation is done by the following equation:

$$address = (BaseAddress \pm (T * Width)) + S$$

The (Y*Width) may be added to or subtracted from the base address depending on whether the texture map origin is top or bottom left.

All addresses are in texels, so the final address must be scaled to form the byte address. Address calculations are done unsigned to 24 bits. Exceeding 24 bits causes the result to overflow and wrap around to zero.

The multiplication of Y and texture width is simplified by supporting a limited number of widths and using partial products. Three partial products are summed to produce the final value:

| Partial Product Code | Add into product | Shift amount |
|---|---|---|
| 0 | 0 | 0 |
| 1 | Y * 32 | Y << 5 |
| 2 | Y * 64 | Y << 6 |
| 3 | Y * 128 | Y << 7 |
| 4 | Y * 256 | Y << 8 |
| 5 | Y * 512 | Y << 9 |

Some common texture widths and the corresponding partial product codes are:

| Texture width | PP0 | PP1 | PP2 | Product |
|---|---|---|---|---|
| 32 | 1 | 0 | 0 | Y * (32 + 0 + 0) |
| 64 | 1 | 1 | 0 | Y * (32 + 32 + 0) |
| 640 | 4 | 4 | 3 | Y * (256 + 256 + 128) |
| 1280 | 5 | 5 | 4 | Y * (512 + 512 + 256) |

The texture widths supported are:

| | | | | |
|---|---|---|---|---|
| 0 | 32 | 64 | 96 | 128 |
| 160 | 192 | 224 | 256 | 288 |
| 320 | 352 | 384 | 416 | 448 |
| 512 | 544 | 576 | 608 | 640 |
| 672 | 704 | 768 | 800 | 832 |
| 896 | 1024 | 1056 | 1088 | |
| 1152 | 1280 | 1536 | | |

Shifts are used to convert texel addresses into byte addresses. Note that S and T replace X and Y from the normal address chain, but T is one bit bigger than Y.

When PackedData is enabled, the X value is taken to be in 32 bit texels while the Y value stays in whatever the real texel size is; the partial product values do not have to change. Data read in is as handled as though it is 32 bits wide; this can be used to accelerate 8 and 16 bit copies.

Packing in the Texture Read Unit

This unit combines accesses to bytes and 16 bit words to minimize the number of accesses that are done to memory. The address generation process inspects the addresses, and if consecutive ones are in the same 32 bit word only the first is sent. The packing information is passed to the input process so that it can read a new word from the data fifo at the right time and extract the correct bits from it.

This should not be confused with packed data which allows 8 or 16 bit data to treated as 32 bits within the core.

Local Buffer Read Unit Interface to Memory Unit

The table gives the signals that interface between the local buffer read unit and the memory unit. All signals are active high; the source column shows which unit generates the signal, LBRU=local buffer read unit, MEM=memory unit.

| Name | Width | Source | Description |
|---|---|---|---|
| LBReadAddr | 22 | LBRU | Read address to read address fifo. |
| LDReadCmd | 1 | LBRU | Suspend reads signal in read address fifo. |
| LBReadAddrStrobe | 1 | LBRU | Load address and control into fifo. |
| LBReadAddrFull | 1 | MEM | Read address fifo is full. |
| LBReadData | 32 | MEM | Read data from read data fifo. |
| LBReadDataValid | 1 | MEM | Data is valid in read data fifo. |
| LBReadDataStrobe | 1 | LBRU | Advance read data fifo. |

Addresses are always aligned to four bytes, so the lower 2 bits are always zero; these bits are not sent to the memory unit, so LBReadAddress is bits 23 to 2 inclusive of the address.

Accesses to the memory can be grouped and done in any order so long as all writes for a particular primitive have been completed before reads for the next are begun. This is ensured by the suspend read signal which specifies that reads should stop until all outstanding writes have completed; the memory unit is responsible for implementing this:

| ReadCmd | Action |
|---|---|
| 0 | Read data |
| 1 | Suspend reads |

Address Generation in the Local Buffer Read Unit

Address generation is done by the following equation:

$$\text{address} = (\text{WindowBaseAddress} \pm (Y*\text{Width})) + X + \text{SourceOffset}$$

The (Y*Width) may be added to or subtracted from the base address depending on whether the screen origin is top or bottom left. The SourceOffset is optionally added to form the source address; without this offset the calculation forms the destination address.

All addresses are in pixels (i.e. 2 bytes), so the final address must be scaled to form the byte address. Address calculations are done unsigned to 24 bits. Exceeding 24 bits causes the result to overflow and wrap around to zero.

The multiplication of Y and screen width is simplified by supporting a limited number of widths and using partial products. Three partial products are summed to produce the final value:

| Partial Product Code | Add into product | Shift amount |
|---|---|---|
| 0 | 0 | 0 |
| 1 | Y * 32 | Y << 5 |
| 2 | Y * 64 | Y << 6 |
| 3 | Y * 128 | Y << 7 |
| 4 | Y * 256 | Y << 8 |
| 5 | Y * 512 | Y << 9 |

Some common screen widths and the corresponding partial product codes are:

| Screen width | PP0 | PP1 | PP2 | Product |
|---|---|---|---|---|
| 640 | 5 | 3 | 0 | Y * (512 + 128 + 0) |
| 1024 | 5 | 5 | 0 | Y * (512 + 512 + 0) |
| 1152 | 5 | 5 | 3 | Y * (512 + 512 + 128) |
| 1280 | 5 | 5 | 4 | Y * (512 + 512 + 256) |

The screen widths supported are:

| | | | | |
|---|---|---|---|---|
| 0 | 32 | 64 | 96 | 128 |
| 160 | 192 | 224 | 256 | 288 |
| 320 | 352 | 384 | 416 | 448 |
| 512 | 544 | 576 | 608 | 640 |
| 672 | 704 | 768 | 800 | 832 |
| 896 | 1024 | 1056 | 1088 | |
| 1152 | 1280 | 1536 | | |

A shift is used to convert pixel addresses into byte addresses.

Packing in the Local Buffer Read Unit

This unit combines accesses to minimize the number of reads that are done from memory. The address generation process inspects the addresses, and if consecutive ones are in the same 32 bit word only the first is sent. The packing information is passed to the input process so that it can read a new word from the data fifo at the right time and extract the correct bits from it.

Memory Data Formats in the Local Buffer Read Unit

The local buffer data can have two formats in memory, either 16 its depth, or 15 bits depth and 1 bit stencil.

If a stencil is available it is the most significant bit of the word (bit 15); the depth values starts at bit 0 for all formats. If depth and stencil overlap the most significant bit of the depth field is also used for the stencil.

When data is read into the chip it is converted into an internal format which has room for 16 bits of depth and 1 bit stencil. If the data format has 15 bits of depth the internal data is right justified and padded with zero in the most significant bit.

Local Buffer Write Unit

The localbuffer write unit is responsible for:
- calculating the localbuffer write address of the fragment,
- packing the addresses to minimize the number of memory accesses,
- sending address and data to the memory unit.

The unit issues addresses to the memory unit along with data and control signals. The address is 22 bits wide (bits 1 an 0 are implicitly zero) and the data is 32 bits. There is one control signal:

| Control | Action |
|---|---|
| 0 | WriteData |
| 1 | ResumeReads |

Local Buffer Write Unit Interface to Memory Unit

The table gives the signals that interface the localbuffer write unit to the memory unit. All signals are active high; the source column shows which unit generates the signal, LBWU=localbuffer write unit, MEM=memory unit.

| Name | Width | Source | Description |
|---|---|---|---|
| LBWriteAddr | 22 | LBWU | Write address to fifo. |
| LBWriteData | 32 | LBWU | Write data to fifo. |
| LBWriteEnables | 2 | LBWU | Short word enables to fifo. |
| LBWriteCmd | 1 | LBWU | Command to fifo. |
| LBWriteStrobe | 1 | LBWU | Load data into fifo. |
| LBWritesComplete | 1 | MEM | All outstanding writes have completed. |
| LBWriteFull | 1 | MEM | Fifo is full. |

Accesses to the memory can be grouped in any order so long as all writes for a particular primitive complete before reads begin for the next primitive. This is handled by the suspend/resume read mechanism; the read unit issues a suspend reads signal to the memory unit which will stop reads until it sees a resume reads signal from the write unit.

The LBWritesComplete signal is passed directly from the memory unit to the localbuffer write unit and shows when all writes in the fifo have completed and been written to memory. This is used in synchronizing the chip, and must not be set until the final memory cycle has completed. Because a Sync message can flush the write unit and cause a memory write, care must be taken in implementing the Sync operation that enough time has been allowed for the LBWritesComplete signal to reach a valid state.

The LBWritesComplete signal also flushes any outstanding writes so that a Sync message does not have to be used to guarentee data gets written to the screen.

Address Generation in the Local Buffer Write Unit

Address generation is done by the following equation:

$$\text{address} = (\text{BaseAddress} \pm (Y*\text{width})) + X$$

The offset may be added to or subtracted from the base address depending on whether the screen origin is top or bottom left. The base address is supplied in the LBWriteBase message.

All addresses are in pixels, so the final address must be scaled to form the byte address. Address calculations are done unsigned to 24 bits. Exceeding 24 bits causes the result to overflow and wrap around to zero.

The multiplication of Y and screen width is simplified by supporting a limited number of widths and using partial products. Three partial products are summed to produce the final value:

| Partial Product Code | Add into product | Shift amount |
|---|---|---|
| 0 | 0 | 0 |
| 1 | Y * 32 | Y << 5 |
| 2 | Y * 64 | Y << 6 |
| 3 | Y * 128 | Y << 7 |
| 4 | Y * 256 | Y << 8 |
| 5 | Y * 512 | Y << 9 |

Some common screen widths and the corresponding partial product codes are:

| Screen width | PP0 | PP1 | PP2 | Product |
|---|---|---|---|---|
| 640 | 5 | 3 | 0 | Y * (512 + 128 + 0) |
| 1024 | 5 | 5 | 0 | Y * (512 + 512 + 0) |
| 1152 | 5 | 5 | 3 | Y * (512 + 512 + 128) |
| 1280 | 5 | 5 | 4 | Y * (512 + 512 + 256) |

The screen widths supported are:

| | | | | |
|---|---|---|---|---|
| 0 | 32 | 64 | 96 | 128 |
| 160 | 192 | 224 | 256 | 288 |
| 320 | 352 | 384 | 416 | 448 |
| 512 | 544 | 576 | 608 | 640 |
| 672 | 704 | 768 | 800 | 832 |
| 896 | 1024 | 1056 | 1088 | |
| 1152 | 1280 | 1536 | | |

Shifts are used to convert pixel addresses into byte addresses.

Packing in the Local Buffer Write Unit

This unit combines accesses to minimize the number of writes that are done to memory. The unit inspects the addresses and if consecutive ones are in the same 32 bit word the write is not done; only when the address is in a different 32 bit word does outstanding data get written to memory.

Memory Data Format in the Local Buffer Write Unit

The depth data always starts at the least significant bit; if it is 16 bits wide it takes up the whole 16 bit word, if it is 15 bits the upper bit is undefined. If not used by the depth data, the most significant bit is available for the stencil; if a stencil is not defined and the depth is 15 bits the upper bit should be set to zero. If the depth format is 15 bits, the conversion from the internal 16 bits to the external 15 bits is done by taking the lower 15 bits and clamping; if the 16th bit is set the value is clamped to 0x7FFF;

Input Messages to the Local Buffer Write Unit

| Localbuffer Read Register message group | | |
|---|---|---|
| Tag Mnemonic | Data Field | Description |
| LBWriteMode | See below | |
| LBWriteConfig | See LBRead unit. | |
| LBWriteBase | 24 bit unsigned base address | |

Depth as priority over stencil so if depth is set to 16 bits and stencil is set to 1 bit, the localbuffer holds 16 bits of depth.

The Framebuffer Read Unit

The Framebuffer Read Unit is responsible for:
calculating the framebuffer read addresses of the fragment,
packing the addresses to minimize the number of memory accesses,
sending the addresses to the memory unit,
receiving the framebuffer data.

Reads are usually done from the address that the fragment will eventually be written to if blendign or a logic op is needed. Copies can be done by generating a source address; a destination address may also be needed if the copy involves an operation on the destination pixels such as a logic op or blend. Source and destination data are sent in different messages so that can be distinguished later in the pipeline. Data can also be sent in the FBColor message for image upload.

The address generation process accepts messages from the pipeline; if the message is an active step and reads are enabled it generates an address which is sent to the read address fifo. All messages are passed to the M fifo where they are held while data is read from memory. All messages are held in the M fifo, even if they do not need data, so that the message ordering stays the same.

The input process reads messages from the M fifo and if it is a step message that needs data from memory it inserts a suitable data message into the pipeline. The data always precedes the step.

The read unit minimizes the number of memory accesses by reading 32 bits at a time from memory and taking consecutive reads from the same word. If the pixel size is 8 bits, 4 pixels can be read in one memory access. Information on how to unpack data is passed to the input process from the address generation process through the M fifo using 6 extra signals.

The extra signals are used to specify which part of the 32 bit word should be used for the message, how many bytes should be used, whether the existing 32 bit word can be used.

| Pack2 | Pack1 | Pack0 | Action |
|---|---|---|---|
| 0 | 0 | 0 | No read |
| 0 | 0 | 1 | 8 bit read from byte 0 |
| 0 | 1 | 0 | 8 bit read from byte 1 |
| 0 | 1 | 1 | 8 bit read from byte 2 |
| 1 | 0 | 0 | 8 bit read from byte 3 |
| 1 | 0 | 1 | 16 bit read from lower 16 bits |
| 1 | 1 | 0 | 16 bit read from upper 16 bits |
| 1 | 1 | 1 | 32 bit read |

Two signals are used to indicate the type of message that should be used to forward data to the next unit:

| Type1 | Type0 | Action |
|---|---|---|
| 0 | 0 | FBData |
| 0 | 1 | FBSourceData |
| 1 | 0 | FBColor |

The final signal, NewWord, specifies that a new 32 bit word should be read from the read data fifo before the data is used.

Framebuffer Read Unit Interface to Memory Unit

The table gives the signals that interface between the framebuffer read unit and the memory unit. All signals are active high; the source column shows which unit generates the signal, FBRU=framebuffer read unit, MEM=memory unit.

| Name | Width | Source | Description |
|---|---|---|---|
| FBReadAddr | 22 | FBRU | Read address to read address fifo. |
| FBReadCmd | 1 | FBRU | Suspend reads signal to read address fifo. |
| FBReadAddrStrobe | 1 | FBRU | Load data into read address fifo. |
| FBReadDataStrobe | 1 | FBRU | Advance read data fifo. |
| FBReadAddrFull | 1 | MEM | Read address fifo is full. |
| FBReadData | 32 | MEM | Read data from read data fifo. |
| FBReadDataValid | 1 | MEM | Data is valid in read data fifo. |

Addresses are always aligned to four bytes, so the lower 2 bits are always zero; these bits are not sent to the memory unit, so FBReadAddress is bits 23 to 2 inclusive of the address.

Accesses to the memory can be grouped and done in any order so long as all writes for a particular primitive have been completed before reads for the next are begun. This is ensured by the suspend read signal which specifies that reads should stop until all outstanding writes have completed; the memory unit is responsible for implementing this:

| ReadCmd | Action |
|---|---|
| 0 | Read data |
| 1 | Suspend reads |

Address Generation in the Framebuffer Read Unit

Address generation is done by the following equation:

$$address=(BaseAddress \pm (Y*Width))+X+SourceOffset$$

The (Y*Width) may be added to or subtracted from the base address depending on whether the screen origin is top or bottom left. The SourceOffset is optionally added to form the source address; without this offset the calculation forms the destination address. An extra offset, PixelOffset, is used to move between buffers. This is included in the base address by adding the WindowBaseAddress to the PixelOffset.

All addresses are in pixels, so the final address must be scaled to form the byte address. Address calculations are done unsigned to 24 bits. Exceeding 24 bits causes the result to overflow and wrap around to zero.

The multiplication of Y and screen width is simplified by supporting a limited number of widths and using partial products. Three partial products are summed to produce the final value:

| Partial Product Code | Add into product | Shift amount |
|---|---|---|
| 0 | 0 | 0 |
| 1 | Y * 32 | Y << 5 |
| 2 | Y * 64 | Y << 6 |
| 3 | Y * 128 | Y << 7 |
| 4 | Y * 256 | Y << 8 |
| 5 | Y * 512 | Y << 9 |

Some common screen widths and the corresponding partial product codes are:

| Screen width | PP0 | PP1 | PP2 | Product |
|---|---|---|---|---|
| 640 | 5 | 3 | 0 | Y * (512 + 128 + 0) |
| 1024 | 5 | 5 | 0 | Y * (512 + 512 + 0) |
| 1152 | 5 | 5 | 3 | Y * (512 + 512 + 128) |
| 1280 | 5 | 5 | 4 | Y * (512 + 512 + 256) |

The screen widths supported are:

| | | | | |
|---|---|---|---|---|
| 0 | 32 | 64 | 96 | 128 |
| 160 | 192 | 224 | 256 | 288 |
| 320 | 352 | 384 | 416 | 448 |
| 512 | 544 | 576 | 608 | 640 |
| 672 | 704 | 768 | 800 | 832 |
| 896 | 1024 | 1056 | 1088 | |
| 1152 | 1280 | 1536 | | |

Within the address calculation chain, the shifts are used to convert pixel addresses into byte addresses; the X shift may different to the Y shift in PackedData mode. The BaseAddress is formed by adding the PixelOffset and the WindowBaseAddress values; this is only done when a register is updated.

Packing in the Framebuffer Read Unit

This unit combines accesses to bytes and 16 bit words to minimize the number of accesses that are done to memory. The address generation process inspects the addresses, and if consecutive ones are in the same 32 bit word only the first is sent. The packing in formation is passed to the input process so that it can read a new word form the data fifo at the right time and extract the correct bits from it.

This should not be confused with the PackedData mode which is used to copy 8 or 16 bit pixels in blocks of 32 bits.

Input Messages to the Framebuffer Read Unit

External Messages

| | Framebuffer Read Register message group | |
|---|---|---|
| Tag Mnemonic | Data Field | Description |
| FBPixelOffset | 24 bit unsigned base offset | |
| FBWindowBase | 24 bit unsigned base address | |
| FBSourceOffset | 24 bit unsigned offset | |

The FBReadMode message controls he operation of the unit. The Message Type field determines the message type the read data is sent in. Normally this is default (i.e. FBData for destination reads or FBSourceData for source reads), but for image uploads it is FBColor.

Output Messages from the Framebuffer Read Unit

| | Framebuffer General message group | |
|---|---|---|
| Tag Mnemonic | Data Field | Description |
| FBColor | Framebuffer data | Used for Image upload. |
| FBData | Framebuffer data | Used for normal framebuffer reads |
| FBSourceData | Framebuffer data | Used for source reads |
| FBWritePixel | As FBReadPixel | |

The format o FBColor, FBData and FBSourceData is the same; the pixel data is held in the appropriate number of lower bits with the remaining bits set to zero.

Internal Messages

| | Framebuffer General message group | |
|---|---|---|
| Tag Mnemonic | Data Field | Description |
| FBReadPad | All zeros. | |

The Framebuffer Write Unit
The framebuffer write unit is responsible for:
calculating the framebuffer write address of the fragment,
packing the addresses to minimize the number of memory accesses,
sending address and data to the memory unit.

The unit issues address to the memory unit along with data and control signals. The address is 22 bits wide (bits 1 an 0 are implicitly zero) and the data is 32 bits. There are 3 control signals:

| Control2 | Control1 | Control0 | Action |
|---|---|---|---|
| 0 | 0 | 0 | WriteData |
| 0 | 0 | 1 | BlockColor |
| 0 | 1 | 0 | WriteMask |
| 0 | 1 | 1 | ResumeReads |
| 1 | 0 | 0 | BlockWrite |

The controls specify the action the memory unit should take for each entry in the fifo. A block fill uses the VRAM special write mode to fill several pixels at a time; the number depends on the type and organization of the memory.

Framebuffer Write Unit Interface to Memory Unit
The table gives the signals that interface the framebuffer write unit to the memory unit. All signals are active high; the source column shows which unit generates the signal, FBWU=framebuffer write unit, MEM=memory unit.

| Name | Width | Source | Description |
|---|---|---|---|
| FBWriteAddr | 22 | FBWU | Address to fifo. |
| FBWriteData | 32 | FBWU | Data to fifo. |
| FBWriteEnables | 4 | FBWU | Byte enables to fifo. |
| FBWriteCmd | 3 | FBWU | Command data to fifo. |
| FBWriteStrobe | 1 | FBWU | Load fifo. |
| FBWriteFull | 1 | MEM | Write fifo full. |
| FBWritesComplete | 1 | MEM | All outstanding writes have completed. |

Accesses to the memory can be grouped in any order so long as all writes for a particular primitive complete before reads begin for the next primitive. This is handled by the suspend/resume read mechanism; the read unit issues a suspend reads signal to the memory unit which will stop reads until it sees a resume reads signal from the write unit.

The FBWritesComplete signal is passed directly from the memory unit to the framebuffer write unit and shows when all writes in the fifo have completed and been written to memory. This is used in synchronizing the chip, and must not be set until the final memory cycle has completed. Because a Sync message can flush the write unit and cause a memory write, care must be taken in implementing the Sync operation that enough time has been allowed for the FBWritesComplete signal to reach a valid state.

The FBWritesComplete signal also flushes any outstanding writes so that data is guarenteed to be written to the screen without a Sync message.

Address Generation in the Framebuffer Write Unit
Address generation is done by the following equation:

$$\text{address} = (\text{AddressOffset} \pm (Y * \text{width})) + X$$

The offset may be added to or subtracted from the AddressOffset depending on whether the screen origin is top or bottom left. Address offset is sent to the unit in the FBWriteBase message and is a combination of the Window-BaseAddress and the PixelOffset.

All addresses are in pixels, so the final address must be scaled to form the byte address. Address calculations are done unsigned to 24 bits. Exceeding 24 bits causes the result to overflow and wrap around to zero.

The multiplication of Y and screen width is simplified by supporting a limited number of widths and using partial products. Three partial products are summed to produce the final value:

| Partial Product Code | Add into product | Shift amount |
|---|---|---|
| 0 | 0 | 0 |
| 1 | Y * 32 | Y << 5 |
| 2 | Y * 64 | Y << 6 |
| 3 | Y * 128 | Y << 7 |
| 4 | Y * 256 | Y << 8 |
| 5 | Y * 512 | Y << 9 |

Some common screen widths and the corresponding partial product codes are:

| Screen width | PP0 | PP1 | PP2 | Product |
|---|---|---|---|---|
| 640 | 5 | 3 | 0 | Y * (512 + 128 + 0) |
| 1024 | 5 | 5 | 0 | Y * (512 + 512 + 0) |
| 1152 | 5 | 5 | 3 | Y * (512 + 512 + 128) |
| 1280 | 5 | 5 | 4 | Y * (512 + 512 + 256) |

The screen widths supported are:

| | | | | |
|---|---|---|---|---|
| 0 | 32 | 64 | 96 | 128 |
| 160 | 192 | 224 | 256 | 288 |
| 320 | 352 | 384 | 416 | 448 |
| 512 | 544 | 576 | 608 | 640 |
| 672 | 704 | 768 | 800 | 832 |
| 896 | 1024 | 1056 | 1088 | |
| 1152 | 1280 | 1536 | | |

Within the address calculation chain, the shift is used to convert pixel addresses into byte addresses.

Packing, Copying and Block Fill in the Framebuffer Write Unit

This unit combines accesses to bytes and 16 bit words to minimize the number of accesses that are done to memory. The unit inspects the addresses and if consecutive ones are in the same 32 bit word the write is not done; only when the address is in a different 32 bit word does outstanding data get written to memory.

The fast block fill mechanism makes use of parallelism in the memory design and special features in the memory devices. Each VRAM memory part can write to 4 consecutive locations with one operation; the total number of memory locations filled depends on the number of memory parts fitted. A mask is generated and sent to the memory along with a block aligned address. The mask shows which pixels in the block should be written. A maximum of 32 pixels can be filled with one write, but the actual number will depend on the organization of the memory.

Packed copies move 32 bits at a time even though the real pixel size may be 8 or 16 bits. When packed copies are enabled the X values and count fed to the rasterizer should be divided by 2 or 4 (depending on the real pixel size); the Y values should stay as they are and the partial products kept the same. The address calculation scales the X value back to the correct pixel size before using it.

The PackedDataLimits message holds the left and right X values for the destination area of the screen in the native pixel format. The actual area rasterized by exceed this depending on the relative position of the source of the copy. Any pixels falling outside these limits are not plotted. The relative offset field gives the number of pixels that the source data has to be adjusted by to align with the destination data.

Input Messages

| | Framebuffer Data Write message group | |
|---|---|---|
| Tag Mnemonic | Data Field | Description |
| FBHardwareWriteMask | Raw framebuffer format | |
| FBBlockColour | Raw framebuffer format | |
| FBWriteBase | 24 bit unsigned base address | |
| FBWriteConfig | See FBRead unit | |
| FastBlockLimits | See Rasterizer unit | |
| FastBlockFill | See Rasterizer unit | |

The UpLoadData bit causes the FBWriteData for each step message to be forwarded to the next unit in FBColor. This allows data read from the framebuffer to be formatted before being uploaded.

According to one disclosed class of preferred embodiments, there is provided: a rendering system comprising: means for decomposing primitives into fragments to be rendered; a processor for computing depth values, and color values including a blending parameter, for individual ones of said fragments; means for reading a local buffer memory in which depth and/or color values are stored, and for comparing the computed depth and/or color values for individual ones of said fragments against values retrieved from said local buffer, and conditionally storing the computed depth and/or color values depending on the results of the comparison; and circuitry for forcing the blend parameter to a predetermined value; whereby said means for forcing can assure that no color value will ever be equal to a depth value, even when color and depth values are overwritten into the same set of address locations.

According to another disclosed class of preferred embodiments, there is provided: a method for rendering, comprising the steps of: a) decomposing primitives into fragments to be rendered; b) computing depth values for individual ones of said fragments; c) reading a local buffer memory in which depth and/or color values are stored, and comparing the computed depth values for individual ones of said fragments against depth and/or color values retrieved from said local buffer, and conditionally storing the computed depth values depending on the results of the comparison; d) computing color values including a blending parameter for individual ones of said fragments; and e) reading said local buffer memory in which depth and/or color values are stored, and comparing the computed depth values for individual ones of said fragments against depth and/or color values retrieved from said local buffer, and conditionally storing the computed color values depending on the results of the comparison; wherein said blend parameter is forced to a predetermined value, which is independent of the initially computed blend parameter, before computed color values are stored; whereby said forcing step assures that no color value will ever be equal to a depth value, even when color and depth values are overwritten into the same set of address locations.

According to another disclosed class of preferred embodiments, there is provided: a method for rendering, comprising the steps of: decomposing primitives into fragments to be rendered; computing depth values for individual ones of said fragments; a) reading a local buffer memory at an address assigned to said fragment, and comparing the computed depth values for individual ones of said fragments against the values read from said local buffer, and conditionally storing the computed depth values depending on the results of the comparison; b) again computing depth values, and also color values which include a multi-bit blending value, for individual ones of said fragments; and c) reading said local buffer memory at the address assigned to said fragment, and comparing the computed depth value for said fragment against the value read from said local buffer, and conditionally storing the computed color values, with one bit of said blending parameter which has been forced to a predetermined value, depending on the results of the comparison; whereby said predetermined value of said one bit of said blending parameter assures that no color value will ever be equal to a depth value, even when color and depth values are overwritten into the same set of address locations.

According to another disclosed class of preferred embodiments, there is provided: a graphics processing subsystem, comprising: at least four functionally distinct processing units, each including hardware elements which are customized to perform a rendering operation which is not performed by at least some others of said processing units; at least some ones of said processing units being connected to operate asynchronously to one another; at least one of said processors connected and configured to compute depth values, and color values including a blending parameter, for graphics data; a memory in which depth and/or color values are stored, connected to be accessed by at least one of said processing units; reading circuitry connected to said memory, connected and configured to reads said memory in which depth and/or color values are stored, and to compare the computed depth and/or color values for graphics data against values retrieved from said memory, and to conditionally store the computed depth and/or color values depending on the results of the comparison; said processing units being mutually interconnected in a pipeline relationship, such that said processing units jointly provide a pipelined multiple-instruction-multiple-device (MIMD) graphics processing architecture.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

The foregoing text has indicated a large number of alternative implementations, particularly at the higher levels, but these are merely a few examples of the huge range of possible variations.

For example, the preferred chip context can be combined with other functions, or distributed among other chips, as will be apparent to those of ordinary skill in the art.

For another example, the described graphics systems and subsystems can be used, in various adaptations, not only in high-end PC's, but also in workstations, arcade games, and high-end simulators.

For another example, the described graphics systems and subsystems are not necessarily limited to color displays, but can be used with monochrome systems.

For another example, the described graphics systems and subsystems are not necessarily limited to displays, but also can be used in printer drivers.

What is claimed is:

1. A rendering system comprising:
    means for decomposing primitives into fragments to be rendered;
    a processor for computing depth values, and color values including a blending parameter, for individual ones of said fragments;
    means for reading a local buffer memory in which depth and/or color values are stored, and for comparing the computed depth values for individual ones of said fragments against values retrieved from said local buffer, and conditionally storing the computed depth or color values depending on the results of the comparison; and
    circuitry for forcing the blend parameter to a predetermined value;
    whereby said circuitry for forcing can assure that no color value will ever be equal to a depth value, even when color and depth values are overwritten into the same set of address locations.

2. The rendering system of claim 1, further comprising a texturing unit.

3. The rendering system of claim 1, further comprising a scissoring unit.

4. The rendering system of claim 1, further comprising a memory access unit which reads and writes said memory.

5. A method for rendering, comprising the steps of:
    (a.) decomposing primitives into fragments to be rendered;
    (b.) computing depth values for individual ones of said fragments;
    (c.) reading a local buffer memory in which depth and/or color values are stored, and comparing the computed depth values for individual ones of said fragments against depth or color values retrieved from said local buffer, and conditionally storing the computed depth values depending on the results of the comparison;
    (d.) computing color values including a blending parameter for individual ones of said fragments; and
    (e.) reading said local buffer memory in which depth and/or color values are stored, and comparing the computed depth values for individual ones of said fragments against depth or color values retrieved from said local buffer, and conditionally storing the computed color values depending on the results of the comparison; wherein said blend parameter is forced to a predetermined value, which is independent of the initially computed blend parameter, before computed color values are stored;
    whereby said forcing step assures that no color value will ever be equal to a depth value, even when color and depth values are overwritten into the same set of address locations.

6. The method of claim 5, wherein steps (a.)–(c.) are first performed for each of said primitives, then steps (d.)–(e.) are performed for each of said primitives.

7. The method of claim 5, wherein when all said primitives are processed, said memory contains only said color values.

8. A method for rendering, comprising the steps of:
    decomposing primitives into fragments to be rendered;
    computing depth values for individual ones of said fragments;
    (a.) reading a local buffer memory at an address assigned to said fragment, and comparing the computed depth values for individual ones of said fragments against the values read from said local buffer, and conditionally storing the computed depth values depending on the results of the comparison;
    (b.) again computing depth values, and also color values which include a multi-bit blending value, for individual ones of said fragments; and
    (c.) reading said local buffer memory at the address assigned to said fragment, and comparing the computed depth value for said fragment against the value read from said local buffer, and conditionally storing the computed color values, with one bit of said blending parameter which has been forced to a predetermined value, depending on the results of the comparison;
    whereby said predetermined value of said one bit of said blending parameter assures that no color value will ever be equal to a depth value, even when color and depth values are overwritten into the same set of address locations.

9. The method of claim 8, wherein when all said primitives are processed, said memory contains only said color values.

10. A graphics processing subsystem, comprising:
    at least four functionally distinct processing units, each including hardware elements which are customized to perform a rendering operation which is not performed by at least some others of said processing units; at least some ones of said processing units being connected to operate asynchronously to one another;
    at least one of said processors connected and configured to compute depth values, and color values including a blending parameter, for graphics data;
    a memory in which depth and/or color values are stored, connected to be accessed by at least one of said processing units;
    reading circuitry connected to said memory, connected and configured to read said memory in which depth and/or color values are stored, and to compare the computed depth values for graphics data against values retrieved from said memory, and to conditionally store the computed depth or color values depending on the results of the comparison;

said processing units being mutually interconnected in a pipeline relationship, such that said processing units jointly provide a pipelined multiple-instruction-multiple-device (MIMD) graphics processing architecture.

11. The graphics processing subsystem of claim 10, wherein said processing units include a texturing unit.

12. The graphics processing subsystem of claim 10, wherein said processing units include a scissoring unit.

13. The graphics processing subsystem of claim 10, wherein said processing units include a memory access unit which reads and writes said memory.

14. The graphics processing subsystem of claim 10, wherein at least some ones of said processing units include internally paralleled data paths.

15. The graphics processing subsystem of claim 10, wherein all of said processing units are integrated into a single integrated circuit.

16. The graphics processing subsystem of claim 10, wherein all of said processing units, but not said memory, are integrated into a single integrated circuit.

17. The graphics processing subsystem of claim 10, further comprising a color lookup-table and analog conversion circuit which is connected to receive data from said memory and to provide corresponding analog color outputs.

18. The system of claim 10, wherein at least one of said processors decomposes primitive data into multiple fragments.

19. The system of claim 10, wherein said at least some portion of said graphics data comprises multiple fragments from decomposed primitive data.

20. The system of claim 10, wherein said graphics processing subsystem processes 3-dimensional data.

21. The system of claim 10, further comprising flagging circuitry for forcing the blend parameter to a predetermined value, wherein said flagging circuitry can assure that no color value will ever be equal to a depth value, even when color and depth values are overwritten into the same set of address locations.

* * * * *